United States Patent
Miskin et al.

(10) Patent No.: US 12,508,702 B2
(45) Date of Patent: Dec. 30, 2025

(54) COMPACT ACTUATORS, ELECTRICALLY PROGRAMMABLE MICROSCALE SURFACE OXIDE MEMORY ACTUATORS AND RELATED ROBOTIC DEVICES

(71) Applicant: Cornell University, Ithaca, NY (US)

(72) Inventors: Marc Miskin, Ithaca, NY (US); Paul McEuen, Ithaca, NY (US); Itai Cohen, Ithaca, NY (US); Qingkun Liu, Ithaca, NY (US)

(73) Assignee: Cornell University

( * ) Notice: Subject to any disclaimer, the term of this patent is extended or adjusted under 35 U.S.C. 154(b) by 782 days.

(21) Appl. No.: 17/905,702

(22) PCT Filed: Mar. 8, 2021

(86) PCT No.: PCT/US2021/021419
§ 371 (c)(1),
(2) Date: Sep. 6, 2022

(87) PCT Pub. No.: WO2021/178978
PCT Pub. Date: Sep. 10, 2021

(65) Prior Publication Data
US 2023/0347508 A1    Nov. 2, 2023

Related U.S. Application Data

(60) Provisional application No. 63/128,778, filed on Dec. 21, 2020, provisional application No. 63/087,056, (Continued)

(51) Int. Cl.
*B25J 9/10* (2006.01)
*B25J 7/00* (2006.01)
(Continued)

(52) U.S. Cl.
CPC .............. *B25J 9/1085* (2013.01); *B25J 7/00* (2013.01); *B25J 19/0029* (2013.01);
(Continued)

(58) Field of Classification Search
CPC ........ B25J 9/1085; B25J 7/00; B25J 19/0029; B81B 3/0021; B81B 2201/038;
(Continued)

(56) References Cited

U.S. PATENT DOCUMENTS 6,555,945 B1 *    4/2003   Baughman ........... H02N 11/006
                                                        136/291
2007/0012349 A1    1/2007   Gaudiana et al.
(Continued)

OTHER PUBLICATIONS

International Search Report and Written Opinion for PCT/US2021/021419, dated Aug. 5, 2021, 20 pages.
(Continued)

*Primary Examiner* — Emily P Pham
(74) *Attorney, Agent, or Firm* — Cozen O'Connor

(57) ABSTRACT

Disclosed are devices, systems, and methods for fabrication of moving, actuatable structures at micron scales that can be electronically controlled using low power and low voltages. Also disclosed are microscale robots having such microscale actuator structures to actuate the robots' movements as well as devices, systems, and methods for fabrication of microscale robots. The disclosed methods of fabrication are compatible with standard semiconductor technologies.

20 Claims, 64 Drawing Sheets

Related U.S. Application Data filed on Oct. 2, 2020, provisional application No. 62/986,512, filed on Mar. 6, 2020.

(51) Int. Cl.

| | | |
|---|---|---|
| *B25J 19/00* | (2006.01) | |
| *B82B 1/00* | (2006.01) | |
| *B82B 3/00* | (2006.01) | |
| *B82Y 15/00* | (2011.01) | |
| *B82Y 40/00* | (2011.01) | |
| *F03G 7/00* | (2006.01) | |

(52) U.S. Cl.
CPC .............. *B82B 1/002* (2013.01); *B82B 1/006* (2013.01); *B82B 3/0023* (2013.01); *B82Y 15/00* (2013.01); *B82Y 40/00* (2013.01); *F03G 7/011* (2021.08); *F03G 7/012* (2021.08)

(58) Field of Classification Search
CPC ... B81B 2203/053; B82B 1/002; B82B 1/006; B82B 3/0023; B82Y 15/00; B82Y 40/00; F03G 7/011; F03G 7/012; F03G 7/0121

See application file for complete search history.

(56) References Cited

U.S. PATENT DOCUMENTS

| | | |
|---|---|---|
| 2011/0050040 A1 | 3/2011 | Yamamoto et al. |
| 2013/0269336 A1 | 10/2013 | O'Connell et al. |
| 2015/0315012 A1 | 11/2015 | Wiersma et al. |

OTHER PUBLICATIONS

Miskin, et al. "Graphene-based bimorphs for micron-sized, autonomous origami machines" Jan. 16, 2018, PNAS 5 pages.

Jin et al. "Bulk Nanoporous Metal for Actuation" Advanced Engineering Materials vol. 12, Aug. 31, 2018, 10 pages.

\* cited by examiner

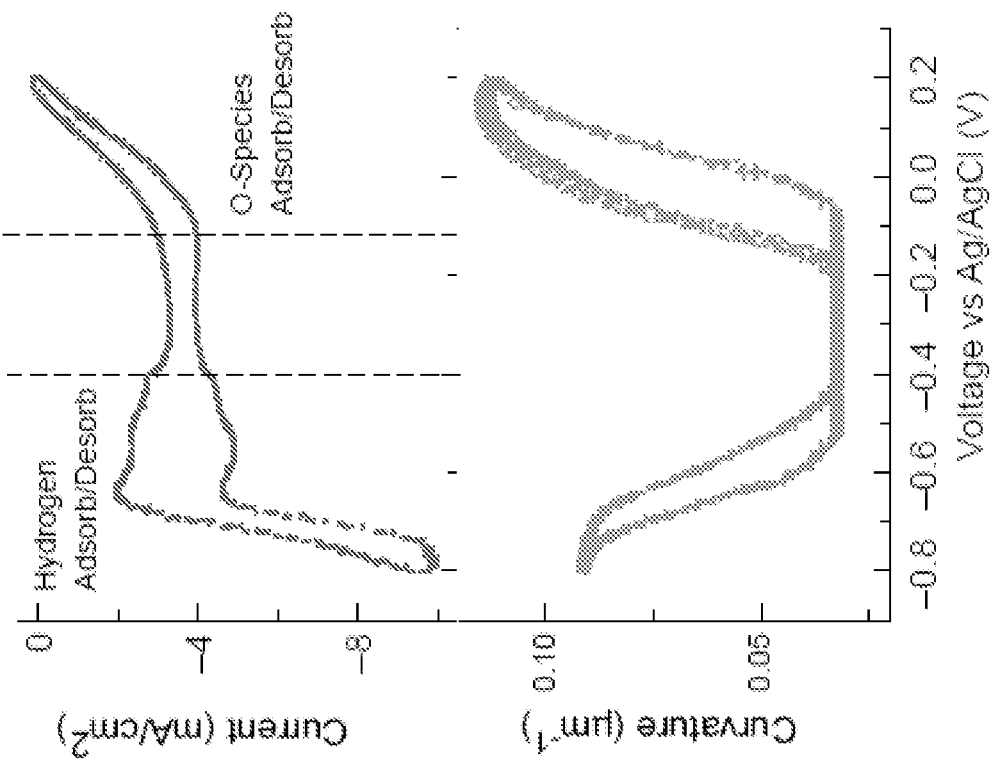
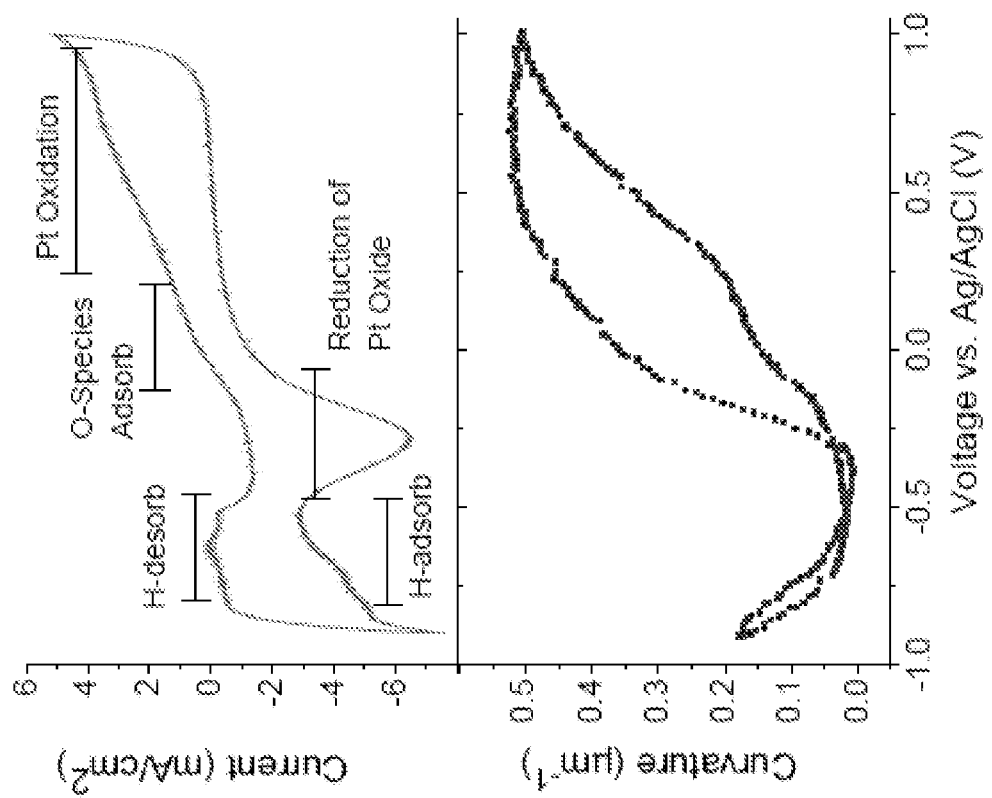
FIG. 4A
FIG. 4B

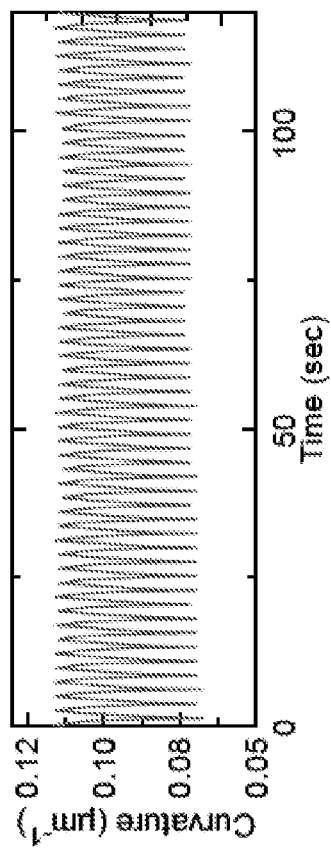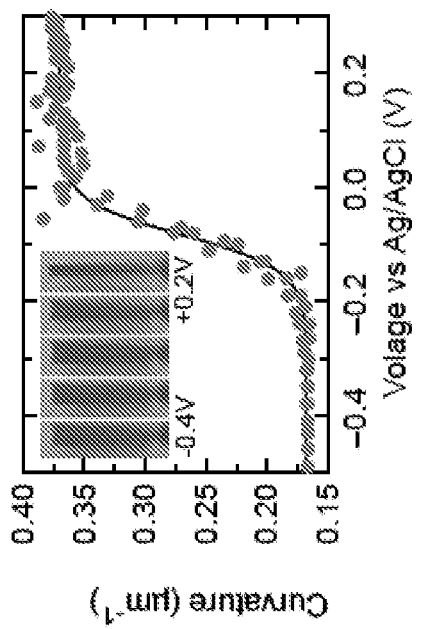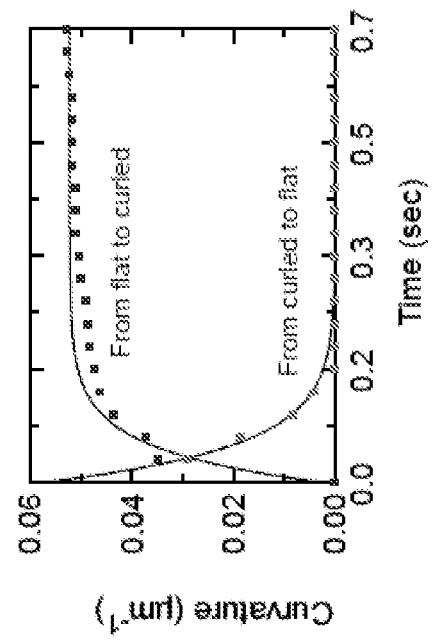
FIG. 6B
FIG. 6C
FIG. 6A

COMPACT ACTUATORS, ELECTRICALLY PROGRAMMABLE MICROSCALE SURFACE OXIDE MEMORY ACTUATORS AND RELATED ROBOTIC DEVICES

CROSS-REFERENCE TO RELATED APPLICATION

This patent document claims priorities to and benefits of the following prior U.S. patent filings:
1. U.S. Provisional Application No. 62/986,512 entitled "COMPACT ACTUATORS AND RELATED ROBOTIC DEVICES" filed Mar. 6, 2020,
2. U.S. Provisional Application No. 63/087,056 entitled "COMPACT ACTUATORS, ELECTRICALLY PROGRAMMABLE MICROSCALE SURFACE OXIDE MEMORY ACTUATORS AND RELATED ROBOTIC DEVICES" filed Oct. 2, 2020, and
3. U.S. Provisional Application No. 63/128,778 entitled "COMPACT ACTUATORS, ELECTRICALLY PROGRAMMABLE MICROSCALE SURFACE OXIDE MEMORY ACTUATORS AND RELATED ROBOTIC DEVICES" filed on Dec. 21, 2020.

The entire content of the before-mentioned patent applications is incorporated by reference as part of the disclosure of this document.

STATEMENT REGARDING FEDERALLY SPONSORED RESEARCH OR DEVELOPMENT

This invention was made with government support under ARO W911NF-18-1-0032 awarded by the Army Research Office, MURI Grant FA2386-13-1-4118 awarded by Air Force Office of Scientific Research (AFSOR), and DMR-1435829 awarded by the National Science Foundation (NSF). The government has certain rights in the invention.

TECHNICAL FIELD

This patent document relates to actuator technologies including electrochemical actuators, micron-scale actuators (microactuators), nano-scale actuators (nanoactuators) as well as their applications in robotic and other devices or systems.

BACKGROUND

Compact actuators are useful in various applications, including small-scale (e.g., micron-scale or nano-scale) devices capable of generating mechanical motion of solids or fluids. Motion can be generated via converting one form of energy (for instance, electrical or thermal) into kinetic energy. In some implementations, sizes of some microactuators may vary from a few millimetres to a few micrometers, displacements produced by some microactuators may be from the nanometer range to the millimeter range, the forces generated by some microactuators may be from nano Newtons to milli Newtons, and flow rates that can be generated by some microfluidic microactuators may be from pico liters per minute to milli liters per minute.

SUMMARY

Devices, systems, materials, and methods disclosed in this patent document can be implemented in various embodiments to achieve compact actuators as well as robotic and other devices and systems at micron scales that can be electronically controlled using low power (e.g., 1 nW) and low voltages (e.g., 200 mV).

One aspect of the disclosed embodiments relates to an actuator that includes a nanometer-thick metal member. The actuator also includes an inactive material disposed along at least a portion of a surface of the nanometer-thick metal member. The metal of the nanometer-thick metal member has a first surface stress and the inactive material has a second surface stress different than the first surface stress Another aspect of the disclosed embodiments relates to a nanorobot that includes a photovoltaic device. The nanorobot also includes an actuator that is electrically connected to the photovoltaic device. The actuator of the nanorobot includes a nanometer-thick metal member and an inactive material disposed along at least a portion of a surface of the nanometer-thick metal member, wherein the metal has a first surface stress and the inactive material has a second surface stress different than the first surface stress.

Yet another aspect of the disclosed embodiments relates to a nanorobot that includes a photovoltaic device. The nanorobot also includes an actuator electrically connected to the photovoltaic device. The actuator of the nanorobot includes a nanometer-thick first material and a nanometer-thick second material disposed along at least a portion of a surface of the first material. The first material has a first surface stress and the second material has a second surface stress different than the first surface stress. A thickness of the first material is greater than a thickness of the second material. A voltage from the photovoltaic device applied to the actuator causes the actuator to change from a first state to a second state, and a removal of a voltage from the photovoltaic device to the actuator causes the actuator to change from the second state to the first state.

An aspect of the disclosed embodiments relates to a method of manufacturing a plurality of nanorobots that includes fabricating nanorobot electronics on a wafer. The method further includes fabricating nanorobot actuators on the nanorobot electronics to form the plurality of nanorobots. The method also includes releasing the formed plurality of nanorobots.

Another aspect of the disclosed embodiments relates to a nanorobot that includes an electricity generating device. The nanorobot further includes an actuator electrically connected to the electricity generating device. The actuator of the nanorobot includes a nanometer-thick first material and a nanometer-thick second material disposed along at least a portion of a surface of the first material. The first material has a first surface stress and the second material has a second surface stress different than the first surface stress. A thickness of the first material is greater than a thickness of the second material. A voltage from the electricity generating device applied to the actuator causes the actuator to change from a first state to a second state. A removal of a voltage from the electricity generating device to the actuator causes the actuator to change from the second state to the first state.

Yet another aspect of the disclosed embodiments relates to a robotic device that includes a device platform. The robotic device further includes a first robotic member engaged to a first location of the device platform and operable to cause a local actuation at the first location. The robotic device also includes a second robotic member engaged to a second, different location of the device platform and operable to cause a local actuation at the second location so that the local actuations at the first and second locations to cause a robotic movement of the device platform. Each of the first and second robotic members includes (1) a controllable actuator that includes two different layers with different material properties that are deformable in response to a control signal and (2) a control circuit coupled to the controllable actuator to supply the control signal to the controllable actuator. The different material properties of the two different layers are modifiable by the control signal to cause the local actuation.

An aspect of the disclosed embodiments relates to an actuator joint that includes a nanometer-thick metal layer. The actuator joint further includes a layer of inactive material disposed along at least a portion of a surface of the nanometer-thick metal layer. The metal of the nanometer-thick metal layer has a first surface stress and the inactive material has a second surface stress different than the first surface stress.

An aspect of the disclosed embodiments relates to an actuator that includes a base having an electrical connector disposed thereon. The actuator further includes a plurality of connected actuator segments comprising a first actuator segment disposed on the base and connected by a first actuatable joint to a second actuator segment, the first actuatable joint comprising a surface oxide memory actuator (SOMA) comprising a nanometer-thick metal layer and a layer of inactive material disposed along at least a portion of a surface of the nanometer-thick metal layer, wherein the metal has a first surface stress and the inactive material has a second surface stress different than the first surface stress, the first actuatable joint further comprising a first conductive lead or metallization electrically connecting the SOMA of the first actuatable joint to the electrical connector.

Another aspect of the disclosed embodiments relates to an actuator joint that includes a first conductive layer. The actuator joint further includes a first contact formed on or disposed on the first conductive layer. The actuator joint also includes a second conductive layer. The actuator joint further includes a second contact formed on or disposed on the second conductive layer. The actuator joint further includes a nanometer-thick ionic conducting polymer material disposed between the first conductive layer and the second conductive layer. The actuator joint, under a first voltage or a first range of voltages across the first contact and the second contact, is to maintain a first state having a first shape under a first electric field across the nanometer-thick ionic conducting polymer material, wherein a magnitude of the first voltage or the first range of voltages is either zero or non-zero. Application of a second voltage or a second range of voltages across the first contact and the second contact is to produce a second electric field across the nanometer-thick ionic conducting polymer material to impart a stress and a resultant strain to the first conductive layer and/or the second conductive layer to bend the actuator joint from the first state and the first shape to a second state having a second shape, and wherein the second electric field is different than the first electric field.

Yet another aspect of the disclosed embodiments relates to an actuator joint that includes a first layer of a conductive material. The actuator joint further includes a first contact formed on or disposed on a first side of the first layer at a first position. The actuator joint also includes a second contact formed on or disposed on the first side of the first layer at a second position spaced apart from the first position. The actuator joint further includes a second layer disposed on a second side of the first layer, the second layer comprising a liquid crystal elastomer. The actuator joint, under a first voltage or a first range of voltages across the first contact and the second contact, is to maintain a first state having a first shape, wherein a magnitude of the first voltage or the first range of voltages is either zero or non-zero. Application of a second voltage or a second range of voltages across the first contact and the second contact is to impart, via an electrothermal effect, a strain to the first conductive layer and/or the second layer to bend the actuator joint from the first state and the first shape to a second state having a second shape.

An aspect of the disclosed embodiments relates to a nanometer switch comprising an actuator joint according to the technology disclosed in this patent document.

Another aspect of the disclosed embodiments relates to a nanometer switch comprising a plurality of actuator joints according to the technology disclosed in this patent document.

An aspect of the disclosed embodiments relates to a nanorobot comprising at least one actuator joint according to the technology disclosed in this patent document.

Another aspect of the disclosed embodiments relates to a nanorobot comprising a plurality of actuator joints according to the technology disclosed in this patent document.

An aspect of the disclosed embodiments relates to an end effector comprising at least one actuator joint according to the technology disclosed in this patent document.

Another aspect of the disclosed embodiments relates to an end effector comprising a plurality of actuator joints according to the technology disclosed in this patent document.

An aspect of the disclosed embodiments relates to a nanorobot comprising one or more end effectors, each of the one or more end effectors comprising at least one actuator joint according to the technology disclosed in this patent document.

Yet another aspect of the disclosed embodiments relates to a surgical instrument comprising at least one end effector comprising at least one actuator joint according to the technology disclosed in this patent document.

Those and other aspects of the disclosed devices and techniques and their implementations and applications are described in greater detail in the drawings, the description and the claims.

BRIEF DESCRIPTION OF THE DRAWINGS

FIG. 4A shows an example cyclic voltammogram for a Ti—Pt SEA and curvature of the SEA over a voltage range.

FIG. 4B shows an example cyclic voltammogram for a Ti—Pt SEA and curvature of the SEA over another voltage range.

FIG. 6A shows curvature of an example SEA bending around its long axis versus voltage.

FIG. 6B illustrates actuation of an example SEA over many repeated cycles.

FIG. 6C illustrates characteristic response time for switching of an example SEA between the flat and curled configurations in response to a step in the actuation voltage.

FIG. 9A shows schematics of three example surfaces that robots according to the disclosed technology walked on.

FIG. 9B shows an example maximum lateral velocity measured for three types of robots according to the disclosed technology and for different types of surfaces the robots walked on.

DETAILED DESCRIPTION

Figure 1A:
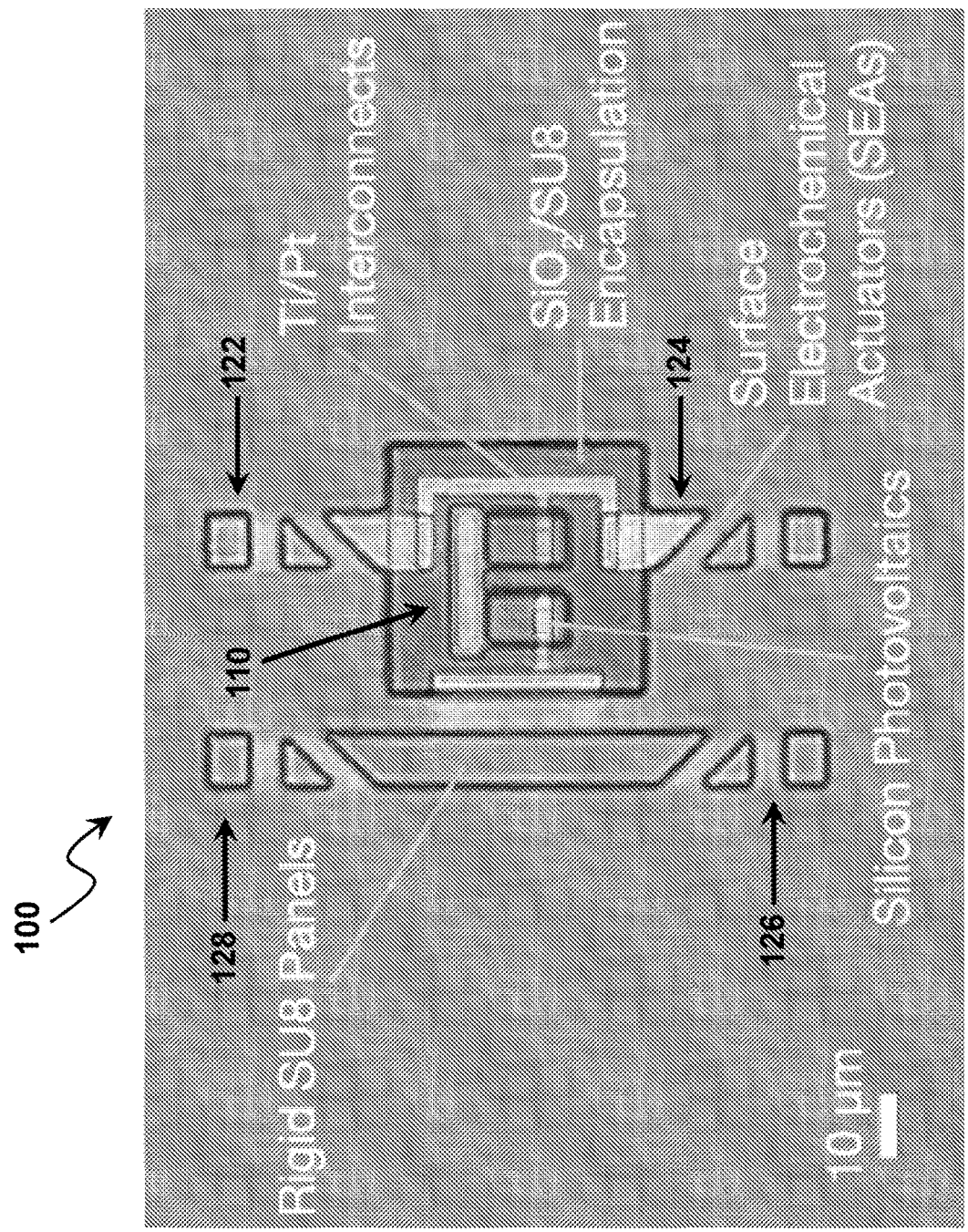
FIG. 1A shows an optical image of an example microscopic robot fabricated according to the technology disclosed in this patent document that is attached to its substrate.

Fifty years of Moore's Law scaling in microelectronics have brought remarkable opportunities for the rapidly-evolving field of microscopic robotics. Electronic, magnetic, and optical systems now offer an unprecedented combination of complexity, small size, and low cost, and could readily be appropriated to form the intelligent core of robots that are smaller than the resolution limit of human vision (sub 100 microns). But one major roadblock exists: it is technically difficult or challenging to construct micron-scale actuator systems that can seamlessly integrate with semiconductor processing and respond to standard electronic control signals.

For example, various actuators, such as certain piezoelectric actuators and certain thermal actuators, may be constructed as millimeter-scale robots but such actuators may not be sufficiently small or compact for various applications such as devices that operate at micron radii of curvature. Thermal actuators, though useful in MEMS, are inefficient and difficult to address uniquely at small sizes due to the rapid diffusion of heat. Some microactuators built using conducting polymers are difficult to produce in a silicon processing environment because they are damaged by standard chemicals for microfabrication, in particular solvents, developer, and etchants. Actuators based on optical, acoustic, magnetic, thermal, or chemical fields have enabled micro-swimmers, grippers, and other machines at the cellular scale, but cannot be controlled via onboard electronics. Accordingly, there is still a need to provide compact, robust and efficient actuators capable of operating at micron scales which can be produced in silicon processing environments and can be controlled by on-board electronics. Methods, devices, and systems disclosed in this patent document address this need by providing a new class of voltage-controllable electrochemical actuators that operate at low voltages (e.g., 200 mV), low power (e.g., 10 nW), and are compatible with silicon processing.

This patent document discloses active microscale mechanical materials including materials that can be driven by integrated electronics at low voltages (e.g., ~ 1V or less) for various applications such as volatile micro-scale actuators that reversibly deform in response to voltages, and micro-scale shape-memory actuators that retain their form after the removal of the voltage. The disclosed volatile micro-scale actuators and micro-scale shape-memory actuators can be implemented in various configurations. Specific examples are fast, low-voltage, reconfigurable micron-scale shape memory actuators or Surface Oxide Memory Actuators (SOMA). They function by the electrochemical oxidation/reduction of a platinum surface, creating surface stresses that cause bending. The low applied voltage allows SOMAs to work in the electrochemical window of water and to avoid bubble generation associated with oxygen evolution. Multistate three-dimensional structures can be constructed to be reproducibly programmed/erased by electrical pulses in under a second. Example structures include electrically reconfigurable microscale origami motifs, translation surfaces, and mechanical storage elements, with applications in metamaterials, bio-implantable systems, and micro-robotics.

FIG. 1A shows an image of an example of a microscopic robot 100 having integrated electronics and fabricated according to the technology disclosed in this patent document. As shown, this microscopic robot 100 is still attached to its substrate. Parts of the robot 100 include: a body 110 with internal electronics, and movable robotic legs 122, 124, 126, and 128 that are engaged to the body 110 and are operable to actuate in response to control signals. In some implementations, the electronics may be implemented to include circuits with silicon photovoltaics (e.g., p-n junctions) and metal interconnects, encapsulated between a layer of silicon dioxide and a layer of SU8 photoresist. The legs 122, 124, 126, and 128 are made from voltage-controlled surface electrochemical actuators (SEAs) coupled rigid micro panels that set the legs' 3D shape. The panels control the folded shape of the leg while the SEAs are actuated to produce motion. In some implementations, the panels may be SU8 panels, for example and various suitable materials may be used for constructing such panels.

Figure 1B:
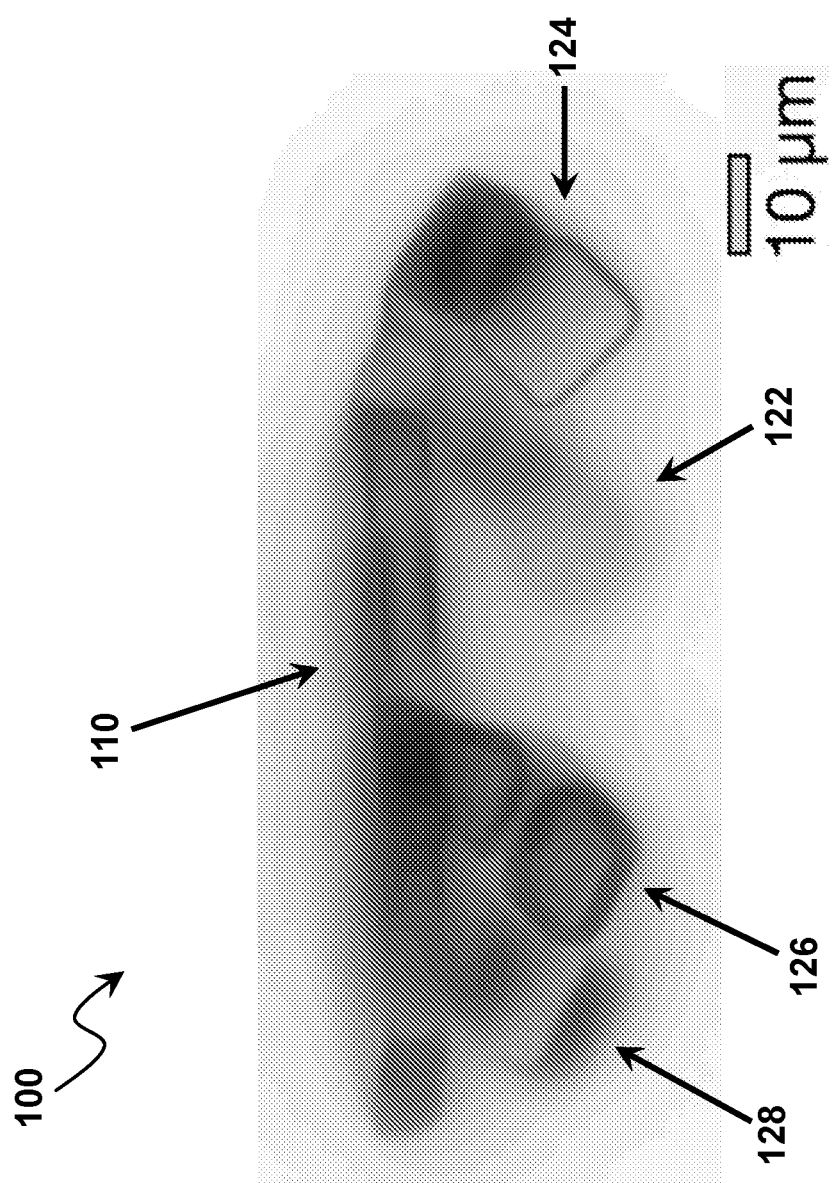
FIG. 1B shows an example optical image of a side view of the robot shown in FIG. 1A after release of the robot from its substrate.

FIG. 1B shows an image of a side view of the robot 100 after release from its substrate. The image in FIG. 1B shows the three-dimensional structure of the folded robot.

Figure 1C:
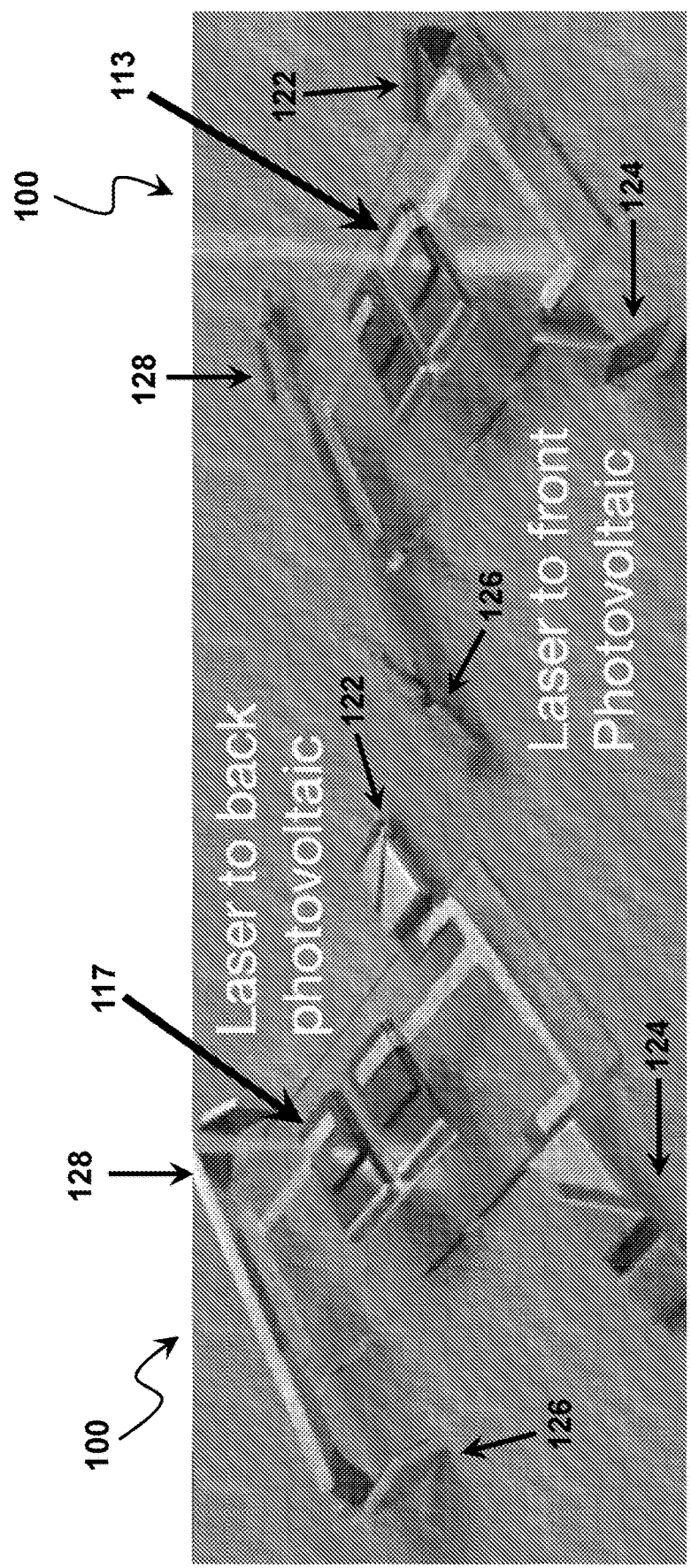
FIG. 1C shows a schematic illustration of robot movement in response to a sequence of laser pulses.
Figure 1D:
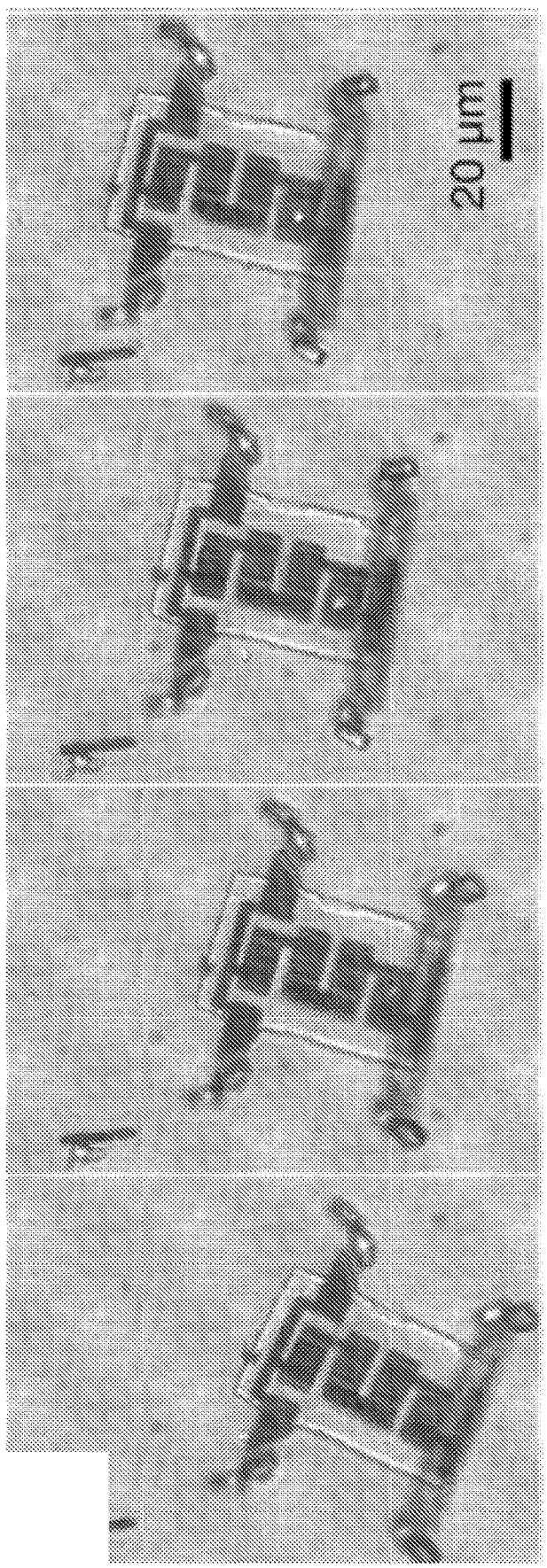
FIG. 1D shows an example micrograph sequence illustrating movement of a robot according to the disclosed technology.

In some implementations, microscopic robots according to the disclosed technology may be controlled to perform walking and other movements by controlling movements of robotic legs via controlling SEAs on such robotic legs. In this specific example, the SEAs were powered by photovoltaics elements and the SEAs were controlled by controlling laser illumination light directed to the different photovoltaics elements for the SEAs. For example, a sequence of laser pulses was directed to different photovoltaics elements for the SEAs at different robotic legs to cause the robot to perform a desired move for a walking, as shown schematically in FIGS. 1C and in a real micrograph sequence in FIG. 1D. FIG. 1C illustrates that by directing laser light to photovoltaics elements 113 and 117 of the robot 100 that alternately bias the front (122, 124) and back (126, 128) legs of the robot, respectively, the robot can walk along a surface (e.g., a patterned surface). FIG. 1D shows a montage of micrograph of a real robot walking across a surface. Frames in FIG. 1D are about eight seconds apart. This use of photovoltaics elements for emerging SEAs is an example only and other portable battery sources may be used to supply the control voltages to SEAs and the control voltages to SEAs are controlled individually to provide a desired synchronized movement of the robot.

Figure 1E:
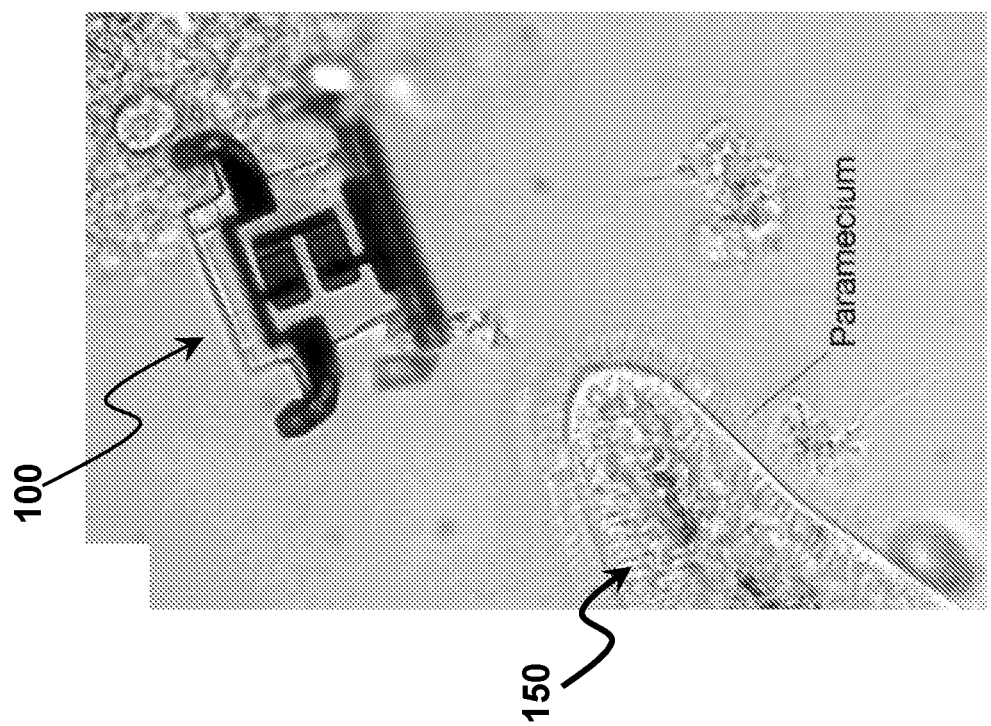
FIG. 1E shows a micrograph of an example robot according to the disclosed technology beside a single-cell microorganism.

FIG. 1E illustrates that robots according to the disclosed technology can be made in compact sizes that are comparable in size to many types of larger microorganisms. FIG. 1E shows a micrograph of a robot 100 beside a single-celled paramecium 150.

Figure 1F:
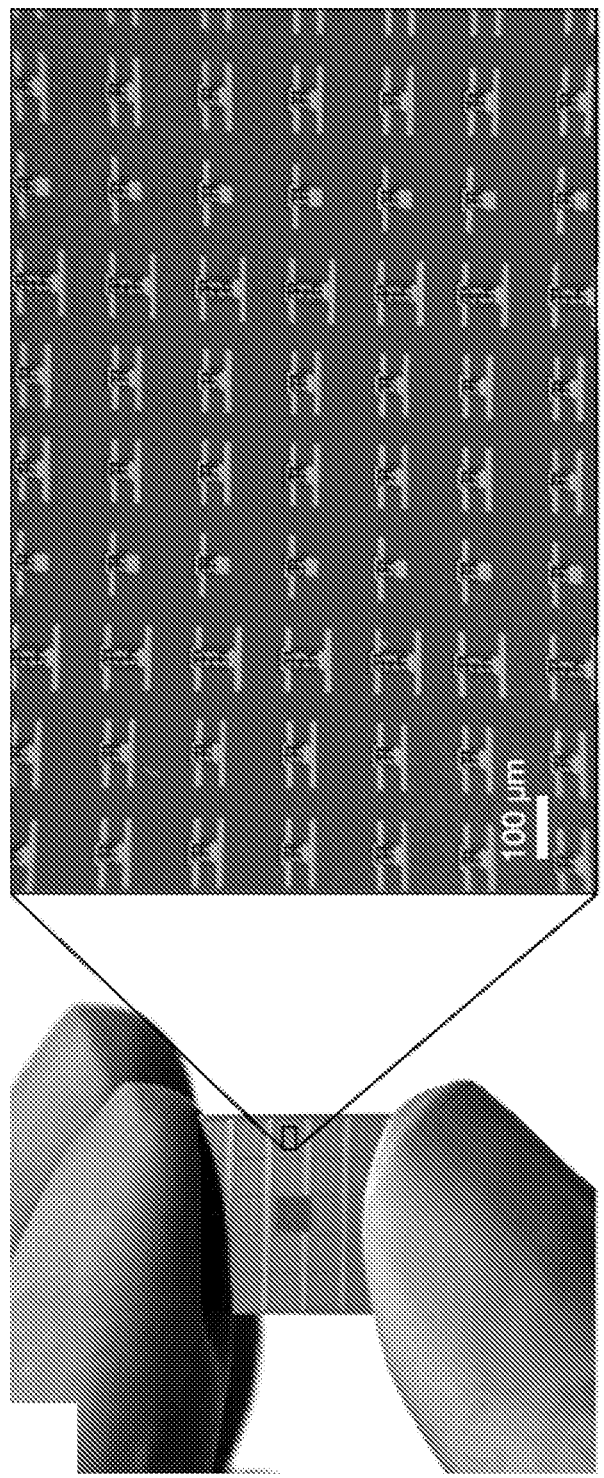
FIG. 1F shows an example optical image of a chip with thousands of robots according to the disclosed technology on it.

FIG. 1F shows an image of an example of a chip that is fabricated with hundreds thousands of fabricated robots on it. For example, the chip may be cut from a 4-inch wafer with approximately 1 million microscopic robots on its surface. All of the components on the chip may be fabricated in parallel at a wafer level as part of the same integrated fabrication process.

In those and others microscopic robots based on the disclosed technology, a new class of actuators is designed as surface electrochemical actuators or SEAs to cause the desired actuation or motion for robotic operations. SEAs can be made from nanometer-thick metal (e.g., platinum (Pt)) and are fabricated using standard and other suitable semiconductor technologies.

Figure 2A:
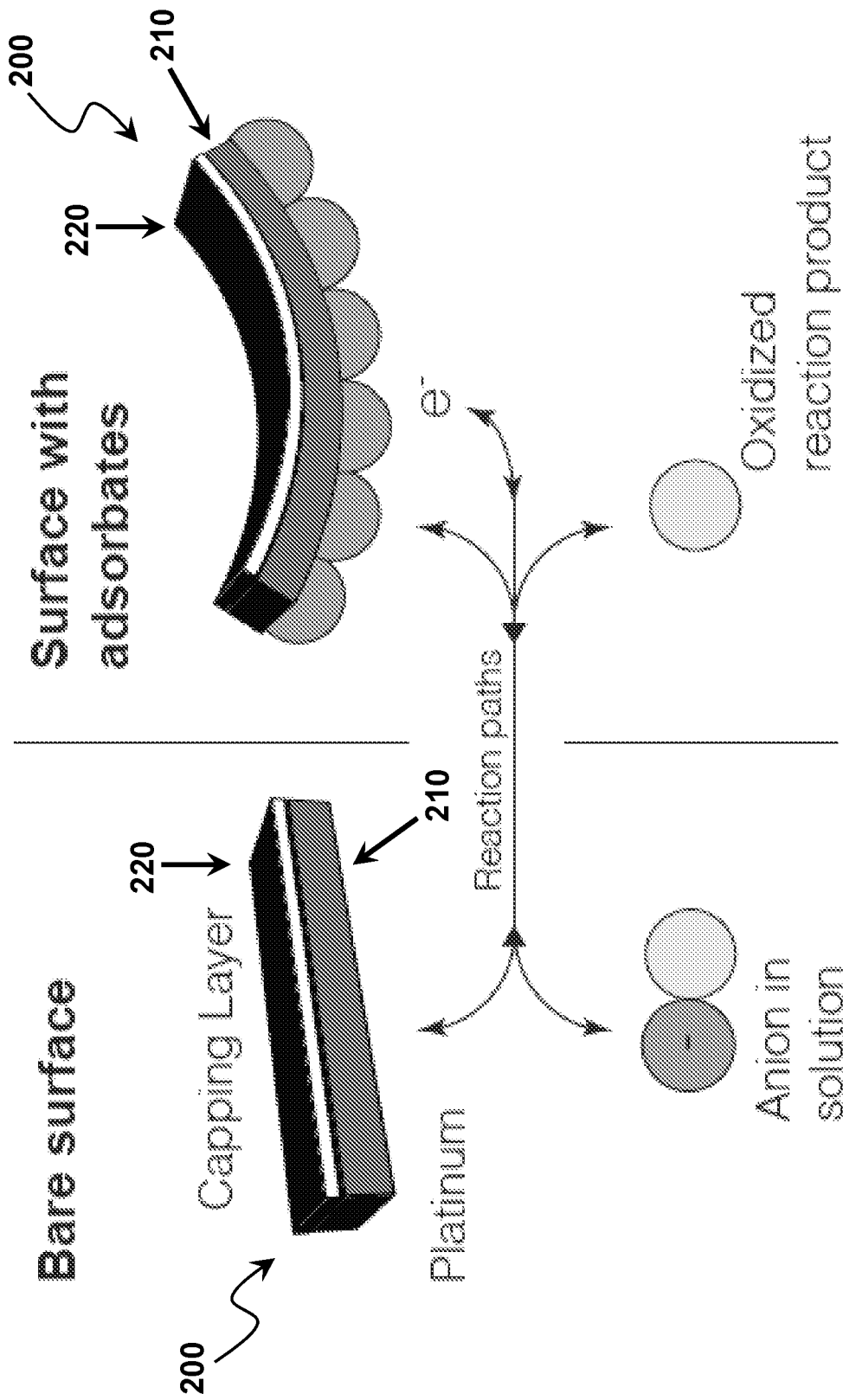
FIG. 2A shows a schematic illustration of a surface electrochemical actuator (SEA) bending in response to electrochemically-driven adsorption.

FIG. 2A shows a schematic illustration of an example of a SEA 200 that is controlled to bend in response to electrochemically-driven adsorption. The actuator 200 includes a first metal (e.g., Pt) layer 210 and a second layer 220 of inactive material disposed along at least a portion of the surface of the first layer 210. This layered structure can be used to provide a reversible electrochemical process is controlled by a potential between the actuator 200 and an electrolyte in which the actuator 200 is at least partially immersed. Where the metal layer 210 such as platinum can electrochemically interact with an electrolyte material to cause a change in the difference in the stresses in the layered structure to cause bending in response to an applied voltage. As shown in FIG. 2A, in some embodiments, the metal layer 210 can have a thickness on the order of several nanometers. In other embodiments, the average thickness of the layer 210 can be between 0.1 nm and 100 nm. In some implementations, the metal of the first layer 210 has a first surface stress and the inactive material of the second layer 220 has a second surface stress that is different from the first surface stress. For many applications, platinum (Pt) exhibits desired electrochemical behavior for SEAs. Other metals may also be used, such as adjacent metals around platinum in the periodic table, including, e.g., noble metals in the platinum group which includes, in addition to platinum, ruthenium, rhodium, palladium, osmium, and iridium. Other adjacent metals such as gold (Au) and silver (Ag) may also be used.

Figure 2B:
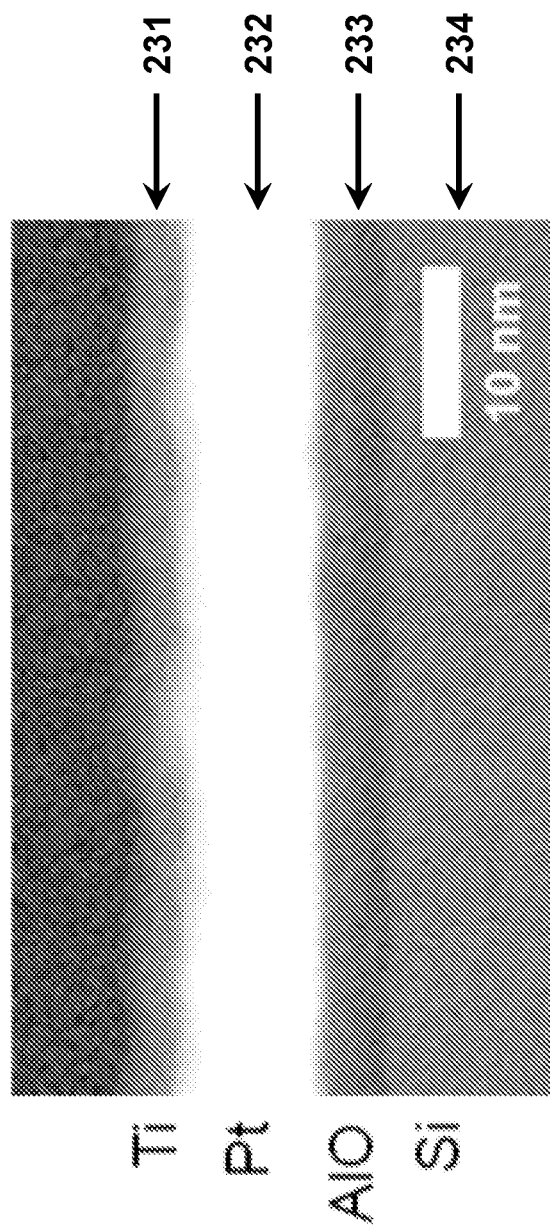
FIG. 2B shows an example cross-sectional transmission electron microscopy (TEM) image of an example Pt—Ti SEA stack.
Figure 2C:
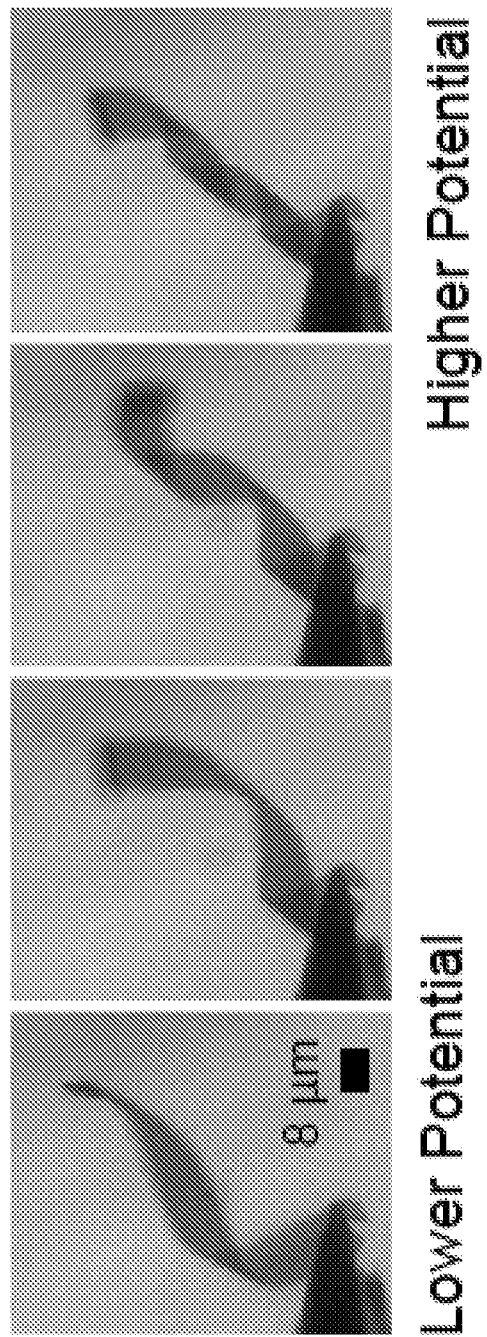
FIG. 2C shows an example series of images illustrating a SEA in operation.

FIG. 2B shows a cross-sectional transmission electron microscopy (TEM) image of an example of a Pt—Ti SEA stack for a surface electrochemical actuator. The layer of platinum 232 is about 7 nm thick, while the layer of Ti 231 is about 3 nm thick. The platinum layer 232 is grown on a layer of $Al_2O_3$ (233) deposited on a silicon substrate 234 (FIGS. 3A-3D) using atomic layer deposition (ALD), the exposed surface is capped with an inactive material (e.g., graphene or sputtered titanium (231)), and patterned them using lithography. Once released, the SEAs bend, both due to prestresses in the device (FIG. 3E) and the difference in surface stress between the platinum and the capping layer. A controlled actuation can be achieved by applying a control voltage: when electrically biased relative to the surrounding aqueous electrolyte, ions adsorb/desorb from the platinum surface, changing the surface stress. FIG. 2C shows a SEA in operation: at more negative electrical potentials, the SEA is curled less while at more positive potentials it is curled more.

Figure 2D:
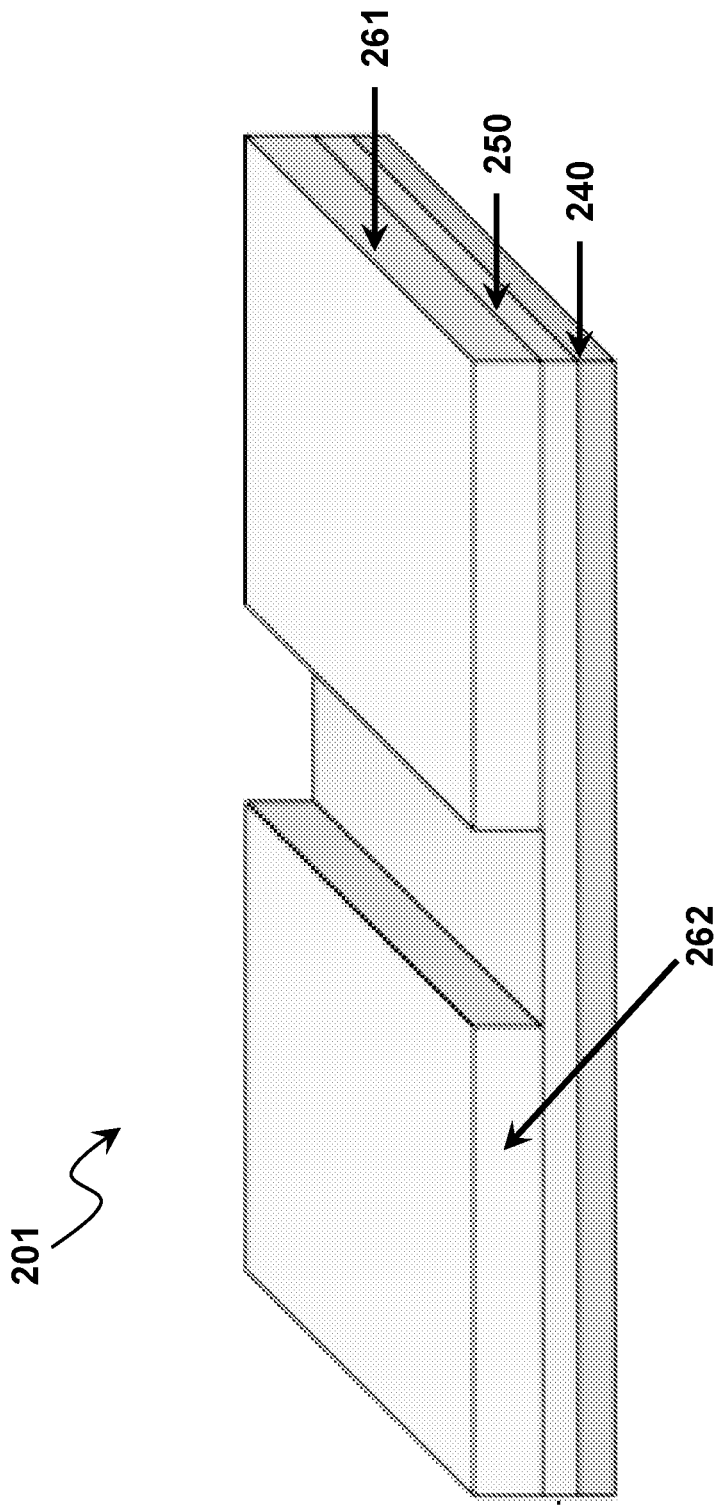
FIG. 2D shows a schematic of an example embodiment of a SEA according to the technology disclosed in this patent document.

FIG. 2D shows a schematic of an example embodiment of a surface electrochemical actuator (SEA) 201 according to the technology disclosed in this patent document. The SEA 201 includes a platinum layer 250. The SEA 201 also includes a layer of an inert material (e.g., titanium or graphene) 240 that is disposed on at least a part of the platinum layer 250 on a first side of the platinum layer 250.

The SEA 201 further includes one or more panels (e.g., plastic panels) that are disposed on the platinum layer 250. Such panels are generally rigid and spaced from each other to leave a gap between two adjacent panels. The section of the SEA 201 at such a gap is flexible and can bend while the sections with the rigid panels are generally rigid or less bendable in comparison with the section at the gap. Specifically, FIG. 2D shows two panels 261 and 262 that are disposed on a second side of the platinum layer 250 that is opposite to the first side of the layer 250. In other example embodiments, the panels can be disposed on the same side of the platinum layer 250 on which the layer 240 of the inert material is disposed. In some example embodiments, the panels are disposed directly on the platinum layer. Each of the panels 261 and 262 is structured to prevent the part of the platinum layer 250 which is in contact with the panel from bending under application of the actuation voltages to the SEA 201. That can be achieved through using an appropriate rigid material (e.g., a rigid plastic material) for the panels and/or through using appropriate panel dimensions (e.g., thickness, width, length). Application of the actuation voltages to the platinum layer 250 of the SEA 201 that is disposed in a liquid (e.g., water) can lead to adsorption of one or more chemical species (e.g., $OH^-$, $O_2^-$, $O^{2-}$ etc.) on the platinum layer 250 that can lead to a change in the surface stress of the platinum layer having the adsorbed species on its surface relative to the surface stress of the layer of the inert material which, in turn, can lead to bending of the layers of platinum and inert material. Because SEA 201 cannot bend in the areas covered by the panels 261 and 262, positions of the panels on the platinum layer 250 define the areas of the SEA (that are free from the panels) where the SEA can bend under application of actuation voltages to the platinum layer 250.

Figure 2E:
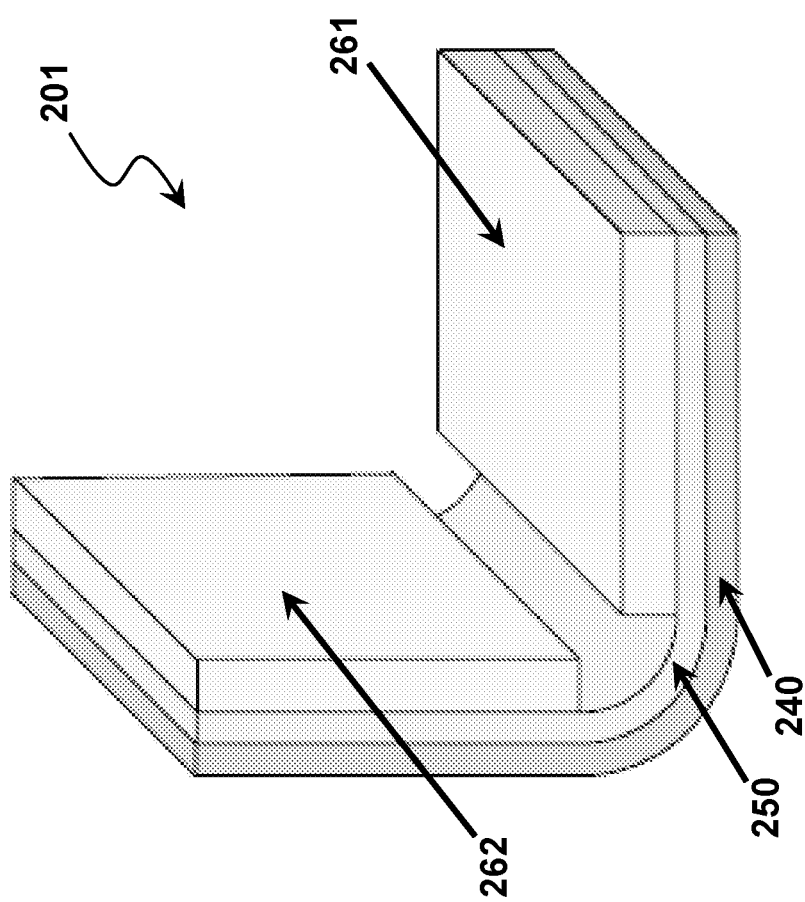
FIG. 2E shows a schematic of an example embodiment of a SEA according to the disclosed technology wherein the actuator is in an actuated state.

FIG. 2E shows a schematic of the SEA 201 in a state after application of an actuation voltage to the platinum layer 250 of the SEA 201. As shown in FIG. 2E and described above, application of the actuation voltage leads to bending of the SEA in an area between the panels 261 and 262. The area between the panels 261 and 261 can be described as a hinge around which the panels can rotate when an actuation voltage is applied to the SEA.

Figure 2F:
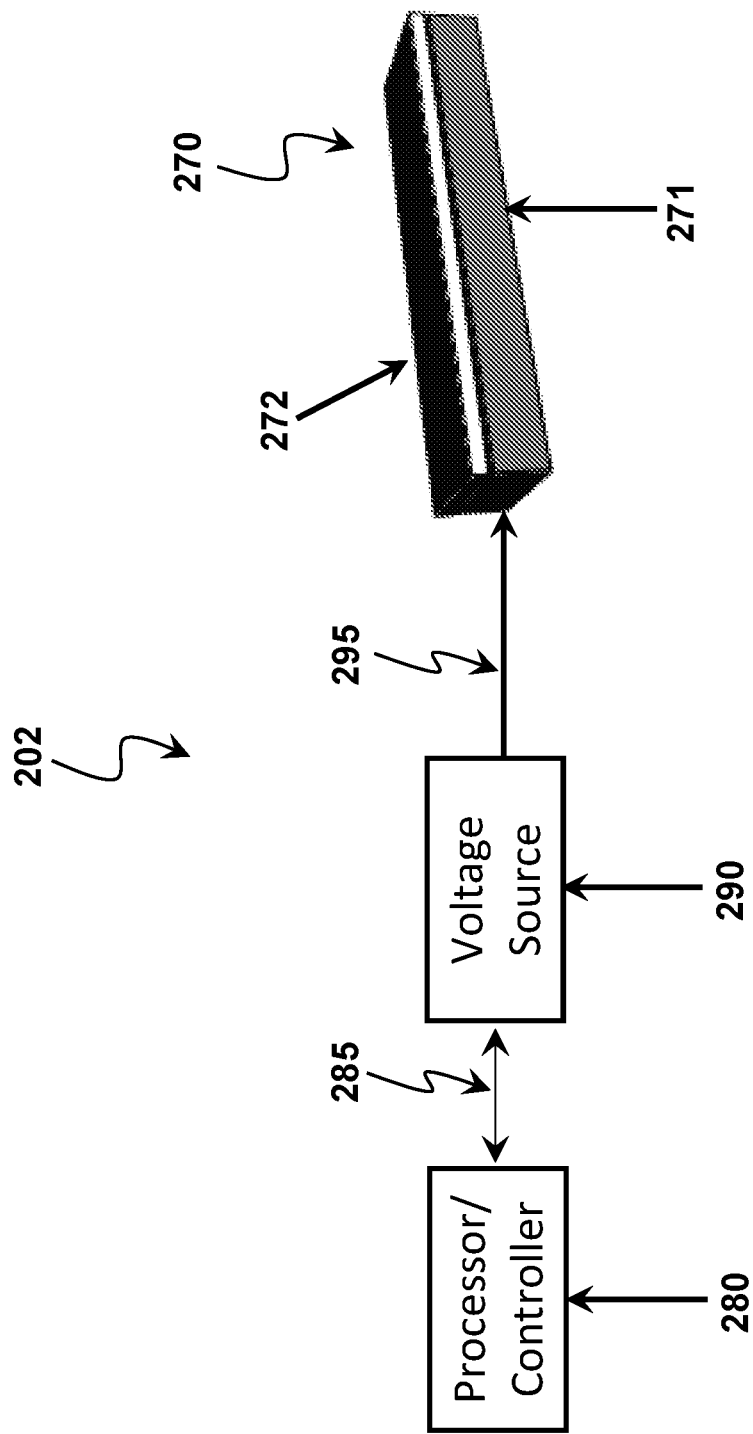
FIG. 2F shows a schematic of an example embodiment of a system according to the disclosed technology.

FIG. 2F shows a schematic of an example embodiment of a system 202 according to the disclosed technology. The system 202 includes a SEA element 270 according to the disclosed technology. The SEA 270 includes a metal (e.g., Pt) layer 271 and a layer 272 of an inert material (e.g., Ti or $TiO_2$ or graphene) disposed on at least a part of the metal layer 271. The system 202 further includes a processor or controller 280 that is configured to control a voltage source (or power supply) 290, as shown by a (bi-directional) communication and/or control link 285 between the processor/controller 280 and the voltage source 290. The voltage source 290 is configured, under control of the processor/controller 280, to apply a voltage potential to the metal layer 271 of the SEA 270 so that to bias the metal layer 271 relative to a liquid (e.g., water) in which the SEA 270 is at least partially immersed. Application, by the voltage source 290, of a voltage to the metal layer 271 of the SEA 270 (shown by the arrow 295 in FIG. 2F) leads to actuation of the SEA which results, e.g., in a change of the SEA curvature. The voltage source 290 can include, for example, a photovoltaic element, a battery, or an AC-to-DC converter.

Figure 2G:
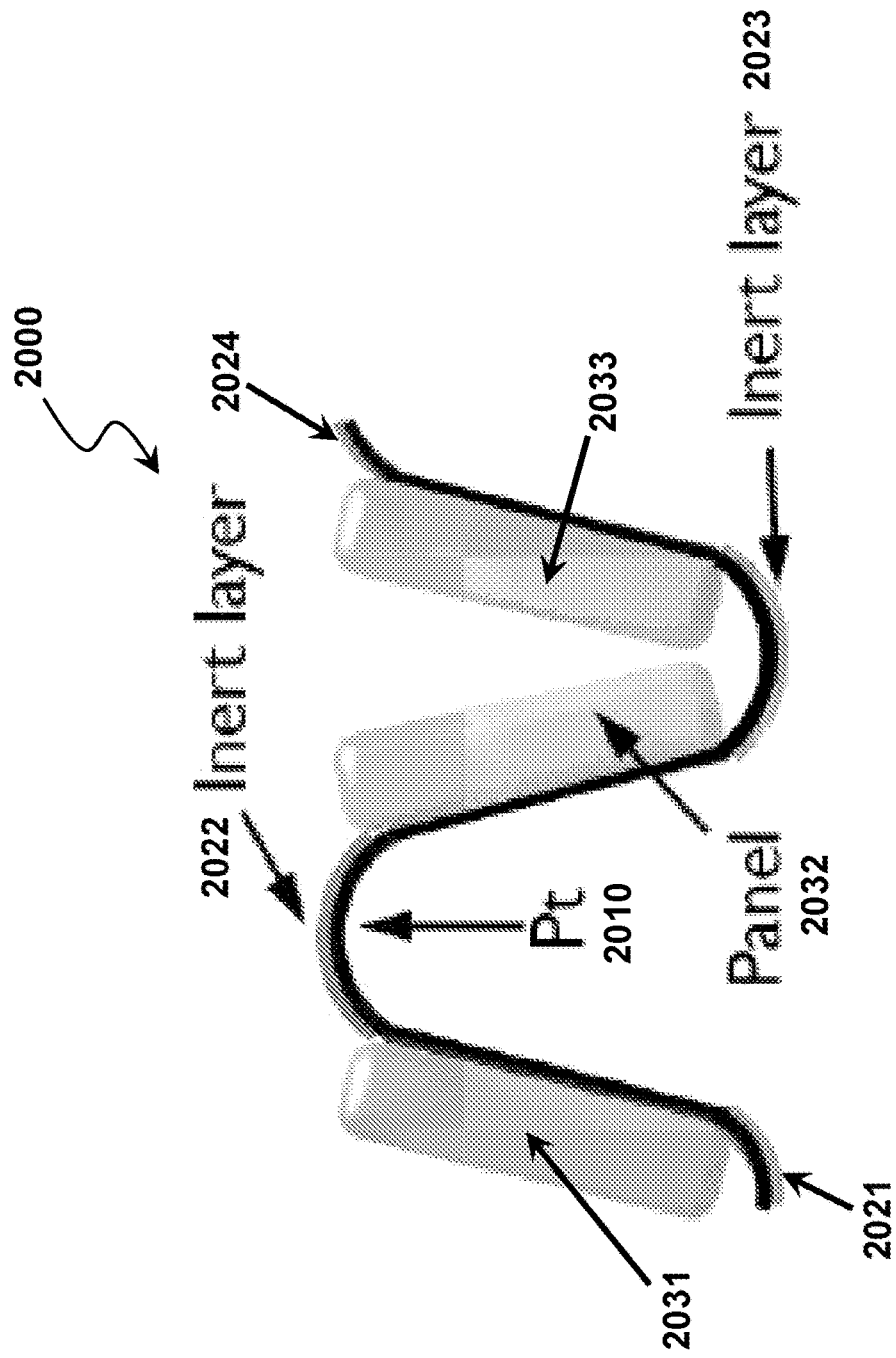
FIG. 2G shows a schematic of a cross-section of an example embodiment of a bi-directional SEA according to the disclosed technology.

The SEA structures shown in FIGS. 2A, 2D and 2E can be used in various configurations to cause desired movements or actuations. For a given platinum metal layer, segments of an inert material (e.g., Ti) and rigid panels of the SEA may be placed at different locations on one side of the platinum metal layer in some applications. In other applications, segments of the inert material (e.g., Ti) and rigid panels of the SEA may be placed at different locations on two sides of the platinum metal layer to create desired bending or movement. FIG. 2G shows a schematic of a cross-section of an example embodiment of a bi-directional SEA 2000 according to the disclosed technology. Positions of at which the SEA bends or folds, as well as directions in which the SEA 2000 bends or folds at those positions, can be determined by the pattern of deposition of the patches of the inert (e.g., Ti) layer and rigid panels of the SEA on the metal (e.g., Pt) layer of the SEA. SEA 2000 includes a layer of platinum 2010. The SEA 2000 further includes panels 2031, 2032, and 2033 (made of, e.g., a rigid plastic material) disposed on the platinum layer 2010. FIG. 2G shows that all the panels are disposed on the same side of the layer 2010. In other SEA embodiments according to the disclosed technology, some of the panels can be disposed on a first side of the metal layer of the SEA while other panels can be disposed on a second side of the metal layer which is different from (e.g., opposite to) the first side. SEA 2000 further includes layers or patches 2021, 2022, 2023, and 2024 of an inert material (e.g., Ti or $TiO_2$, or graphene or any other inert material) that are disposed on the platinum layer 2010 between the panels 2031-2033. As shown in FIG. 2G, layers 2022 and 2024 of the inert material are disposed on the same side of the layer 2010 on which the panels 2231-2233 are disposed while layers 2021 and 2023 of the inert material are disposed on the side of the platinum layer 2010 that is opposite to the side having the panels 2031-2033. As illustrated in FIG. 2G, arrangement of the panels as well as patches or layers of the inert material on the platinum layer 2010 determines the locations at which the SEA 2000 will bend in response to application of an actuation voltage to the SEA as well as determines direction in which the SEA will bend at each bending location. As shown in FIG. 2G, under application of an actuating voltage, the SEA 2000 will bend in a SEA region between the panels 2031 and 2032 in the direction from the inert layer 2022 toward the metal layer 2010. As further shown in FIG. 2G, under application of an actuating voltage, the SEA 2000 will also bend in a SEA region between the panels 2032 and 2033 in the direction from the inert layer 2023 to the metal layer 2010. As also shown in FIG. 2G, the directions of bending in the mentioned SEA regions are opposite to each other. Note that in other embodiments, the direction of SEA bending can be from the metal layer of the SEA toward an inert layer of the SEA that is disposed on the metal layer. The technology disclosed herein is not limited to the example arrangement of the panels and inert material illustrated in FIG. 2G and other arrangements of the panels and/or the inert material can be provided to enable bending of the SEA devices according to the disclosed technology at one or more desired bending locations in one or more desired bending directions.

Figure 3B:
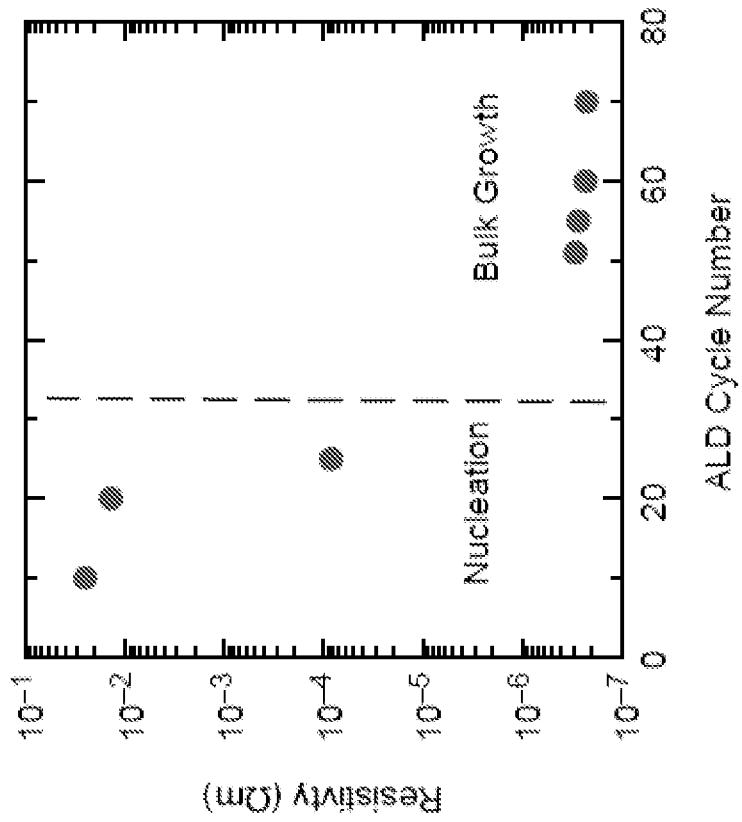
FIG. 3B shows an example dependence of results of resistivity measurements for a platinum layer as a function of the number of ALD cycles.
Figure 3A:
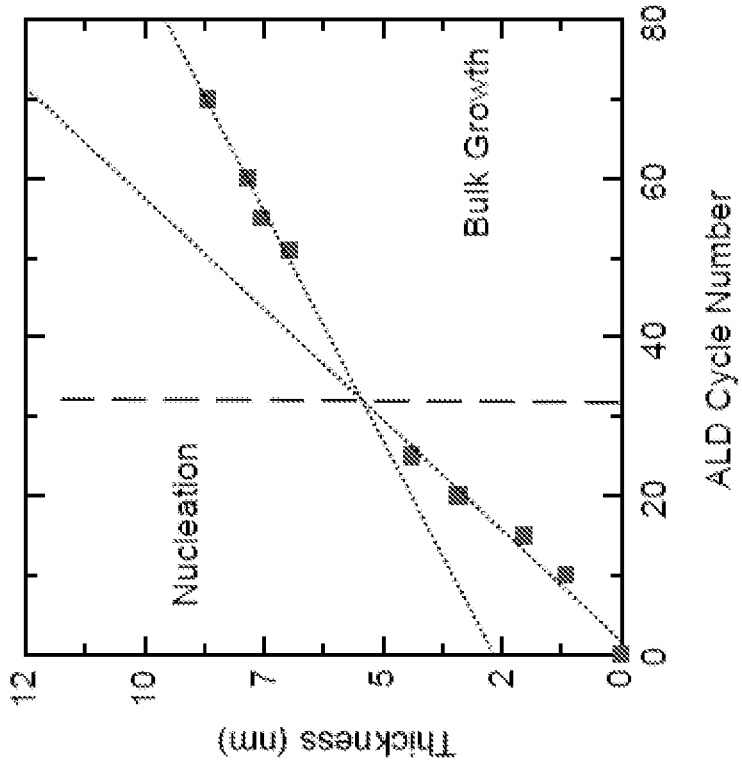
FIG. 3A shows an example dependence of the thickness of a platinum layer on the number of atomic layer deposition (ALD) cycles.

Various structural measurements may be used to characterize SEAs structure and thickness. For example, the X-Ray Reflectometry (XRR) may be used for thickness and resistivity measurements to characterize the ALD platinum layer growth as a function of the number of ALD cycles. FIG. 3A shows an example of measurements on the dependence of X-Ray Reflectometry (XRR) measurements of the thickness of an ALD platinum layer as a function of the number of growth cycles of ALD. The first 30 cycles are a nucleation phase where the film grows rapidly in thickness. Once the surface is covered in platinum, a bulk growth phase begins at a slower rate. FIG. 3B shows an example of resistivity measurements (via four-point probe) as a function of ALD cycle number. The drop in resistivity after about 30 cycles is used as an indicator that a continuous electrical film has formed. The growth can be separated into two phases: a nucleation phase and a bulk growth phase. Resistivity measurements (via four-point probe) confirm that there is a critical number of cycles (around 30) for a continuous electrical film to form.

Figure 3C:
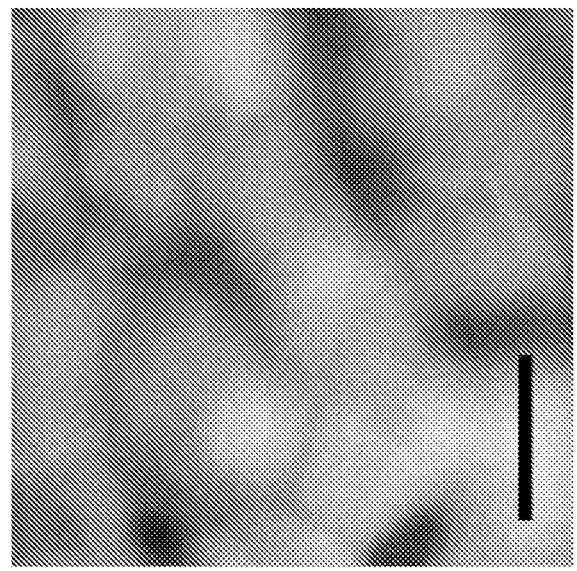
FIG. 3C shows an example cross-sectional TEM image of another example Ti—Pt SEA structure.
Figure 3D:
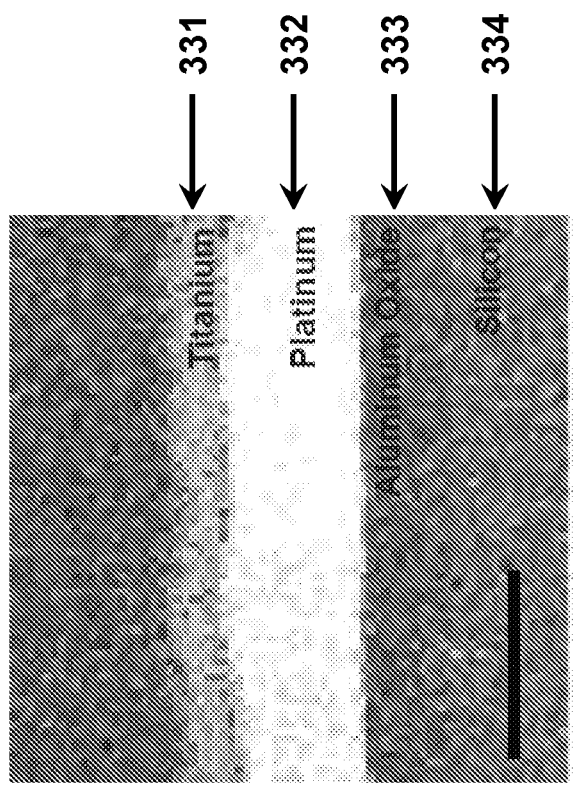
FIG. 3D shows an example in-plane TEM image of an ALD platinum film.

FIG. 3C shows a cross-sectional TEM image of another example Ti—Pt SEA structure, with colors coded by electron energy loss spectroscopy. FIG. 3D shows an in-plane TEM image of an ALD platinum film showing crystal grain sizes of approximately 10 nm. Scale bars in both images are 10 nm. To image the cross-section of the Pt—Ti bimorph using TEM (FIG. 3C), we deposit 20 cycles of aluminum oxide ($Al_2O_3$; 333) followed by 70 cycles of platinum (332) on a bare silicon wafer (334). Then, we sputter 3 nm of titanium (331) on top of the platinum (332) to form a SEA. We next put an amorphous carbon layer (e.g., Sharpie marker) on top of the titanium to protect samples. We mill a thin cross-sectional lamina from the top of the sample using an ion beam (Thermo Fisher Helios G4 UX FIB) and attach it to a copper TEM grid by using a nanomanipulator. Finally, we use an ion beam to thin the lamina to electron transparency. To create the electron energy loss spectra (EELS) image and spectra for the cross-section of the sample (FIG. 3C), we collect data with a Gatan Quefina dual-EELS spectrometer using 0.25 eV per channel. For in-plane TEM imaging (FIG. 3D), we deposit 70 cycles of platinum on an 80 nm-thick silicon nitride membrane supported by silicon (from Greater Grids). We then image the layers in STEM mode on a probe-corrected TEM (Thermo Fisher Titan Themis Cryo S/TEM) at 120 kV.

Figure 3E:
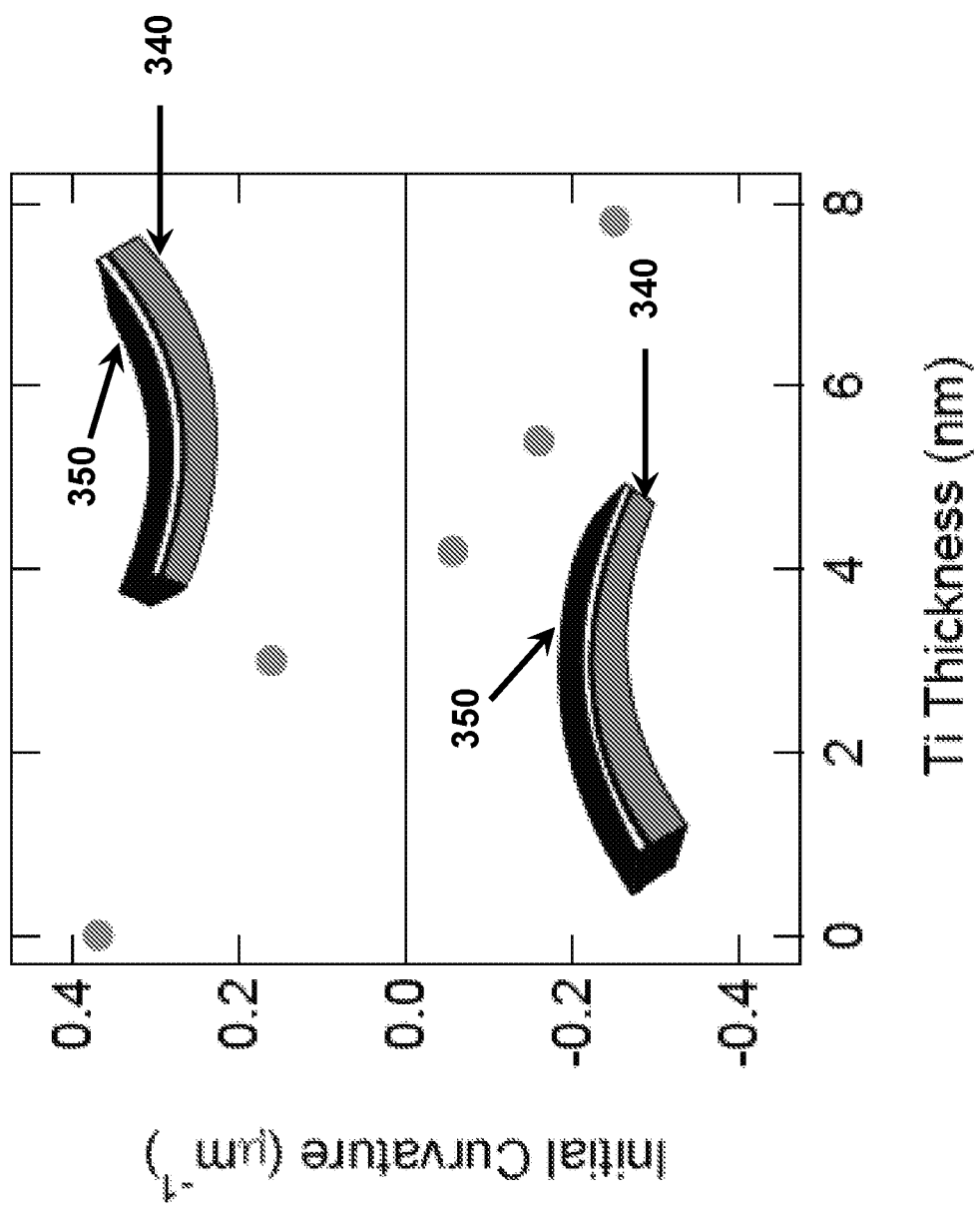
FIG. 3E shows an example plot of the curvature of an example Ti—Pt SEA in the absence of any applied voltage bias as a function of the titanium layer thickness.

The curvature in a SEA is set by both adsorption of ions and prestresses built up during fabrication. FIG. 3E shows a plot of the curvature of an example Ti—Pt SEA in the absence of any applied voltage bias as a function of the titanium layer thickness. The SEA includes a platinum layer 340 and a titanium layer 350. The curvature varies continuously from positive to negative as the thickness of the Ti layer 350 is increased. Since the voltage is fixed to the open circuit potential, this effect is largely due to prestress. The sign of the curvature inverts around 4 nm Ti thickness. Overall, the prestress provides an added level of control over the 3D structure formed using SEAs and rigid panels.

SEAs can be operated in three regimes of SEA actuation: a first regime being associated with hydrogen adsorption (e.g., adsorption of protons, $H^+$), a second region being associated with the adsorption of oxygen species (e.g. $OH^-$, $H_2O$, $H_2PO_4^-$, $O^{2-}$), and a third regime being associated with surface oxidation (FIGS. 4A-B and 5A-B). Both adsorption and oxidation can lead to swelling of the platinum surface, consistent with the behavior seen in macroscale platinum electrochemical actuators.

Sample SEAs were made and tested using a computer controlled DC voltage source (Yokagawa 7651). One lead of the voltage source is wired to a high impedance platinum iridium microprobe (Microprobes for life science). The probe is coated with a protective coating layer such as a polymer (e.g., paralyne) to exposure only a small area (e.g., ~1 $um^2$) of the tip, guaranteeing the majority of current measured comes from the test device (~100 $um^2$ area). The second lead from the voltage source is wired to a Ag/AgCl pellet, ~1 mm in size (purchased from Warner Scientific). The large size ratio between the actuator and the pellet makes the actuator the highest impedance element in the circuit. Thus, applied voltages are almost entirely borne by the actuator. To measure current simultaneously with voltage, we introduce, in series with the voltage source, with a preamplifier (Ithaco 1211) sharing a common ground and record the preamp output with an oscilloscope (picoScope 5200). The low currents flowing through the system (nA), eliminate the need for a three-electrode system (as is typical for ultramicroelectrodes).

FIG. 4A, upper panel shows a cyclic voltammogram (CV) for a Ti—Pt SEA over a large voltage range versus Ag/AgCl, swept at 1 V/s. Standard features of Pt electrochemistry are observed: hydrogen adsorption and desorption peaks from about −0.5 to −0.9 V and a broad peak at positive voltages that includes both oxygen-species adsorption and later oxidation of the platinum. When the sweep voltage returns from the oxidation regime, there is an oxide reduction peak at about −0.3 V. FIG. 4A, lower panel shows the curvature of a SEA over the same range, showing strong hysteresis in the Pt oxidation regime. All measurements were performed in phosphate buffered saline solution.

FIG. 4B, upper panel shows a cyclic voltammogram for a Ti—Pt SEA, sweep rate 400 mV/s, over a narrower sweep range, avoiding oxidation of the Pt. We find the CV is relatively reversible in both the hydrogen and oxygen adsorption/desorption regimes. FIG. 4B, lower panel shows the curvature of a SEA over the same quasireversible range of voltages. Measurements show two branches of actuation, the hydrogen and oxygen-species adsorption regimes, each with a small amount of hysteresis. All measurements were performed in phosphate buffered saline solutions.

SEAs bend in response to three different electrochemical effects or mechanisms: adsorption of hydrogen, adsorption of oxygen species, and electrochemical oxidation, as shown in FIG. 2A and FIGS. 4A-B. Each of these mechanisms occurs at a different applied voltage relative to the solution, and each effect is documented in the electrochemical literature. At large positive voltages, the Pt oxidizes, and both the cyclic voltammogram and the SEA curvature are highly hysteretic (FIG. 4A). FIG. 4B shows a cyclic voltammogram and corresponding curvature for a platinum-titanium SEA over a voltage range covering the two quasi-reversible regimes of adsorption. Hydrogen and oxygen-species adsorption/desorption occur in ranges −0.8V to −0.5V and −0.2 V to 0.2V vs Ag/AgCl, respectively, consistent with results for bulk platinum.

Figure 5B:
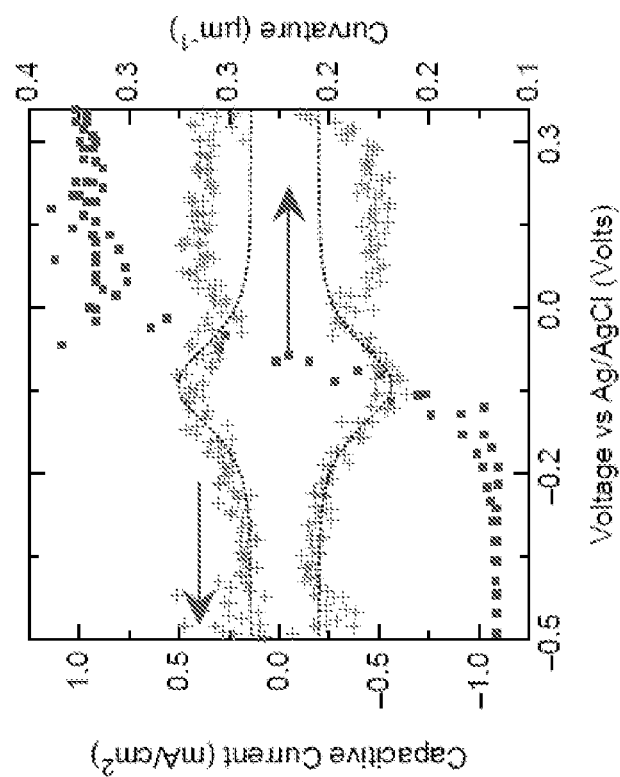
FIG. 5B shows example plots of the curvature (dots) and capacitive portion of the current response (pluses) for a graphene-Pt SEA.
Figure 5A:
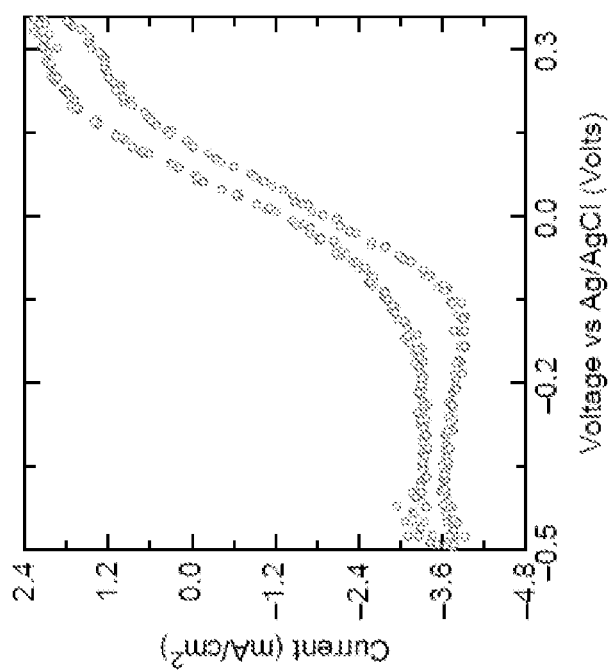
FIG. 5A shows an example cyclic voltammogram for a graphene-Pt SEA.

FIG. 5A shows a cyclic voltammogram at a sweep rate of 400 m V/s for a graphene-Pt SEA that is 70 µm long and 13 µm wide over the voltage range used here to actuate the robots: the oxygen-species adsorption/desorption regime. The current is dominated by the Faradic electrochemical processes at the Pt-electrolyte interface.

FIG. 5B shows the SEA curvature (dots) and the capacitive portion of the current response (pluses). The latter is obtained by removing current that does not depend on the voltage sweep direction by fitting an interpolating polynomial to the forward and backward sweeps individually, and then averaging the two curves and finally subtracting this contribution. This approach assumes a rapid decay of RC transients that occur when the voltage sweep changes the direction. The capacitive current probes both the double-layer capacitance and any charge transfer processes associated with surface adsorption. Measurements indicate the presence of a peak in the capacitive current in the same voltage region where SEAs bend. This peak is associated with charge transfer from the oxygen species upon adsorption. The dashed lines are a fit to a standard adsorption model $$I_c = \frac{e^2 \alpha \Omega}{k_B T n} \frac{\exp\left[\frac{-e}{k_B T n}(V - V_0)\right]}{\left(1 + \exp\left[\frac{-e}{k_B T n}(V - V_0)\right]\right)^2}$$

where $\Omega$ is the density of bonding sites for adsorbates and a is the voltage sweep rate. Fitting the peak near bending yields a surface charge due to the adsorption in the oxygen regime of $e\Omega \sim 130$ µC/cm$^2 \sim 8$ charges/nm$^2$. This is consistent with previous measurements of oxygen-species adsorption. For example, literature values for H$_2$O/OH— adsorption range from 110 µC/cm$^2$ to 160 µC/cm$^2$, while phosphate ions adsorb to a maximum density of 137 µC/cm$^2$.

FIG. 6A shows curvature of a 70 µm×16 µm SEA bending around the long axis versus voltage. Bending takes place over a narrow range of voltages, roughly 200 mV. FIG. 6B illustrates actuation of a SEA over many repeated cycles. The SEA response to the applied voltage is highly reproducible with the SEA cycling hundreds of times without degradation. FIG. 6C shows the characteristic response time for switching of a SEA between the flat and curled configurations in response to a step in the actuation voltage (here a step between −0.2V to −0.1V) for a 55 µm×10 µm SEA bending around its short axis. Response times are between 10 ms and 100 ms and are set by the stiffness of the actuator and the viscosity of the liquid.

The actuation in the oxygen-species adsorption regime can be achieved at lower applied voltages since the curvature change is larger than for hydrogen adsorption. This actuation is highly reproduceable. In this regime, actuators reversibly bend from flat to curled over a span of roughly 200 mV (FIG. 6A) and consume less than 10 nW of power, set by background Faradaic currents between the actuator and the electrolyte (FIGS. 5A-B). Typical curvatures, $R_c^{-1}$, are on the order of microns (FIG. 6A) and are well-described by a single species adsorption process:

$$R_c^{-1} = \frac{\gamma_m t}{2D} \frac{1}{1 + \exp\left[\frac{-e}{k_B T n}(V - V_0)\right]}$$

where V is the applied voltage, t is the SEA thickness, D is the bending energy, $\gamma_m$ is change in surface stress from the maximum density of adsorbate on the platinum, n is a phenomenological non-ideality factor, and $V_0$ is an offset voltage set by the free energy of adsorption, electrode composition, and solution chemistry. For the data shown in FIG. 6A, n is approximately 1.2, which is close to ideal adsorption behavior.

Our conducted measurements on sample SEAs further show that D=5×10$^{-15}$ J and $\gamma_m$=0.3 N/m, consistent in scale with previous work and material properties for bulk platinum. In this regime, SEAs can cycle repeatably without measurable degradation (FIG. 6B) and respond in ~10-100 ms (FIG. 6C), limited by the viscous drag of the fluid and the stiffness of the cantilever. The maximum force output is on the order of nanonewtons, about 10× larger than typical optical trap forces, comparable to those involved in cell movement, and more than enough to lift and move the 50 pN weight of the robot's body (adjusted for buoyancy). Broadly, SEAs can be used in an application where a micron-scale actuation is needed. Furthermore, an electrical power source capable of supplying voltages of 200 mV and ~10 nW of power can function as a controller and such a controller can be implemented with standard silicon microelectronics.

These results show that SEAs meet all the requirements for electronically controlled, microscale robot actuators: small radii of curvature, low-voltage actuation, low power, significant force output, and robustness. Piezoelectric actuators have not been scaled thin enough to operate at micron radii of curvature. Thermal actuators, though useful in MEMS and millimeter scale robots, are inefficient and difficult to address uniquely at small sizes due to the rapid diffusion of heat. Microactuators built using conducting polymers have similar characteristics in terms of voltage, power, and curvature because they too exploit electrochemically induced stresses. However, conducting polymer materials are harder to integrate in a silicon processing environment because they are damaged by standard chemicals for microfabrication, in particular solvents, developer, and etchants. In addition, actuators based on optical, acoustic, magnetic, thermal, or chemical fields have been used in micro-swimmers, grippers, and other machines at the cellular scale, but it can be challenging to control those actuators via onboard electronics.

Figure 7A:
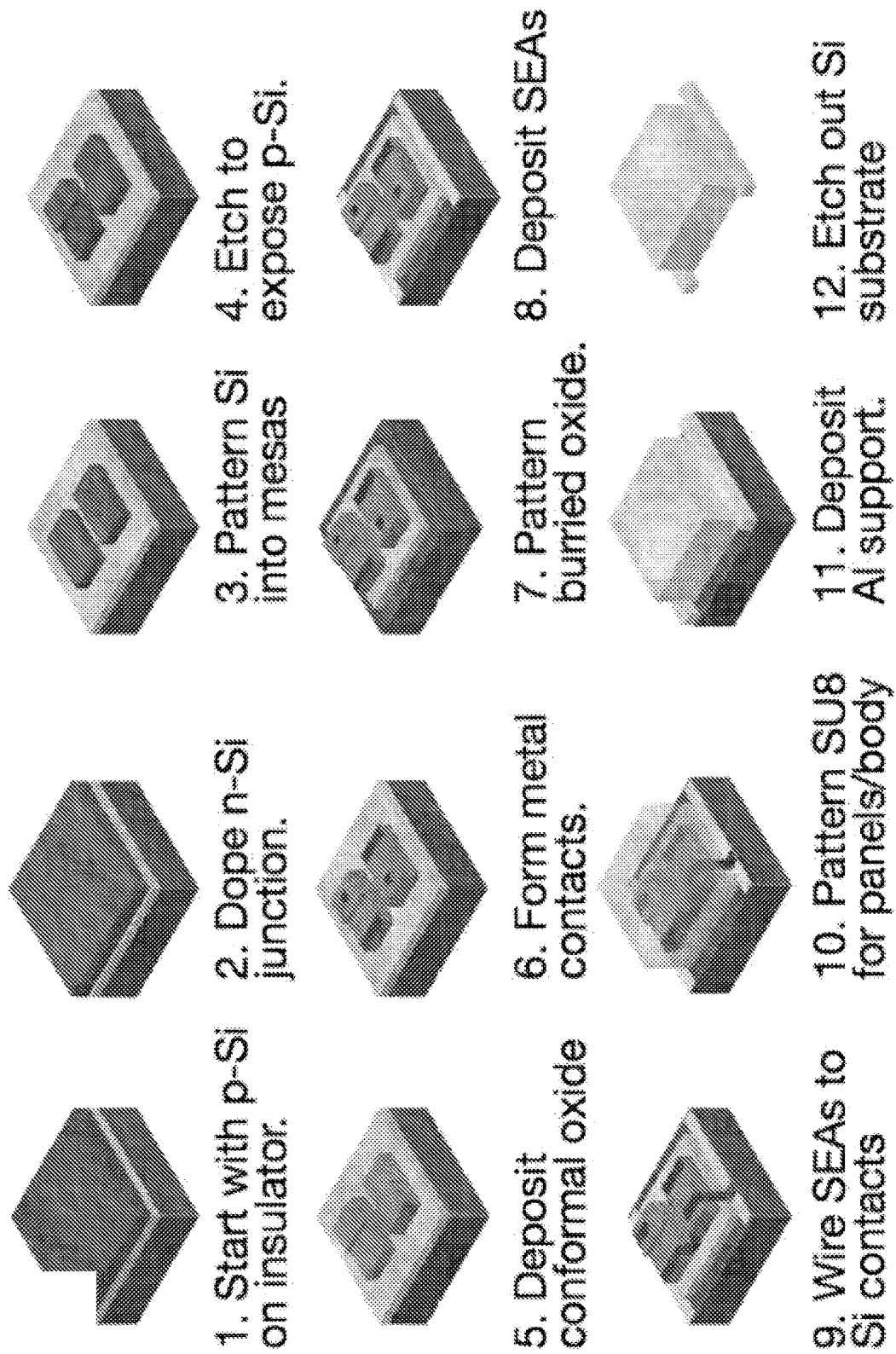
FIG. 7A illustrates steps of an example method of fabrication of a microscopic robot according to an embodiment of the technology disclosed in this patent document.
Figure 7B:
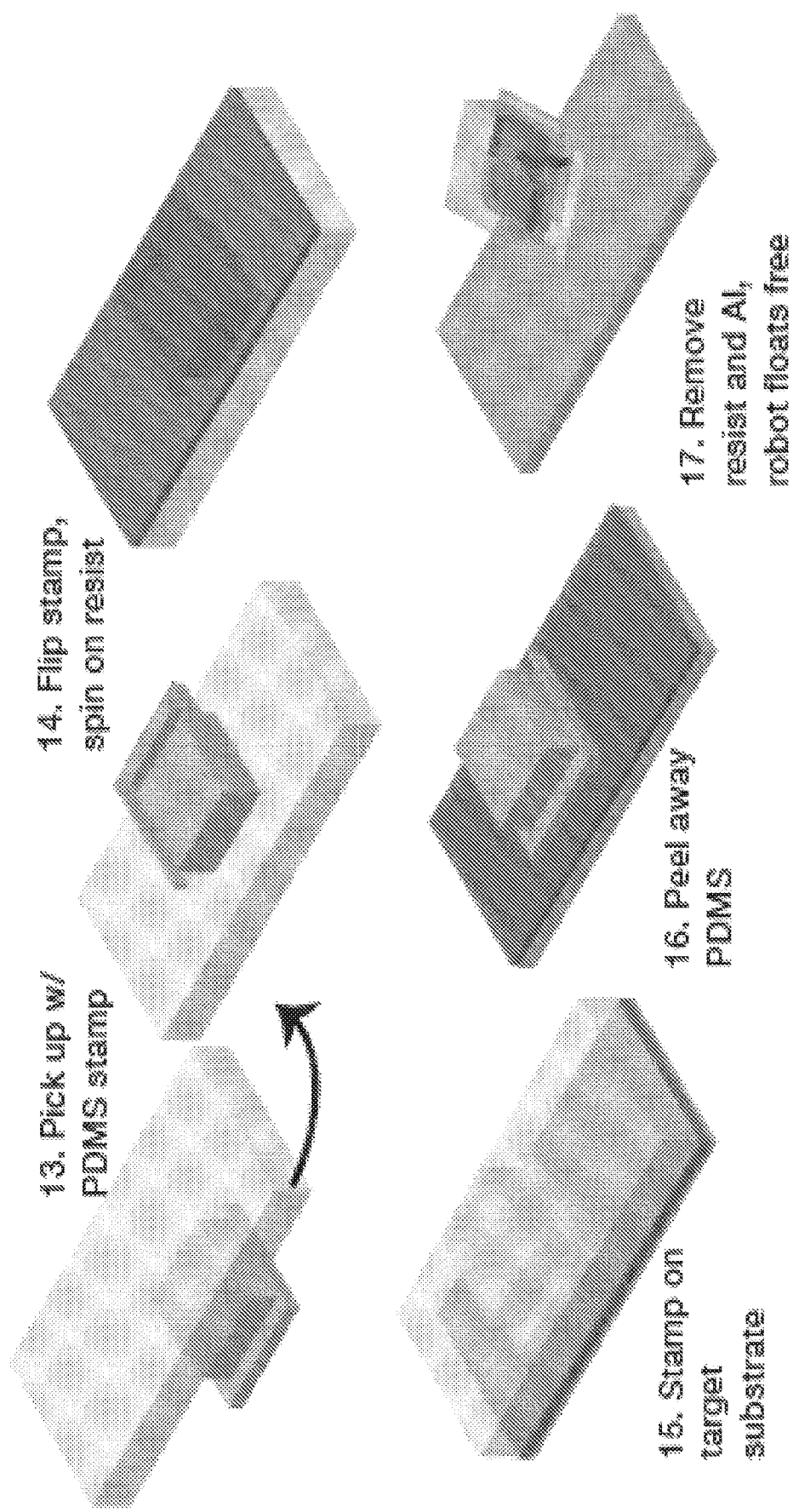
FIG. 7B illustrates example release steps of an example method of fabrication of a microscopic robot according to an embodiment of the technology disclosed in this patent document.
Figure 7C:
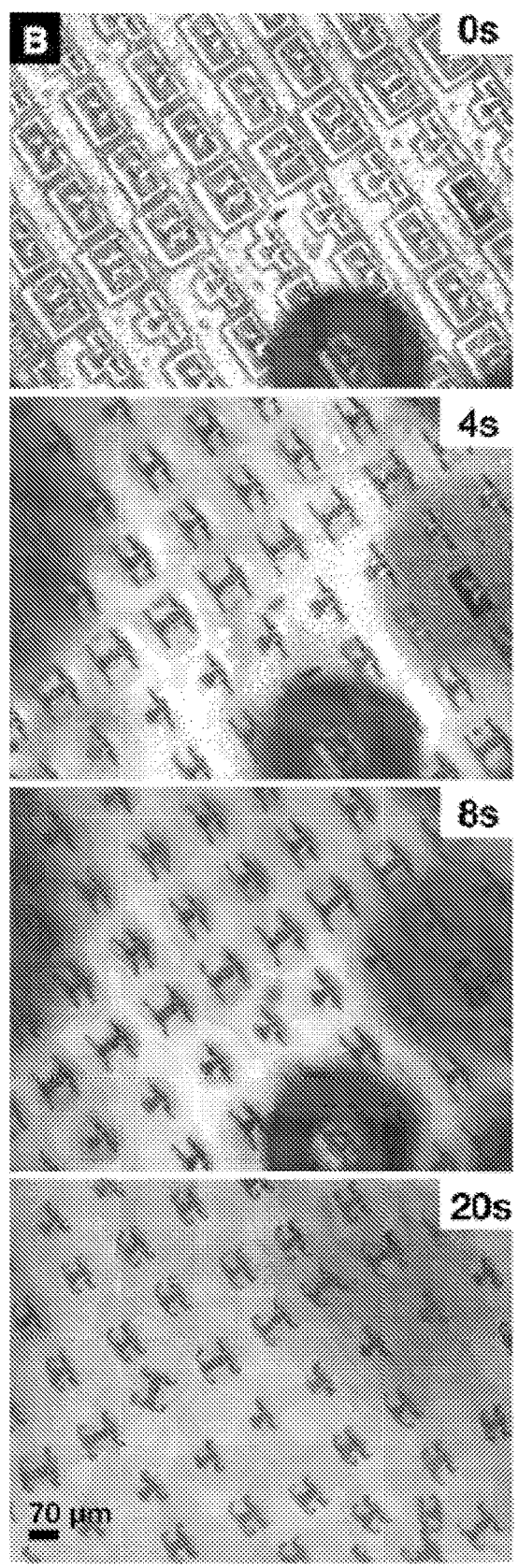
FIG. 7C shows example optical images taken during a robot release process according to the disclosed technology.
Figure 7D:
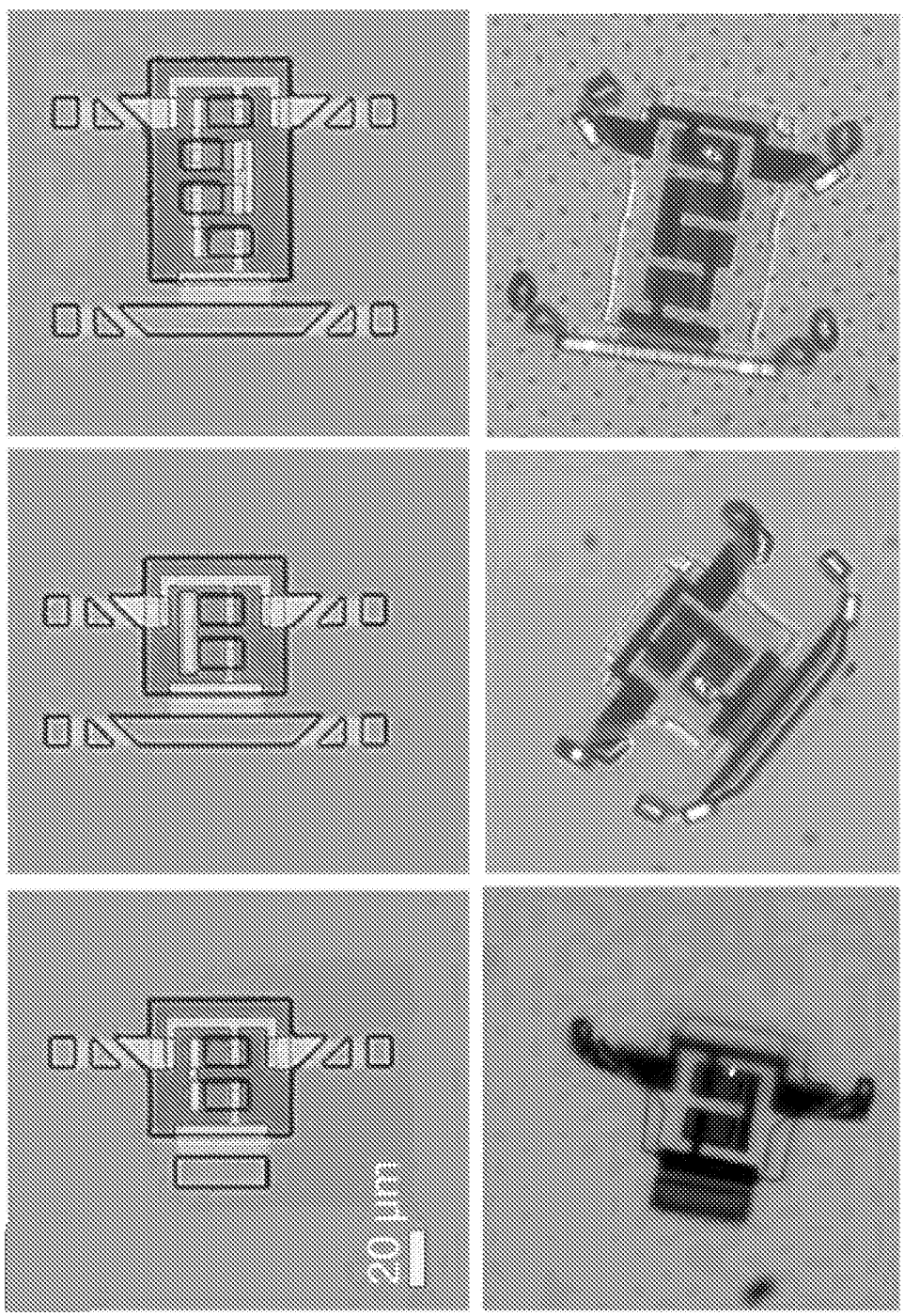
FIG. 7D shows example optical images of three example robot designs according to the disclosed technology before and after release.

FIGS. 7A-C illustrate steps of a method for fabricating microscopic robots according to an embodiment of the technology disclosed in this patent document. FIG. 7A shows a schematic of the fabrication process. It features three main steps: fabricating the electronics, fabricating the legs, and releasing the devices. Main fabrication steps are done at the wafer level, while release steps are typical done on diced chips. FIG. 7C shows optical images of the release process. In 20 seconds, robots go from bound to the surface to freely floating, folded, and ready to walk. The yield is roughly 90%. FIG. 7D shows optical images of three robot designs before and after release.

To demonstrate the potential of the disclosed SEA technology, a microscopic robot capable of walking was fabricated with photovoltaic devices to enable control by a sequence of laser pulses, as illustrated in FIGS. 1C-D. The fabrication of this walking robot begins with a p-type silicon-on-insulator (SOI) wafer, and then steps for ion doping, lithography, and metallization (FIG. 7A steps 1-7) are used to create the robot's onboard circuitry, in this case the silicon photovoltaics (characterized in FIGS. 7E-G) and associated wiring. The process starts with a p-type silicon-on-insulator (SOI) wafer and includes the steps of doping n-Si junction, patterning Si into mesas, etching to expose p-Si, depositing conformal oxide, forming metal contacts, as well as patterning buried oxide.

Once the silicon processing is complete, we deposit and pattern the legs, first building the SEAs and wiring the SEAs to Si contacts (FIG. 7A steps 8 and 9) followed by patterning SU8 for the rigid panels (FIG. 7A, step 10). In this example, the processes for fabricating the legs with actuators and panels are performed after the fabrication of the electronic elements is completed. The fabrication steps for forming the legs can be controlled by setting process temperatures low (e.g., less than 50° C.) so that the fabrication steps do not harm the previously fabricated electronics and are fully compatible with accommodating more complex CMOS in the future. This fabrication sequence can be used to construct a broad range of CMOS electronics beyond relatively simple photovoltaics elements. Such fabricated SEAs could be attached using the exact same process flow.

The last fabrication step is freeing the robots from the substrate without damage. This can be achieved by a novel three-stage process as shown in FIG. 7B. First, a sputter and pattern process is used to form a 200 nm thick layer of aluminum on top of the robots as a mechanical support (FIG. 7A step 11). Then, the underlying silicon is removed by $XeF_2$ vapor phase etching (FIG. 7A step 12). Once the robots have been undercut, a PDMS stamp may be used to pick up the robots (FIG. 7B, step 13). Next, we flip the stamp, spin-coat a photoresist adhesive layer (FIG. 7B, step 14), and stamp the resist-robot-aluminum layer onto a target substrate (FIG. 7B, step 15). The resist sticks to the substrate, attaching the robots when the PDMS is peeled away (FIG. 7B, step 16). Finally, we wet etch the aluminum and photoresist successively to release the robots into solution (FIG. 7B, step 17). Selected images from this process are shown in FIG. 7C. Typical yields are 90%. Fully formed microscopic robots are shown in FIG. 7D.

Figure 7E:
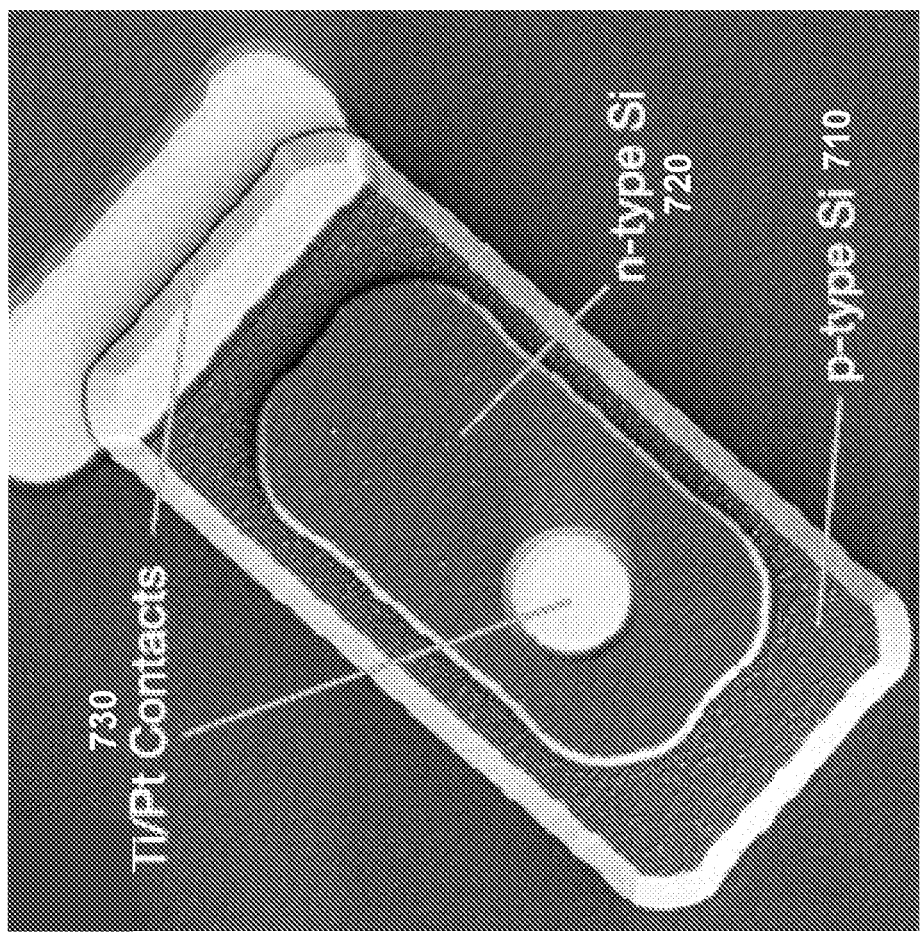
FIG. 7E shows an example SEM image of a silicon photovoltaic according to the disclosed technology.
Figure 7F:
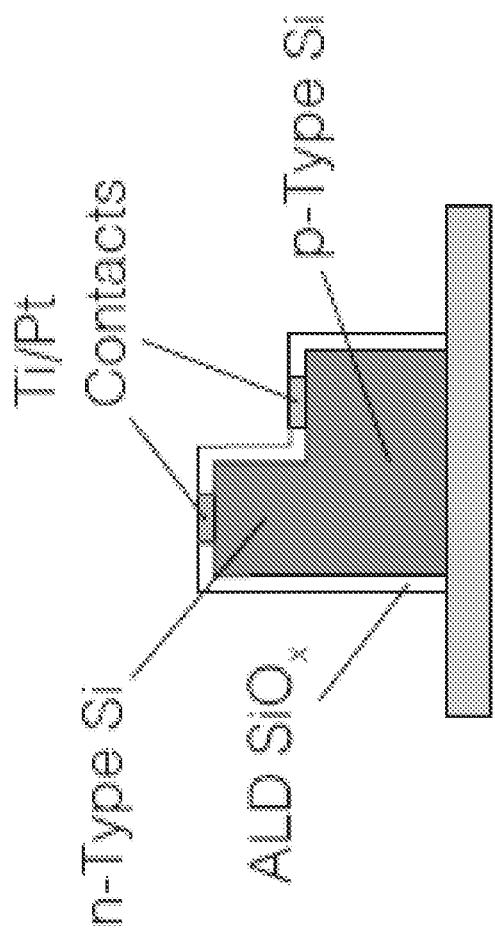
FIG. 7F shows a schematic cross section of an example silicon photovoltaic according to the disclosed technology.
Figure 7G:
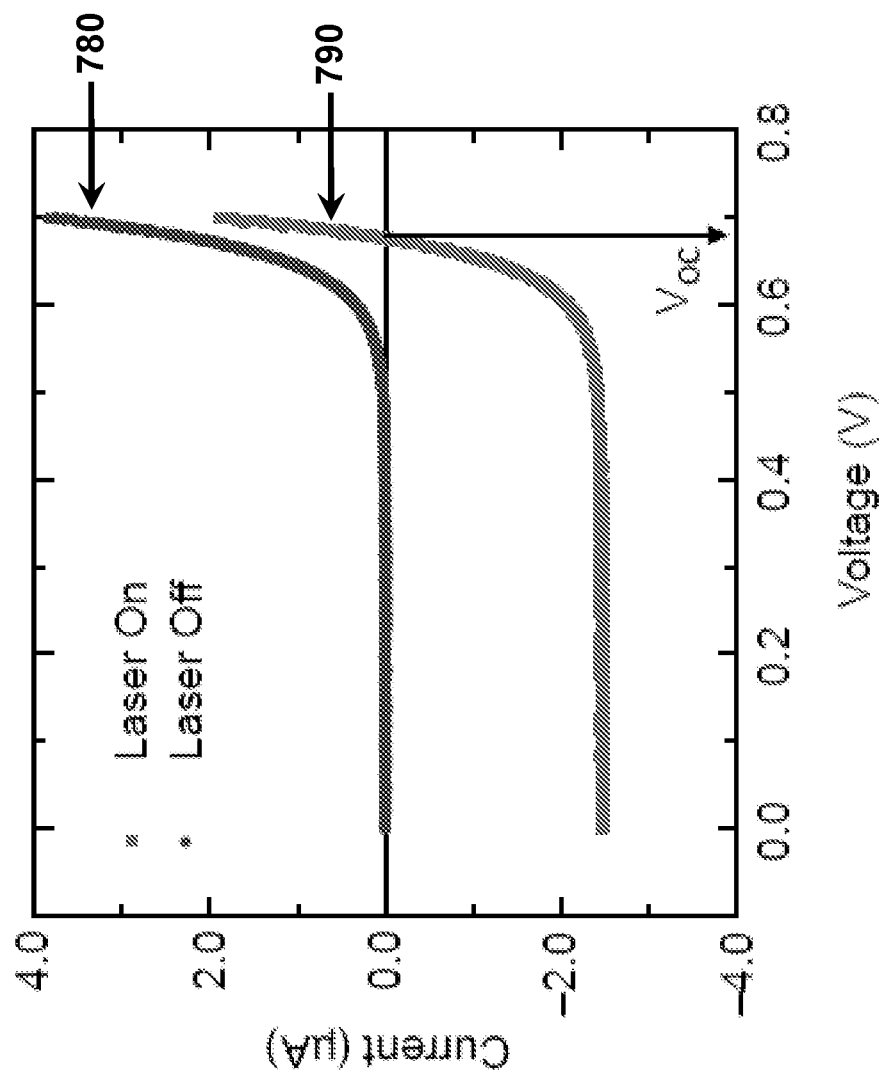
FIG. 7G shows an IV curve for an example photovoltaic according to the disclosed technology with and without illumination.

FIG. 7E shows a labeled SEM image of a silicon photovoltaic element, about 10 μm by 20 μm in size. The photovoltaic includes a layer n-type Si 720 disposed on a layer of p-type Si 710 as well as Pt/Ti contacts 730. FIG. 7F shows a schematic cross section of an example silicon photovoltaic according to the disclosed technology. FIG. 7G shows an IV curve for a photovoltaic with (790) and without (780) illumination. The devices were illuminated by a 785 nm wavelength laser with an intensity of 100 nW/μm². The illuminated IV curve shows an open circuit voltage ($V_{oc}$) of approximately 700 mV.

Figure 8A:
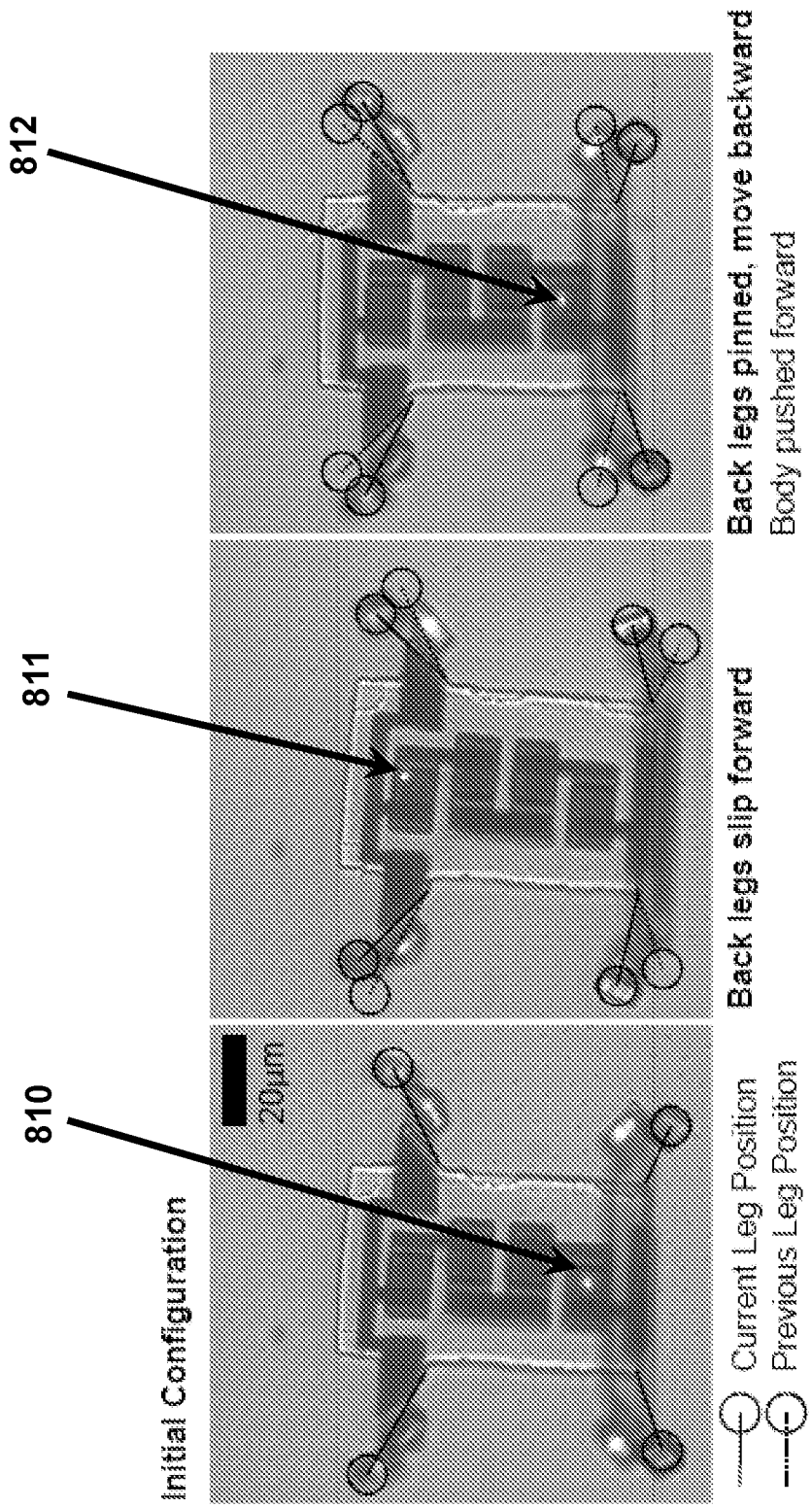
FIG. 8A shows example optical images of a walking microscopic robot according to the disclosed technology.
Figure 8B:
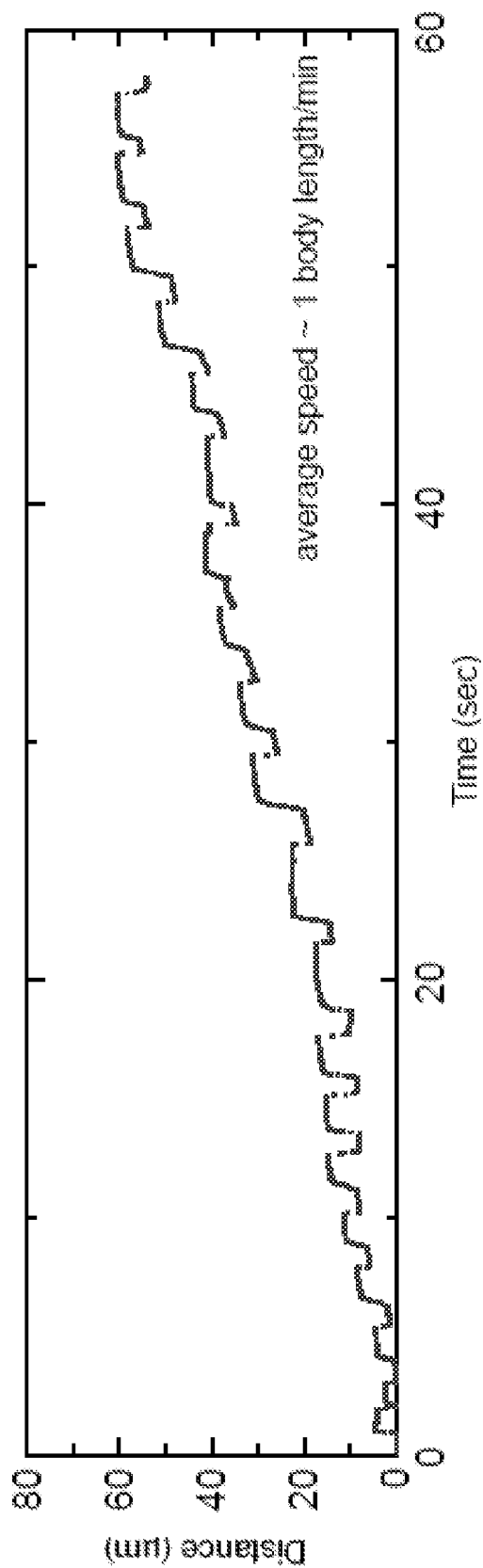
FIG. 8B illustrates an example distance moved by the center of mass of a walking microscopic robot according to the disclosed technology as a function of time.
Figure 8C:
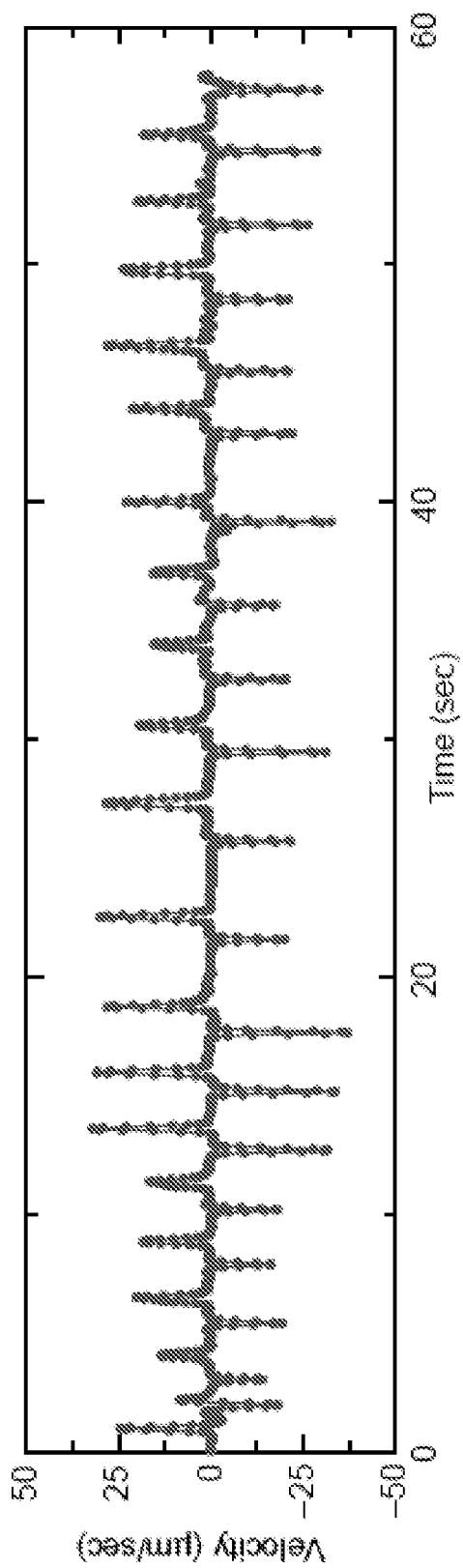
FIG. 8C shows instantaneous velocity obtained by differentiating the data in FIG. 8B.

In this example, robot bodies have a maximum thickness of 5 μm (FIG. 1B), and width/length dimensions of 40 μm/40 μm or 40 μm/70 μm, depending on the number of photovoltaics onboard. Such robots use their legs to walk (e.g., on textured surfaces), as shown in FIGS. 8A-C. For a robot to walk, laser light is focused onto photovoltaics that bias either the front or back legs in sequence. In this configuration, each leg acts as the counter electrode to the other: if one leg is positively biased, the other is negatively biased. FIG. 8A shows the motion of the legs of a walking microscopic robot where the current position of the legs is shown in solid lines and previous position is shown in dashed lines. Arrows 810, 811, and 812 mark photovoltaic elements to which the laser light is directed. When the laser light is directed to the front photovoltaic (shown by the arrow 811), the back legs slip as they move forward. When we direct light to the back (810, 812), the robot takes its power stroke: the back legs push off the substrate and propel the robot forward. The motion of the front legs changes the normal loading at the feet, causing the back legs slip on the forward stroke and stick on the power stroke.

FIG. 8B shows the distance moved by the center of mass of the walking microscopic robot as a function of time. On average the robot travels at 1 μm/s, a speed comparable to crawling biological microorganisms. This speed is currently set by the laser switching time.

FIG. 8C shows instantaneous velocity obtained by differentiating the data in FIG. 8B. Instantaneous speeds can be as large as 30 μm/s.

Figure 9A:
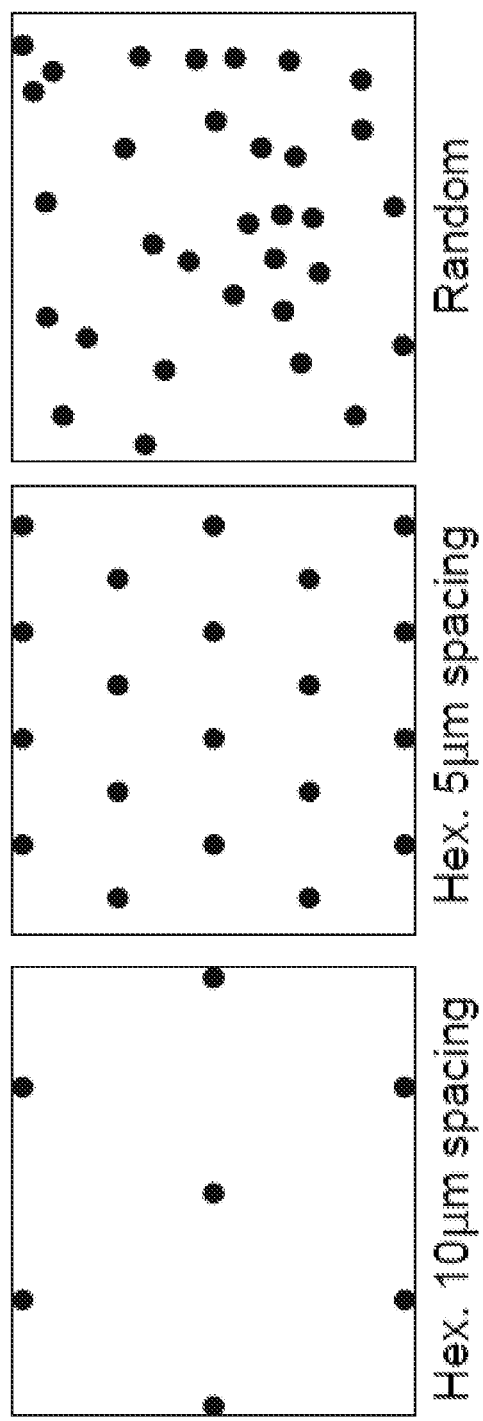
Figure 9B:
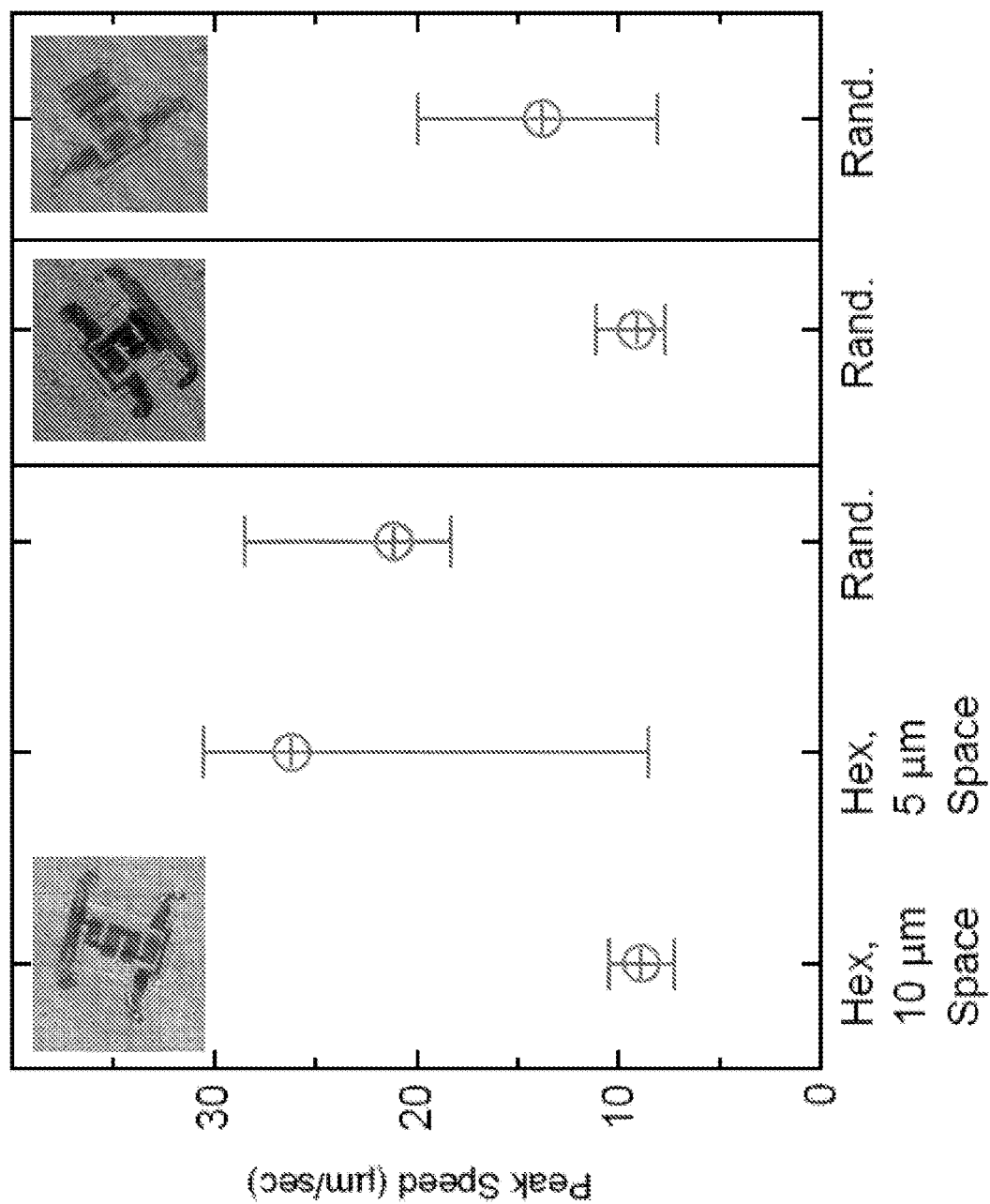

FIGS. 9A-B give peak speed distributions for different surfaces and robot types. In general, the maximum speed is limited by a force balance between frictional contacts at the feet and viscous drag from the moving body.

FIG. 9A shows a schematics of three example surfaces robots according to the disclosed technology walked on: hexagonal arrays of knobs spaced 5 μm apart, 10 μm apart, and random arrays of knobs.

FIG. 9B shows a measured maximum lateral velocity a robot takes at each step, then aggregate the results into a distribution of peak speeds for each robot body type and frictional surface type (robot types are depicted in the inset images). The upper and lower error bars represent the upper and lower quartiles. Significant variability is expected for walking on rough surfaces: each step can provide a different contact geometry and force. The order of magnitude is constrained by an interplay between friction and drag: the robot speed is bounded by the maximum frictional force the feet can generate. The maximum frictional force is found to be 0.1-0.3 of the robot's weight, consistent with friction.

The actuators, fabrication protocols, and parallel release strategy presented in this patent document provide a complete processing scheme for semiconductor-based robots that are ten times smaller than the period at the end of this sentence. To our knowledge, these are the first sub-100 μm robots that use on-board electronics to control actuation. Further, these microscopic robots are remarkably robust. Because they are made from highly stable materials, we find that they readily survive 200 K temperature variations and 13 orders of magnitude in acid concentration. In addition, microscopic robots according to the technology disclosed herein can safely be drawn into pipettes or syringes and injected out like chemicals. They are small enough to fit through the narrowest hypodermic needles (e.g., 34 gauge) and maintain mechanical functionality after injection. Microscopic robots according to the technology disclosed in this patent document that are equipped with thousands of on-board transistors, powered only by ambient sunlight, are readily achievable using existing CMOS circuits: all of the power for actuation and computation can be accommodated with roughly 10 nW while sunlight incident on a 30 μm photovoltaic supplies nearly 100 nW. Such robots can autonomously explore a micro-environment or directly interact with biological systems using local sensory input and feedback. Circuits can be used to control different forms of locomotion: hexapods, ciliates or flagellar swimmers are all possible. Furthermore, we estimate that such microscopic robots can be manufactured at a cost that is significantly less than a penny per robot using commercial silicon foundries.

Stability of SEAs according to the disclosed technology in chemical and thermal environments was investigated. Our experiments covered a range of different chemical compositions and found no noticeable change in the actuator response. In particular, we tested SEAs in phosphoric acid mixtures (pH 1 to 5), strong NaOH (pH 13-14), phosphate buffer saline (pH 7.6) and dilute HCl (pH 1 to 5). In each case we found that the SEA could be reproducibly actuated, without damage, for the duration of an experiment (typically thousands of cycles). We also soaked devices overnight in strong HCl (pH 0), transferred devices to higher pH solutions, and found no noticeable degradation. In addition, our devices are deposited at 275° C., which makes thermal degradation unlikely given that the device typically operates in water.

To characterize the stiffness of the actuators, we measure the exponentially-decaying transient response to a sudden step in voltage. The characteristic timescale is set by the elasticity of the actuator and the viscous drag from the liquid:

$$\tau_{act} = \frac{11}{60} \frac{\pi \mu L^4}{Dw \log\left[\frac{4L}{\pi w}\right]}$$

where L is the length of the actuator, w is the width, and μ is the viscosity of liquid (e.g., water). Fit of this dependence to a transient response for a 7 nm thick, 55 μm long, and 8 μm wide Pt-graphene actuator gives a decay time t=50 ms.

The equation above can be used to approximately estimate the bending energy D=5.4×10⁻¹⁵ J. Similar measurements on different geometry cantilevers yield comparable results. From these measurements and neglecting the bending stiffness of the graphene capping layer, we infer the Young's modulus for the ALD platinum of Ey=0.18 TPa. This is in reasonable agreement with the accepted bulk value of platinum, 0.17 TPa. Given this value for D, we can use Eq. 1 above and the measured curvature (FIG. 6A) to infer the surface stress $\gamma_m$ associated with oxygen-species adsorption. We find $\gamma_m$=0.3 N/m. This value is consistent in scale with prior work on adsorption-induced stresses in bulk platinum actuators: typical literature values range from 0.1 to 3 N/m. Finally, we can determine the force generated by SEAs. Specifically, a force of:

$$F_b = Dw \frac{R_c^{-1}}{L} = \frac{\gamma_m t}{2} \frac{w}{L}$$

is required to push the cantilever back to its equilibrium position. We find a force of 1 nN for a roughly equal aspect ratio cantilever of 7 nm thickness. This puts SEAs at a scale comparable to cell-cell adhesive forces, and about 10× larger than typical maximum optical trap forces.

A model of SEA bending due to electrochemical adsorption was developed. We assume an electrochemically active species in the solution are able to adsorb to the surface of the platinum via a charge transfer reaction. In the oxygen-species regime, adsorption typically follows a reaction of the form $$MA + e^- \leftrightarrow M + A^-$$

where A represents the adsorbate (e.g. OH—, HSO₄—, H₂PO₄—) and M denotes an adsorption site. The fraction of sites occupied by an adsorbate, q, for an ideal adsorption process is given by $$\phi = \frac{1}{1 + \exp\left[\frac{-e}{k_B T}(V - V_0)\right]}$$

where V is the applied voltage and V0 is an offset voltage set by the free energy of adsorption, electrode composition, and solution chemistry. To connect to experimental data for curvature, we assume the change in the surface stress difference between the two sides of the stack is proportional to the number of occupied sites: $\Delta\gamma = \gamma_m \phi$. The sign convention is such that the platinum expands when oxygen-species adsorb. To link the $\Delta\gamma$ to the curvature ($R_c^{-1}$) we use Stoney's equation $$\Delta R_c^{-1} = \Delta\gamma \frac{t}{2D}$$

and after simplifying we find:

$$\Delta R_c^{-1} = \frac{\gamma_m t}{2D} \frac{1}{1 + \exp\left[\frac{-e}{k_B T}(V - V_0)\right]}$$

A similar derivation applies for other adsorption reactions that occur at more negative voltage ranges (<−0.5 versus Ag/AgCl), like hydrogen. In practice, we find the curvature changes over a wider range of voltages than predicted by the ideal adsorption process described above. We account for this deviation by introducing a phenomenological non-ideality factor, n, such that $$\Delta R_c^{-1} = \frac{\gamma_m t}{2D} \frac{1}{1 + \exp\left[\frac{-e}{k_B T n}(V - V_0)\right]}$$

For the processing conditions used here, we find n is typically between 1.2 to 1.7. For example, some graphene-Pt actuators are best fit with n=1.2 while some Ti—Pt actuators are better fit with n=1.7. In general, we find that different processing conditions can lead to larger values for n: depending on how the platinum is processed, n can be upwards of 3 to 4, suggesting the onset of multiple electron reactions. Processing can impact the platinum surface by changing the surface chemistry and/or creating surface inhomogeneities that broaden the width of the transition.

The maximum speed for the robot's center of mass is constrained by friction and drag. The robot body moving over the substrate below shears the water in between, creating a drag force $$F_d = \upsilon \mu \frac{A}{d}$$

where v is the velocity, A is the area of the body, and d is the gap between the robot's body and the substrate. The frictional contacts at the robot's feet can balance this force, unless it exceeds the slip condition $F_f < \eta F_n$ where is the friction coefficient and $F_n$ is the normal force on the robot body. Taking the force of gravity as the dominant normal load gives a maximum speed for the robot:

$$\upsilon < \frac{\eta m g d}{\mu A}.$$

Experimentally, we find top speeds depend on the patterned surface roughness: when walking across arrays of random dots, as in FIGS. 9A-B, the robot's speed is never greater than ~40 µm/s, while for hexagonal arrays, the top speed is ~25 µm/s. Given the weight of 50 pN, and an estimated gap height d~10 µm, these speeds correspond to effective friction coefficients of n ~0.25 and 0.16, respectively. For bare glass, the frictional interaction is too low to support walking at a measurable speed: we find the robot slips rather than walks. The forces required to walk at these speeds are significantly lower than the peak forces generated by SEAs. As noted earlier, SEAs are capable of producing forces approaching 1 nN, roughly 20× larger than the weight of the robot body. If limited by the actuator performance, instead of friction, future microrobots could walk nearly 20× faster. Balancing drag resistance against peak actuator force, instead of friction, predicts a peak speed of ~1 mm/s, nearly 10 body lengths per second. This limit can be reached by increasing the frictional loads, either by adding weight to the robot or by coupling the normal load to the lateral motion with lubrication forces.

Fabrication costs for various microscopic robots according to the disclosed technology were assessed as well. Assuming a 180 nm CMOS process fabricated at a foundry, we estimate an autonomous microscopic robot, roughly 100 µm on a side, with a clock, sensors, and a programmable controller would cost approximately $0.001 and be capable of operating with sunlight as its sole power source. To estimate the cost, we take a baseline number of $10/cm$^2$ for 180 nm CMOS lithography performed at a foundry at production scale. Given each robot is on the order of 100 µm on a side, we expect 10,000 robots per cm$^2$ yielding $0.001 per robot. Broadly, a 180 nm CMOS process allows transistors on the order of 1 µm on a side. Thus, a 100 µm robot can accommodate circuits with tens of thousands of transistors, offering a high-degree of flexibility. Clocks that generate voltage pulses suitable for walking (~200 mV at 10-100 Hz), ~20 µm on a side, have been built using a variety of architectures and typical designs consume 1-10 nW of power. Such clocks can be integrated with sensors and controllers to form microsystems and computers. For example, it was demonstrated a fully integrated clock, chemical sensor, and finite state machine, built in 180 nm CMOS, that fits within a 100×200 µm$^2$ area and operates at ~3 nW. In a slightly larger space, ~360×400 µm$^2$, it was demonstrated a fully integrated microcontroller, temperature sensor, 4 kB of SRAM, a clock and two-way communication via micro-LEDs, made with 55 nm CMOS, and operating at power budget of 16 nW. Since all of these example circuits operate at <100 nW, a robot using these onboard systems could be powered by sunlight. Daylight provides roughly 1 kW/m$^2$ of incident power. Given a photovoltaic on the order of 30 µm on a side with a 10% conversion efficiency, the robot would harvest roughly 100 nW, nearly an order of magnitude more power than needed for the combined energy cost of sensing, computation and actuation.

An example protocol for microrobot fabrication according to the disclosed technology includes the following operations: We start with commercially produced SOI wafers (Ultrasil Corporation). The device layer is p-type (boron doped), 2 µm thick and has a resistivity 0.1 Ohm-cm. The buried oxide layer is 500 nm thick and the handle layer is 500 µm thick. We form p-n junctions by depositing 550 nm of phosphosilicate glass (5% by weight PSG) at 350° C. with PECVD using phosphine/helium plasma. We diffuse dopants into the device layer by annealing the substrate at 1000° C. for 3 min in argon with a rapid thermal annealer, using a ramp rate of 75 C.°/s. After doping, we remove the PSG using 6:1 buffered oxide etch (BOE). The major steps of the protocol are as follows: Selectively remove portions of the n-layer to provide contact points with the underlying p-silicon; Selectively remove the unwanted p-type silicon, defining the photovoltaic's structure; Electrically isolate the p-n junction with a conformal dielectric layer; Make electrical contacts to the p-type and n-type silicon; Pattern the buried oxide layer; Deposit the platinum layer for the SEAs; Pattern the platinum layer; Pattern/deposit the capping layer of the SEAs; Interconnect the SEAs to the silicon photovoltaics; Dice the 4-inch wafer into 12 mm test die; Pattern the SU8 encapsulation layer and rigid panels; Mechanically support the devices with patterned aluminum prior to release; Release devices from the fabrication substrate; Stamp devices onto target substrates; Release the devices into solution.

Another example protocol for microrobot fabrication according to the disclosed technology included the following operations:

To selectively remove portions of the n-layer to provide contact points with the underlying p-silicon, we 1) Prime wafers with HDMS. 2) Spin on Shipley 1813 photoresist at 3000 RPM for 45 seconds with a 1000 RPM/s ramp rate, bake the resist on a hotplate at 115° C. for 1 minute. 3) Expose using a g-line 5× stepper. 4) Develop in AZ 762 using an automated developer tool with a 1 minute single puddle recipe and spin dry (Hamatech HMP 900). 5) Etch the top layer of n-type silicon using inductively coupled HBr plasma, removing 1 μm of silicon. 6) Remove passivated resist via a 1 minute etch in oxygen plasma (150 W). 7) Strip the photoresist by sonication in remover 1165, rinse with DI, blow dry with nitrogen and plasma ash any residuals in a reactive ion etch using oxygen plasma (150 W).

To selectively remove the unwanted p-type silicon, defining the PV structure, we 1) Prime the wafers with HMDS. 2) Spin on Shipley 1827 resist at 3000 RPM for 45 seconds with 1000 RPM/s ramp, and bake the resist on a hotplate at 115° C. for 90 seconds. 3) Expose using a g-line 5× stepper. 4) Develop in AZ 726 using an automated developer tool with a 1 minute single puddle recipe and spin dry (Hamatech HMP 900). 5) Etch away exposed silicon via HBr all the way to the underlying oxide. 6) Remove passivated resist via a 1 minute etch in oxygen plasma (150 W). 7) Strip the photoresist by sonication in remover 1165, rinse with DI, blow dry with nitrogen and plasma ash any residuals in a reactive ion etch using oxygen plasma (150 W).

To electrically isolate the p-n junction with a conformal dielectric layer, we 1) Plasma clean the surface of the wafer via 5 minutes of oxygen plasma at 150 W. 2) Deposit 50 nm of silicon dioxide via plasma enhanced atomic layer deposition at 110° C. To make electrical contacts to the p-type and n-type silicon, we 1) Prime the wafers via HMDS. 2) Spin on Shipley 1827 resist at 3000 RPM for 45 seconds with 1000 RPM/s ramp, and bake the resist on a hotplate at 115° C. for 90 seconds. 3) Expose using a g-line 5× stepper defining regions where we want to form contacts. 4) Develop in AZ 726 using an automated developer tool with a 1 minute single puddle recipe and spun dry (Hamatech HMP 900). 5) De-scum residual resist using a 1 minute oxygen plasma at 150 W. 6) Bake the resist for 5 minutes at 115° C. 7) Etch the deposited oxide in 30:1 BOE, rinse the wafer in DI and blow dry. 8) Immediately load the wafer into a sputter deposition tool, deposit 20 nm of Ti and 60 nm of platinum to form metal contacts. 9) Sonicate off resist and unwanted metal in 1165, rinse with DI and blow dry. 10) Anneal the metal contacts at 350° C. for 5 minutes in vacuum.

To pattern the buried oxide layer, we 1) Prime the wafers via HMDS. 2) Spin on Shipley 1827 resist at 3000 RPM for 45 seconds with 1000 RPM/s ramp, and bake the resist on a hotplate at 115° C. for 90 seconds. 3) Expose using a g-line 5× stepper defining the bottom layer of oxide that will form the robot body. 4) Develop in AZ 726 using an automated developer tool with a 1 minute single puddle recipe and spun dry (Hamatech HMP 900). 5) De-scum residual resist using a 1 minute oxygen plasma at 150 W. 6) Etch the unwanted oxide using inductively coupled $CHF_3/O_2$ plasma. 7) Remove passivated resist via 1.5 minute oxygen plasma at 150 W. 8) Strip the photoresist by sonication in remover 1165, rinse with DI, blow dry with nitrogen and plasma ash any residuals in a reactive ion etch using oxygen plasma (150 W).

To deposit the platinum layer for the SEAs, we 1) clean the surface of the wafer via 3 minutes of oxygen plasma at 75 W, 2) use thermal atomic layer deposition to deposit 1 cycle of aluminum oxide, creating a seed layer for the deposition of platinum, 3) deposit platinum with thermal atomic layer deposition (via Arradiance Gemstar 6) at 250° C. using precursors of Trimethyl(methylcyclopentadienyl) platinum (IV) (MeCpPtMe$_3$) and $O_2$. We pulse these reactions for 70 cycles to produce our 7 nm platinum growth (see section on characterization for thickness vs cycle number).

To pattern the platinum layer for the SEAs, we 1) Prime the wafers via HMDS. 2) Spin on Shipley 1827 resist at 3000 RPM for 45 seconds with 1000 RPM/s ramp, bake the resist at 115° C. for 90 seconds. 3) Expose using a g-line 5× stepper defining open areas in the resist that will be filled with a chrome hard mask. 4) Develop in AZ 726 using an automated developer tool with a 1-minute single puddle recipe and spin dry (Hamatech HMP 900). 5) Sputter deposit 70 nm of chrome. 6) Lift off resist and unwanted metal via sonication in 1165, rinse in DI, blow dry in nitrogen. 7) Etch the exposed platinum via aqua regia (3 parts hydrochloric acid, 1 part nitric acid) at 55° C. with mechanical stirring (100 RPM stir bar), checking to see when the platinum has cleared in 8 second intervals, rinse in DI, and blow dry with nitrogen. 8) Remove the chrome via wet etching (Cyantek CR-14), rinse with DI, and blow dry with nitrogen.

To pattern/deposit the capping layer of the SEAs we 1) Prime the wafers via HMDS. 2) Spin on Shipley 1827 resist at 3000 RPM for 45 seconds with 1000 RPM/s ramp, bake the resist at 115° C. for 90 seconds. 3) Expose using a g-line 5× stepper defining open areas in the resist that will be filled with titanium. 4) Develop in AZ 726 using an automated developer tool with a 1 minute single puddle recipe and spun dry (Hamatech HMP 900). 5) Sputter deposit 2 nm of titanium. 6) Lift off resist and unwanted metal via sonication in 1165, rinse in DI, blow dry in nitrogen.

To interconnect the SEAs to the silicon photovoltaics we 1) Prime the wafers via HMDS. 2) Spin on Shipley 1827 resist at 3000 RPM for 45 seconds with 1000 RPM/s ramp, bake the resist at 115° C. for 90 seconds. 3) Expose using a g-line 5× stepper defining open areas in the resist that will be filled with titanium platinum interconnects. 4) Develop in AZ 762 using an automated developer tool with a 1 minute single puddle recipe and spun dry (Hamatech HMP 900). 5) Sputter deposit 20 nm of Ti, then 60 nm of platinum to form metal interconnects. 6) Lift off resist and unwanted metal via sonication in 1165, rinse in DI, blow dry in nitrogen.

To dice the 4-inch wafer into 12 mm test die, we 1) Spin a protective layer of Shipley 1827 resist at 3000 RPM for 45 seconds with 1000 RPM/s ramp, bake the resist at 115° C. for 120 seconds. 2) Dice the wafer with a silicon specialized dicing blade (KNS S1235) spinning at 3000 RPM with a feed speed of 2 mm/s. 3) Rinse debris from the wafer with DI gun and blow dry with nitrogen. 4) Remove protective resist and residual debris by sonicating in 1165, rinse in DI, blow dry nitrogen.

To pattern the SU8 encapsulation layer and rigid panels, we 1) Spin coat SU-5 epoxy on the diced chips at 3000 RPM for 30 seconds with a 1000 RPM/s ramp rate. 2) Soft bake the chips for 1 minute at 65° C. followed by 2 minutes at 95° C. 3) Manual strip the edge bead on each chip with acetone and alpha swabs, removing ~2 mm. 4) Expose SU8 on a contact aligner (ABM) with a 365 nm filter in place. 5) Bake the chip for 1 minute at 65° C. followed by 3 minutes at 95° C. 6) Develop for 1 minute in SU8 developer with agitation, rinse in IPA, blow dry with nitrogen. 7) Bake chip at 65° C., transfer to 95° C. hotplate and ramp to 150° C. 8) Hold the chip at 150° C. for 5 minutes, turn off the hotplate and allow to cool to room temperature.

To mechanically support the devices with patterned aluminum prior to release, we 1) Sputter coat 200 nm of aluminum everywhere on the chip. 2) Deposit a 2 nm thick layer of aluminum oxide via plasma enhanced atomic layer deposition to fill any pinholes in the film. 3) HMDS prime the chip. 4) Spin on Shipley 1827 resist at 3000 RPM for 45 seconds with 1000 RPM/s ramp, bake the resist at 115° C. for 90 seconds. 5) Manual strip the edge bead on each chip with acetone and alpha swabs, removing ~2 mm. 6) Expose resist on a contact aligner (ABM) to pattern openings where aluminum will be removed. 7) Manually develop resist with AZ 726 developer with a 1 minute emersion and agitation, DI rinse and nitrogen blow dry. 8) De-scum residual resist in oxygen plasma for 1 minute at 150 W. 9) Bake the resist for 1 minute at 115° C. 10) Wet etch unwanted aluminum with aluminum etchant (Transene A), rinse in DI, blow dry with nitrogen. 11) Strip the photoresist in acetone, rinse in IPA, rinse in DI, blow dry with nitrogen.

To release devices from the substrate, we 1) Strip residual organics from the chip by plasma cleaning in oxygen at 150 W for 5 minutes. 2) Under etch the silicon using pulsed $XeF_2$ vapor phase etching, 2.5T pressure, 12 second cycles. Typical etches are ~150 cycles long.

To stamp devices onto target substrates, we 1) Press a PDMS stamp into contact with the released devices and rapidly peel it away. 2) Spin S1827 resist onto the "inked" surface of the PDMS stamp (3000 RPM spin speed, 1000 RPM/s ramp, 30 seconds). 3) Manually press the resist-robot side of the PDMS stamp into contact with the target substrate, let relax for 1 minute, peel away PDMS.

To release the devices into solution we 1) submerge the target substrate loaded with robots into a bath of diluted aluminum etchant (~100:1 dilution by volume with DI). All of the aluminum must be removed. 2) Dilute the aluminum etchant via solvent exchange with DI to pH neutral. 3) Add buffered NaOH (pH 13) to dissolve the resist into solution. 4) Solvent exchange to create desired solution chemistry (pH, salt concentration, etc.). We tested deployed robots in three different solutions: 1× phosphate buffer saline, 1M NaOH (pH 13), and dilute phosphoric acid (pH 2.4). In all three cases we were able to produce the desired actuation response when illuminated.

Figure 10A:
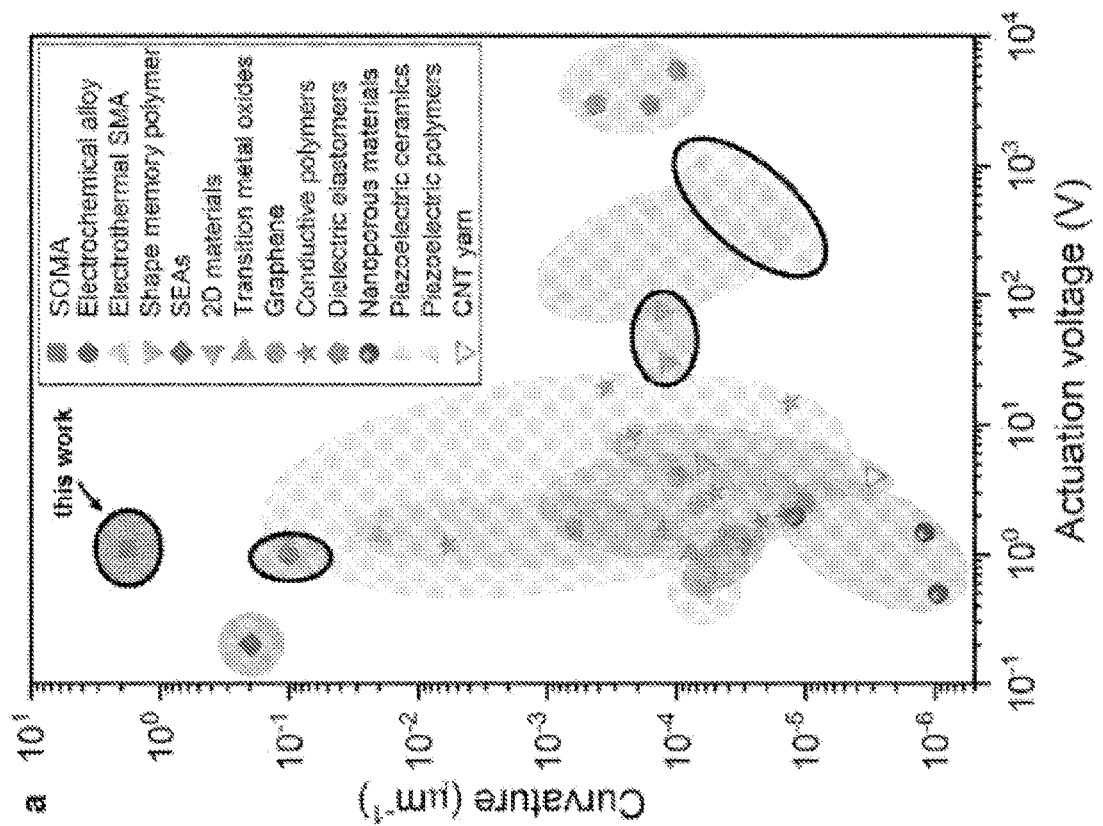
FIG. 10A illustrates a survey of the performance of voltage driven bendable actuators.

FIG. 10A illustrates a literature survey of the performance of voltage driven bendable actuators. The regimes with black borders show shape memory actuators while the regimes without black borders show shape change actuators without memory.

Figure 10B:
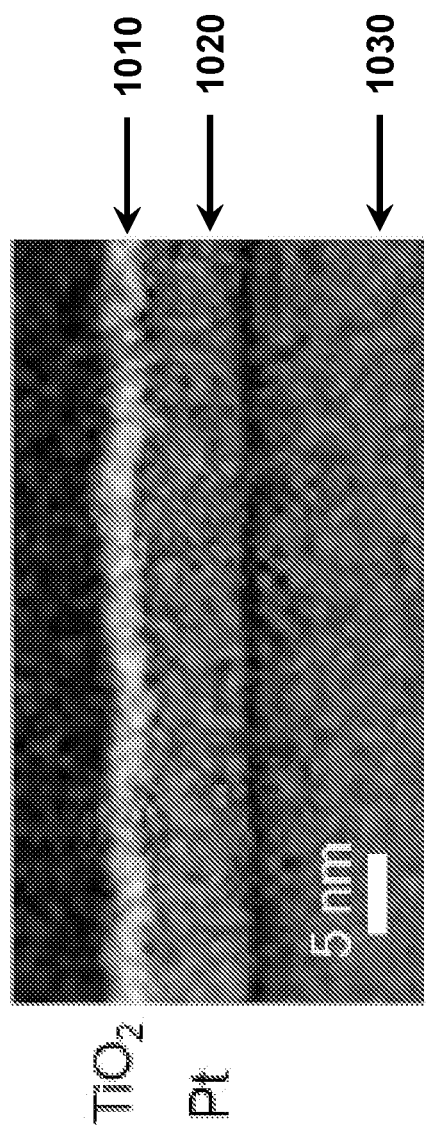
FIG. 10B shows a TEM image of a cross-section of a surface oxide memory actuator (SOMA).

FIG. 10B shows a TEM image of the cross-section of a Surface Oxide Memory Actuators (SOMA): 7.5 nm layer of platinum (1020) grown on a silicon wafer (1030) is capped on one side by 2.5 nm $TiO_2$ film (1010).

Figure 10C:
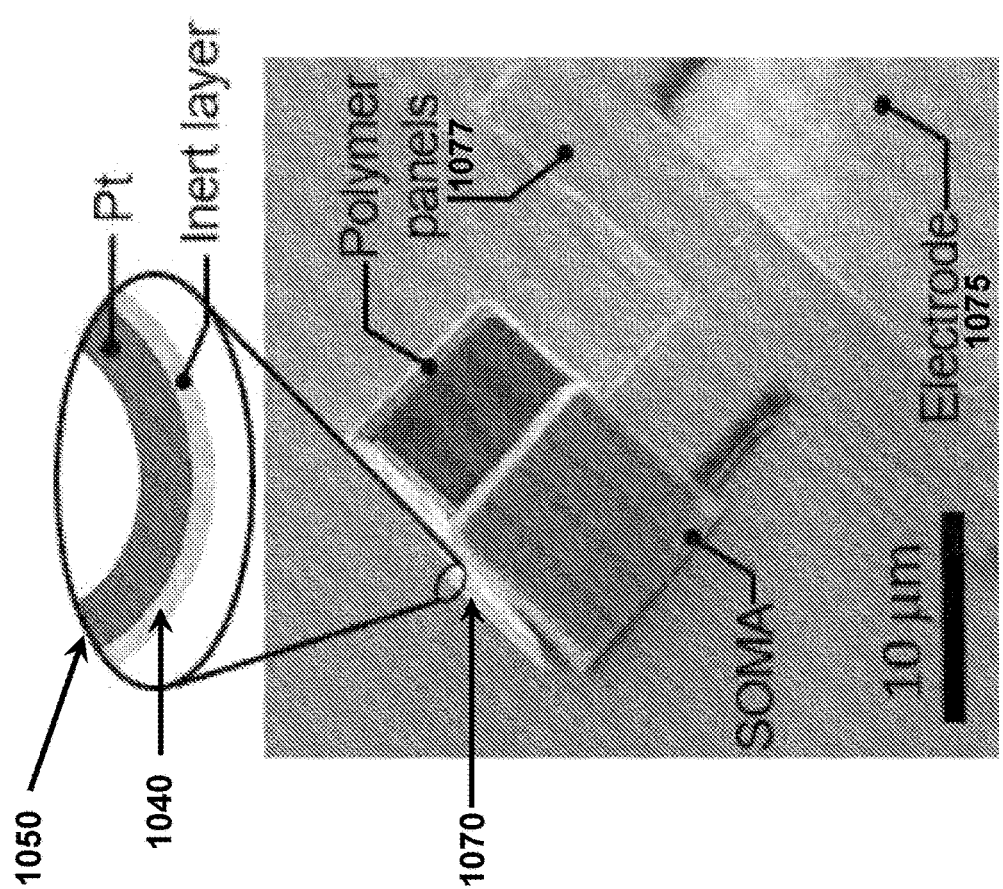
FIG. 10C shows a SEM image of a SOMA microgripper.

FIG. 10C shows a SEM image of a SOMA microgripper that has been set to the reduced state and then is dried using the critical point drying. SOMA is patterned with rigid panels (e.g., rigid polymer panels) 1077 to define hinges (e.g., hinge 1070). Without any platinum oxide on the platinum layer 1050, the platinum layer is bent away from the inert layer 1040. The inset of FIG. 10C shows a schematic of the cross-section of the SOMA hinge 1070 at the reduced state.

Figure 10D:
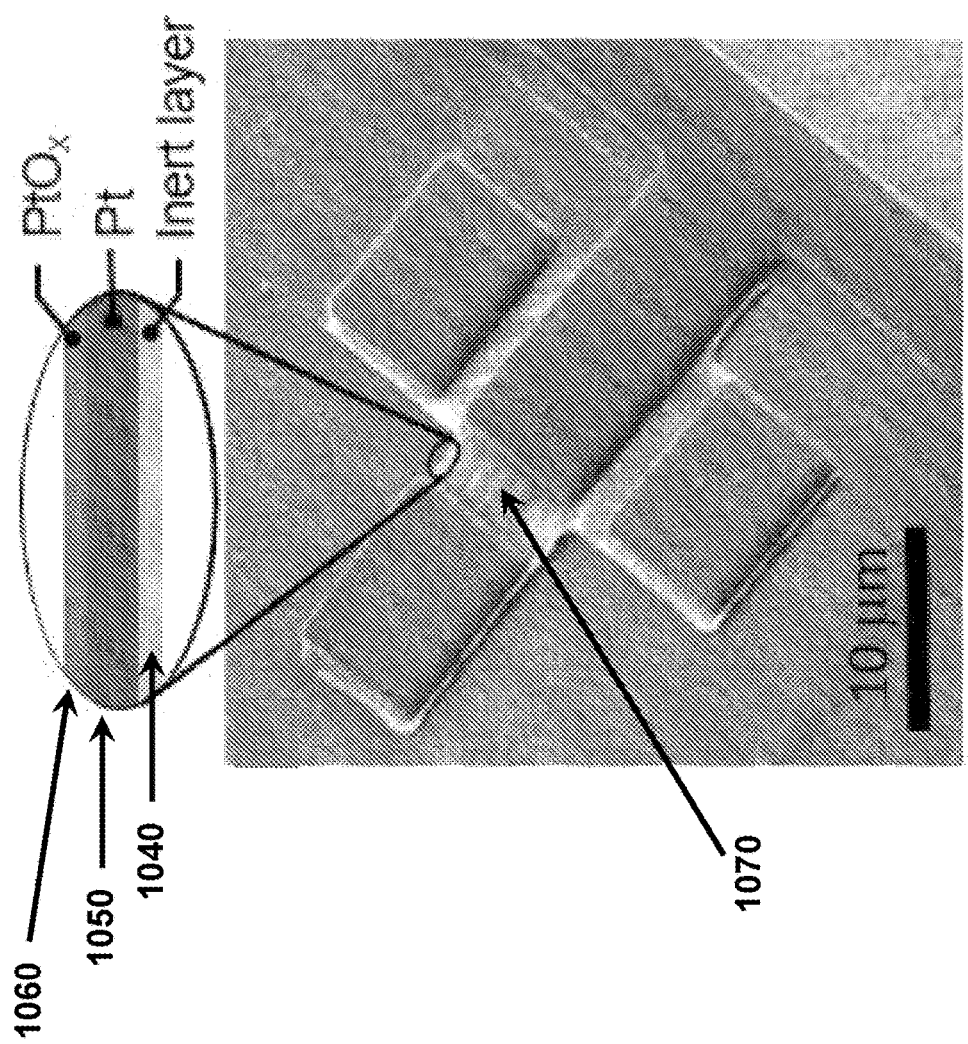
FIG. 10D shows another SEM image of a SOMA microgripper.

FIG. 10D shows a SEM image of a SOMA microgripper that has been set to the oxidized state and then critical point dried. The platinum oxide layer (1060) causes the microgripper to flatten. The inset of FIG. 10D shows a schematic of the cross-section of the SOMA hinge 1070 at the oxidized state. The SOMA hinge holds each of the reduced and oxidized states even when the voltage is removed from the SOMA hinge.

Figure 10E:
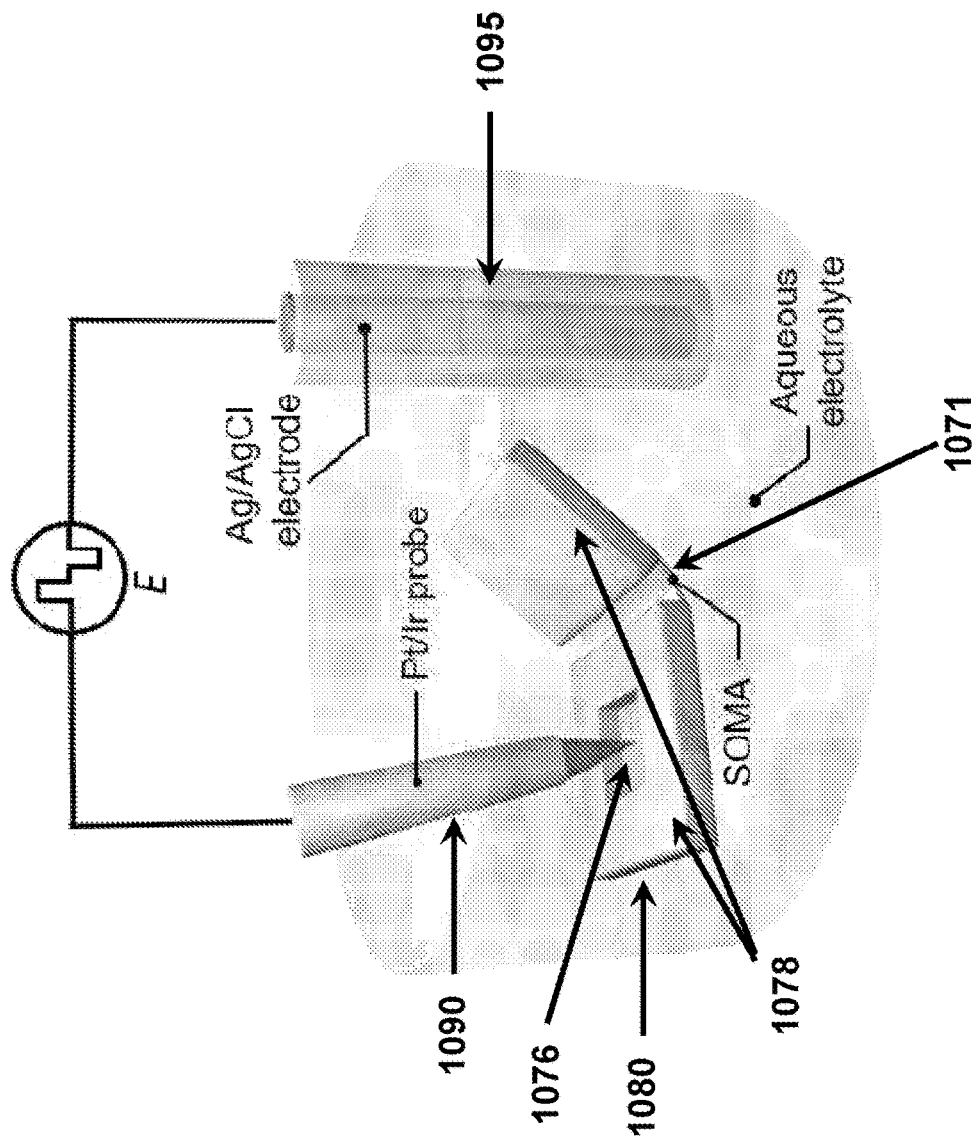
FIG. 10E shows a schematic of an experimental setup used for SOMA characterization.

FIG. 10E shows a schematic of an experimental setup that we used for characterization of an example embodiment of a SOMA according to the disclosed technology. We contact the exposed electrode 1076 of the SOMA 1080 with a platinum/iridium probe 1090 and apply a voltage to the actuator 1080 versus a distant Ag/AgCl electrode 1095, causing the actuator 1080 to bend at the location of the hinge 1071. Panels 1078 of the soma (e.g., made of a plastic material) determine the location of the hinge 1071 and hence the location where the actuator 1080 bends.

Figure 11:
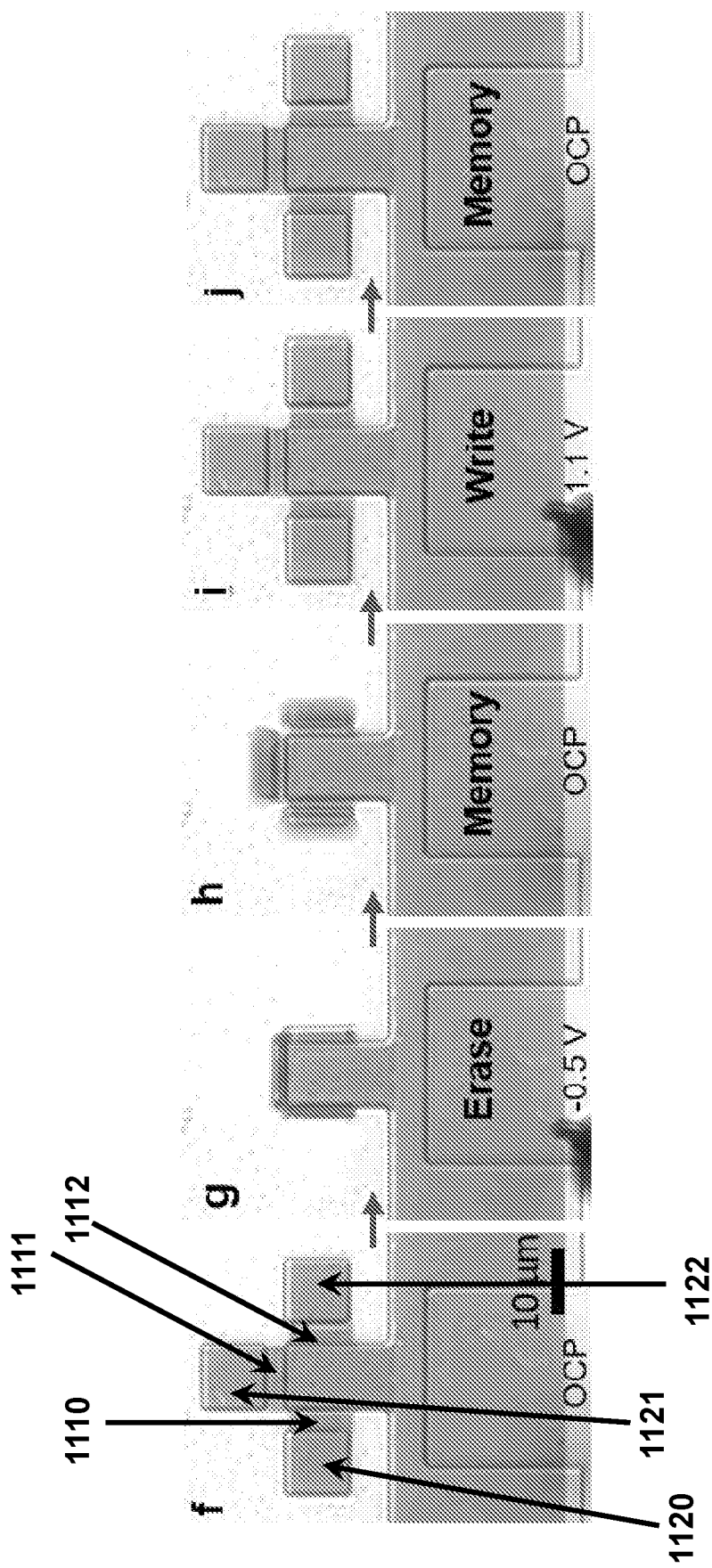
FIG. 11 shows a series of optical micrographs showing a SOMA microgripper in action.

FIG. 11 is a series of optical micrographs showing a SOMA microgripper in action. Panel f in FIG. 11 shows the SOMA microgripper when it is in the oxidized state. Panel g in FIG. 11 shows the SOMA microgripper when-0.5 V is applied to it versus Ag/AgCl to reduce it using the probe 1090 as shown in FIG. 10E, causing the panels to curve up. Panel h in FIG. 11 shows the SOMA microgripper when we remove the probe 1090 from the microgripper, the SOMA hinge remains in the reduced, curved state under the open circuit potential (OCP). Panel i in FIG. 11 shows the SOMA microgripper when the SOMA hinge in it is oxidized again by applying 1.1 V versus Ag/AgCl using the probe 1090 as shown in FIG. 10E, causing the SOMA hinge to flatten. Panel j in FIG. 11 shows that the SOMA hinge remains in the oxidized, flat state when we remove the probe.

An ideal shape-memory actuator for integrating into microscopic intelligent systems has several challenging requirements. The material should be electrically actuated, and it should be bendable to micron-scale radii of curvature. It should operate at fast timescales, be robust, and reproducible. In addition, it should be manufactured using techniques consistent with modern semiconductor fabrication. FIG. 10A summarizes the state-of-the-art electrically bendable actuators. While there has been much progress in creating materials with volatile actuation even at the microscale (borderless shaded regions), much less progress has been made in developing micro-scale shape memory materials (shaded regions with black border). For example, electrothermal shape memory polymers and alloys tend to have small bending curvatures, large working voltages, and have not demonstrated scalable fabrication, impeding their applications at the microscale. A more promising approach termed electrochemical alloying showed that silicon nanoscaffolds can maintain an actuated state by driving Li+ into the silicon and trapping them. Even with this system, however, operation is slow and cyclability is limited. Herein, we show that a different electrochemical strategy using surface oxidation of thin platinum metal films can be used to create fast, electrically controlled shape memory actuators, with sub-micrometer bending radius and high cyclability.

Figure 12:
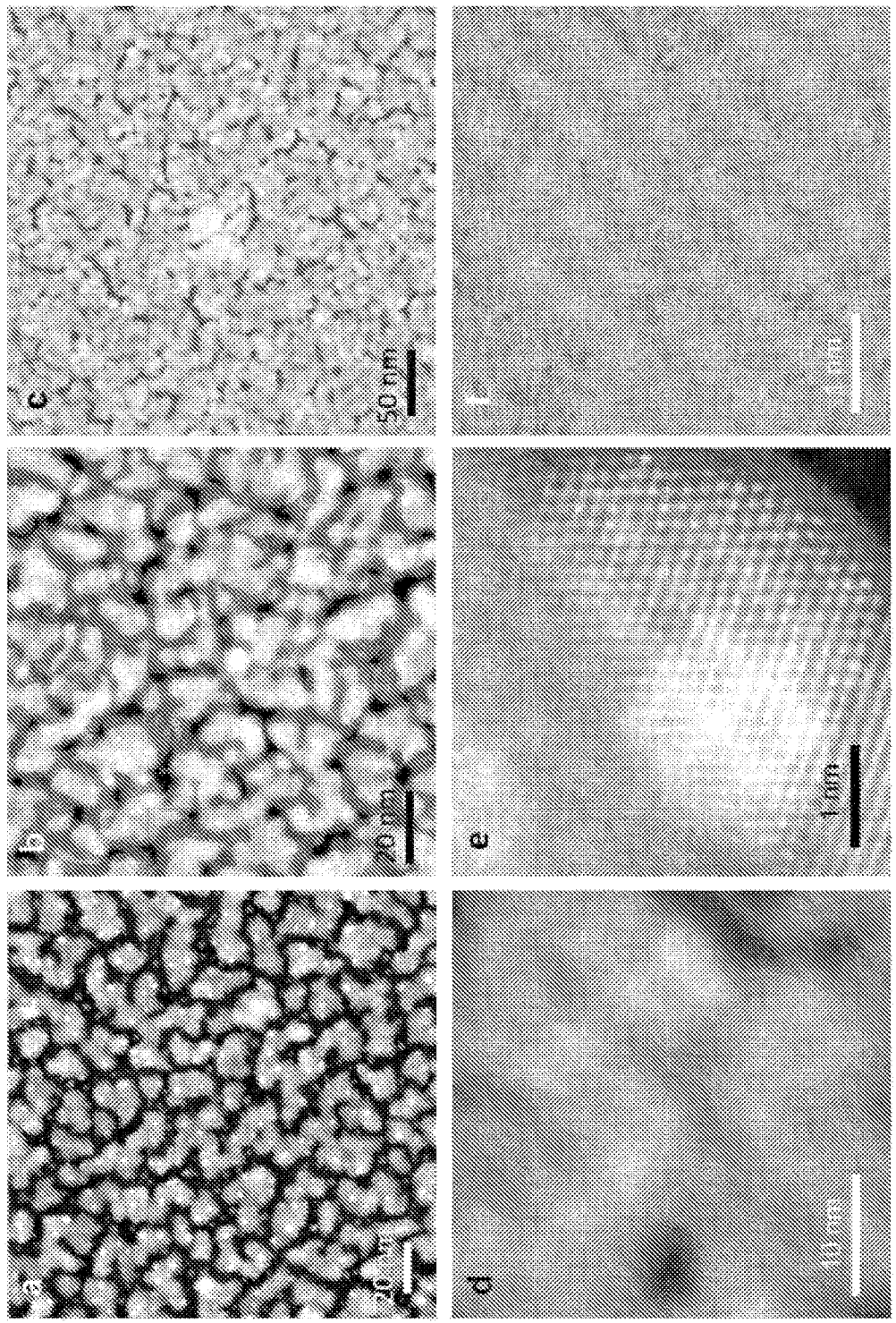
FIG. 12 shows example TEM images of platinum membranes grown by atomic layer deposition for different number of cycles.

SOMAs include a platinum active layer capped on one side by titanium oxide, similar to the surface electrochemical actuator (SEA) described above. Both layers of a SOMA are grown via atomic layer deposition (ALD) and consist of a 7.5 nm-thick electrochemically active platinum membrane capped on one side by an inert 2.5 nm-thick titanium dioxide film (FIG. 10B). The atomic layer deposition of both continuous and nanometer-thin active and inert layers is crucial to achieving ultra-small bending radius and high durability of this actuator. TEM images show the platinum is polycrystalline with domain sizes of ~ 10 nm and the protective titanium dioxide layer is highly amorphous and conformally caps the platinum layer (FIG. 10B and FIG. 12). The small sizes and random orientations of the crystalline domains in the platinum ensure isotropic expansion and contraction of the actuator. By patterning 2 μm-thick rigid polymeric panels on top of the actuators, we localize bending to the unpatterned region and produce what are effectively folds (FIGS. 10C-D and FIG. 13).

FIG. 12 shows example TEM images of platinum membranes grown by atomic layer deposition for different number of cycles. Panel a in FIG. 12 shows an example TEM image of a platinum membrane grown by atomic layer deposition for 35 cycles. Panel b in FIG. 12 shows an example TEM image of a platinum membrane grown by atomic layer deposition for 45 cycles. Panel c in FIG. 12 shows an example TEM image of a platinum membrane grown by atomic layer deposition for 70 cycles. These images indicate that increasing the number of cycles in the growth process generates more uniform films with fewer holes. Panel d in FIG. 12 shows an example TEM image of the polycrystalline domains in the platinum membrane with domains size ~10 nm. Panel e in FIG. 12 shows an example high-resolution TEM image of a crystalline structure of platinum. Panel f in FIG. 12 shows an example high-resolution TEM image of a highly conformal and amorphous $TiO_2$ membrane.

Figure 13:
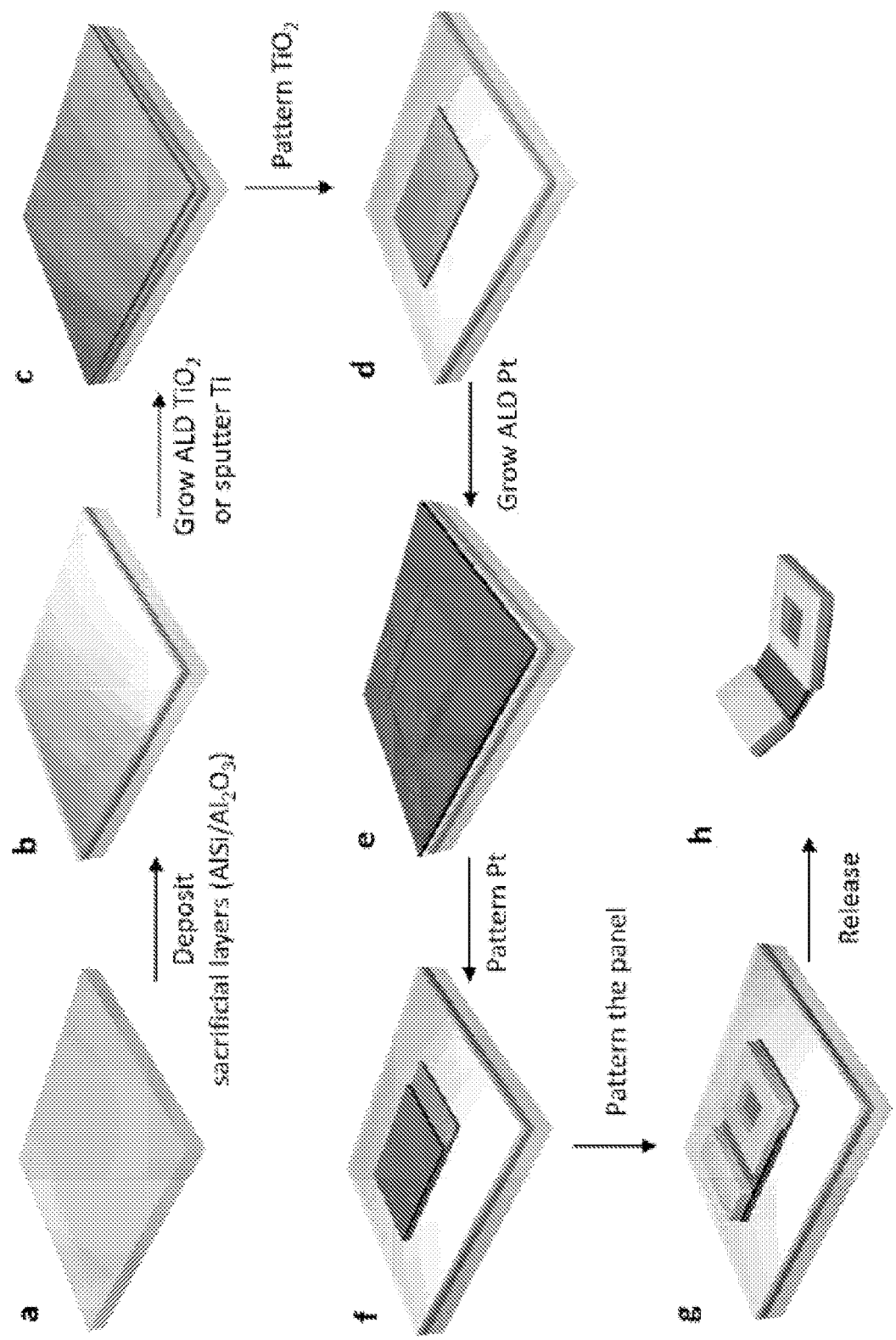
FIG. 13 shows steps on an example process of fabrication of a unidirectional SOMA device.

FIG. 13 shows steps on an example process of fabrication of a unidirectional SOMA device. In the steps illustrated in panels a and b of FIG. 13, a 180 nm-thick Al (doped with 1% silicon) layer is sputtered and a 13 nm-thick $Al_2O_3$ layer is grown by atomic layer deposition on a borofloat glass wafer. In the steps illustrated in panels c and d of FIG. 13, a 2.5 nm $TiO_2$ layer is grown by atomic layer deposition and patterned as a capping layer. In the steps illustrated in panels e and f of FIG. 13, a 7.5 nm Pt layer is grown by atomic layer deposition and patterned as an electrochemically active layer. In the step illustrated in the panel g of FIG. 13, rigid polymeric panels are patterned. In the step illustrated in the panel h of FIG. 13, the device is released into a solution by etching the sacrificial Al and $Al_2O_3$ layers.

To actuate SOMAs, we electrochemically oxidize platinum to platinum oxide at the uncapped platinum surface. The platinum oxide expands with respect to the platinum, causing the whole actuator to bend. We form the platinum oxide by applying a voltage to the SOMA in an aqueous electrolyte versus a reference electrode (typically Ag/AgCl) as shown in FIG. 10E. FIG. 10C shows a SOMA in the reduced state: the SOMA is bent away from the inert layer due to the prestress between the inert and Pt layers. FIG. 10D shows an oxidized SOMA: the SOMA flattens due to the expansion of platinum oxide at the bare platinum surface. Based on the absence or presence of the surface platinum oxide, SOMAs hold their shapes even when the reducing or oxidizing voltage is removed, giving them shape memory.

The shape-memory operation of a simple SOMA gripper is shown in FIG. 11. The micro gripper consists of SOMA hinges 1110, 1111, and 1112 linking 10×10 $\mu m^2$ rigid panels 1120, 1121, and 1122. In the oxidized state, the SOMA hinges are flat and the gripper is open (FIG. 11, panel f). A voltage of −0.5 V applied to the SOMA relative to the Ag/AgCl reference electrode causes the gripper to actuate into the closed position (FIG. 11, panel g). When the voltage is removed, the gripper remains in this state (FIG. 11, panel h). A voltage of 1.1 V returns the gripper to the open position, a shape it retains at the open circuit potential (OCP) upon removal of the voltage (FIG. 11, panels i,j). This shape memory operation can be repeated hundreds of times.

Figure 14:
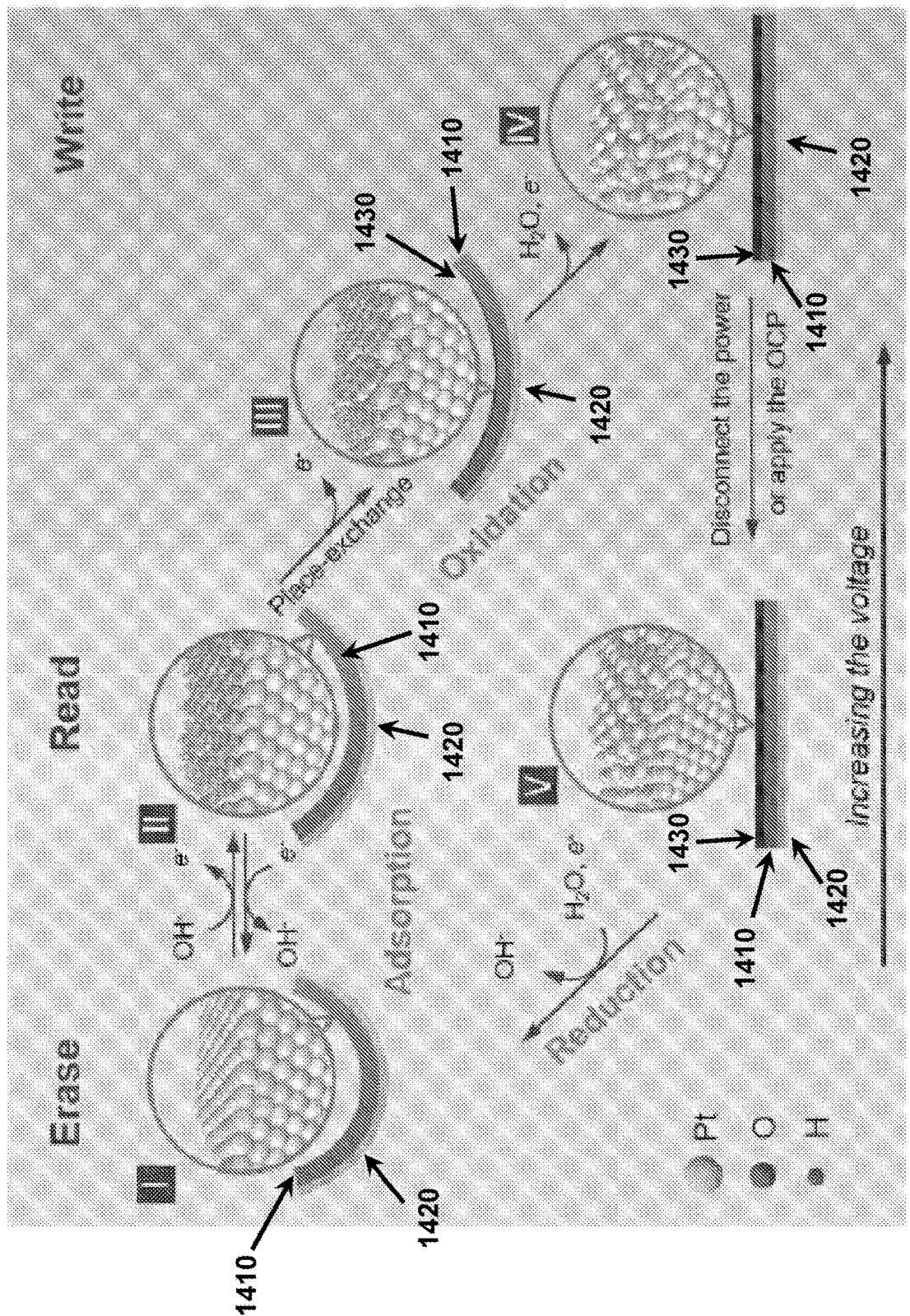
FIG. 14 shows a schematic illustration of the electrochemical processes in a SOMA.

FIG. 14 shows a schematic illustration of the electrochemical processes in a SOMA. There is a volatile regime (state I, II) associated with $O^{2-}/OH^-$ adsorption/desorption at lower voltages and a shape memory regime (from state II to IV, and from state V to I) associated with nonvolatile oxidation and reduction of the platinum in a broader voltage range. Layer 1410 in FIG. 14 is Pt; layer 1420 is an inert layer; layer 1430 is PtOx. OCP-open circuit potential.

FIG. 14 shows the electrochemical behavior of the SOMA and illustrates the mechanism behind its operation. Low voltages cause reversible electrochemical adsorption of $O^{2-}/OH^-$ ions from the water onto the Pt (states I-II in FIG. 14); this is the basis for the SEAs electrochemical actuators discussed in detail above. At higher positive voltages, the initial $O^{2-}$ adatoms undergo an interfacial place-exchange process with the Pt surface atoms leading to a quasi-3D surface lattice, and finally exchange with the deeper Pt ions to form a nm-thick non-stoichiometric oxide PtOx (states III-IV in FIG. 14). Unlike adsorption of ions onto the surface at low voltages, this oxidation process is irreversible. The cyclic voltammetry shows there is a separation of ~1 V between the oxidation plateau and the reduction peak (the top curve in FIG. 15). in FIG. 15 also shows the curvature of the actuator measured during this process. In the oxidation regime over the range-0.4 V to +1.3 V, a large hysteresis is observed due to the chemically irreversible growth and reduction of platinum oxide.

Figure 15:
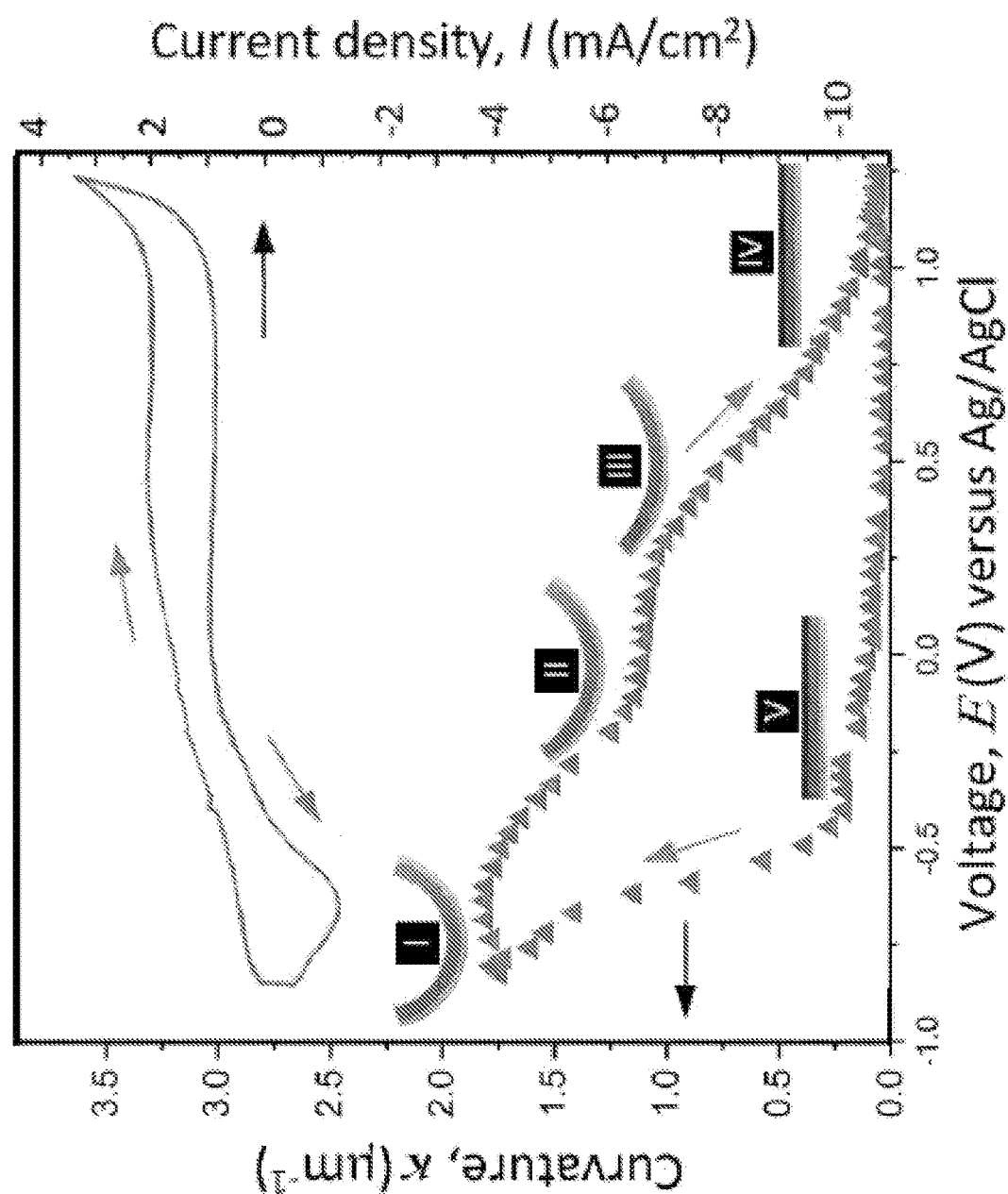
FIG. 15 illustrates example results of in situ characterization of the cyclic voltammetry and bending curvature of a SOMA versus applied voltage.

FIG. 15 illustrates example results of in situ characterization of the cyclic voltammetry and bending curvature of a SOMA versus applied voltage at a sweep rate of 1 V/s. Roman numerals indicate corresponding states in the electrochemistry schematic shown in FIG. 14.

Figure 16:
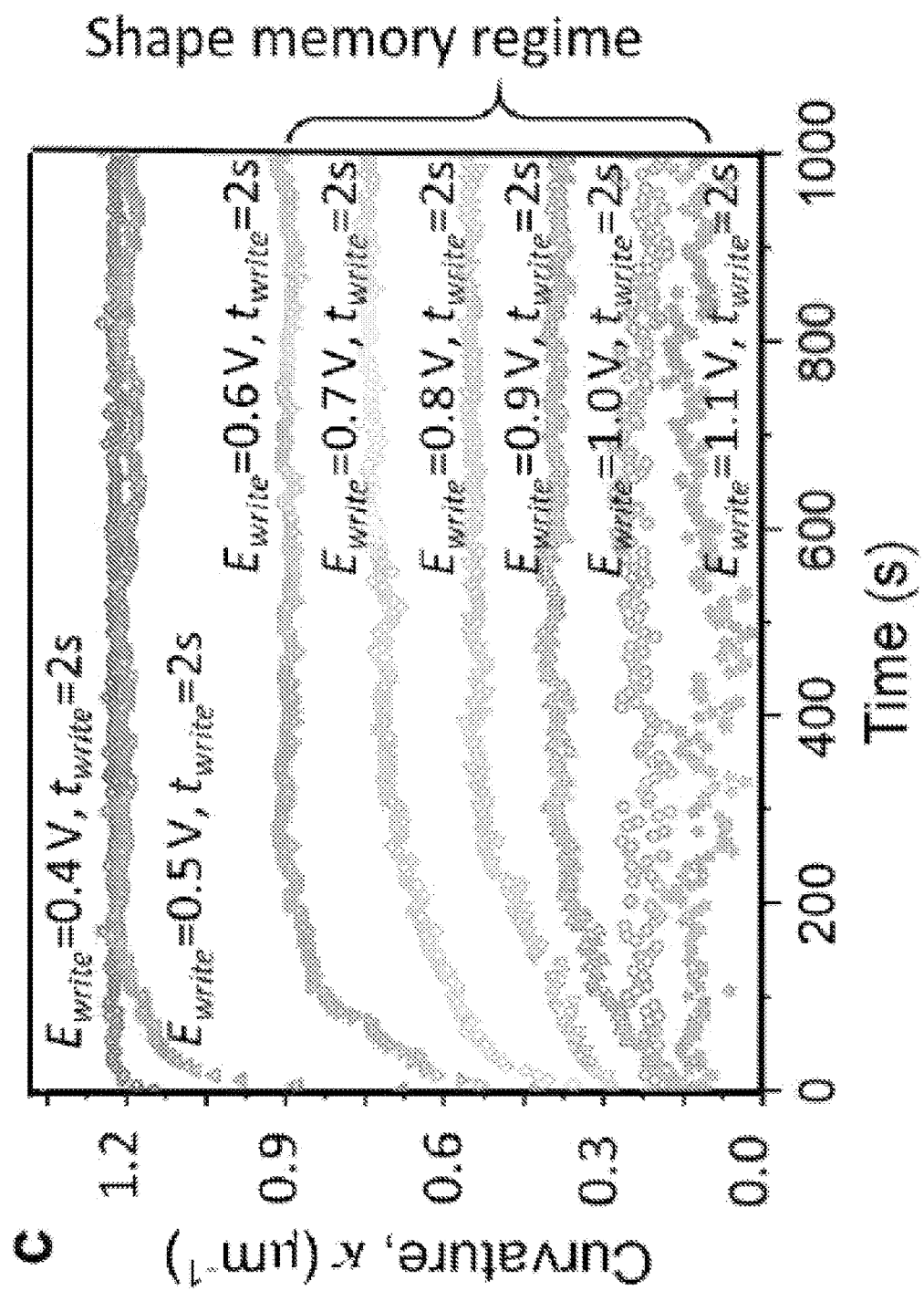
FIG. 16 illustrates curvature variations of a SOMA when the SOMA is oxidized at different voltages.

FIG. 16 illustrates how the curvature of a SOMA varies with time when the SOMA is oxidized at different voltages for 2 s and disconnected from the power source. The stable saturation state at a curvature of 1.2 $\mu m^{-1}$ corresponds to rapid ion equilibration at the platinum surface as $O^{2-}/OH^-$ desorbs (top two curves) under the open circuit potential ~ 0.3-0.4 V. The other stable saturation states stem from the different thicknesses of the platinum oxide layers that develop under application of higher voltages from 0.6 V to 1.1 V.

Figure 17:
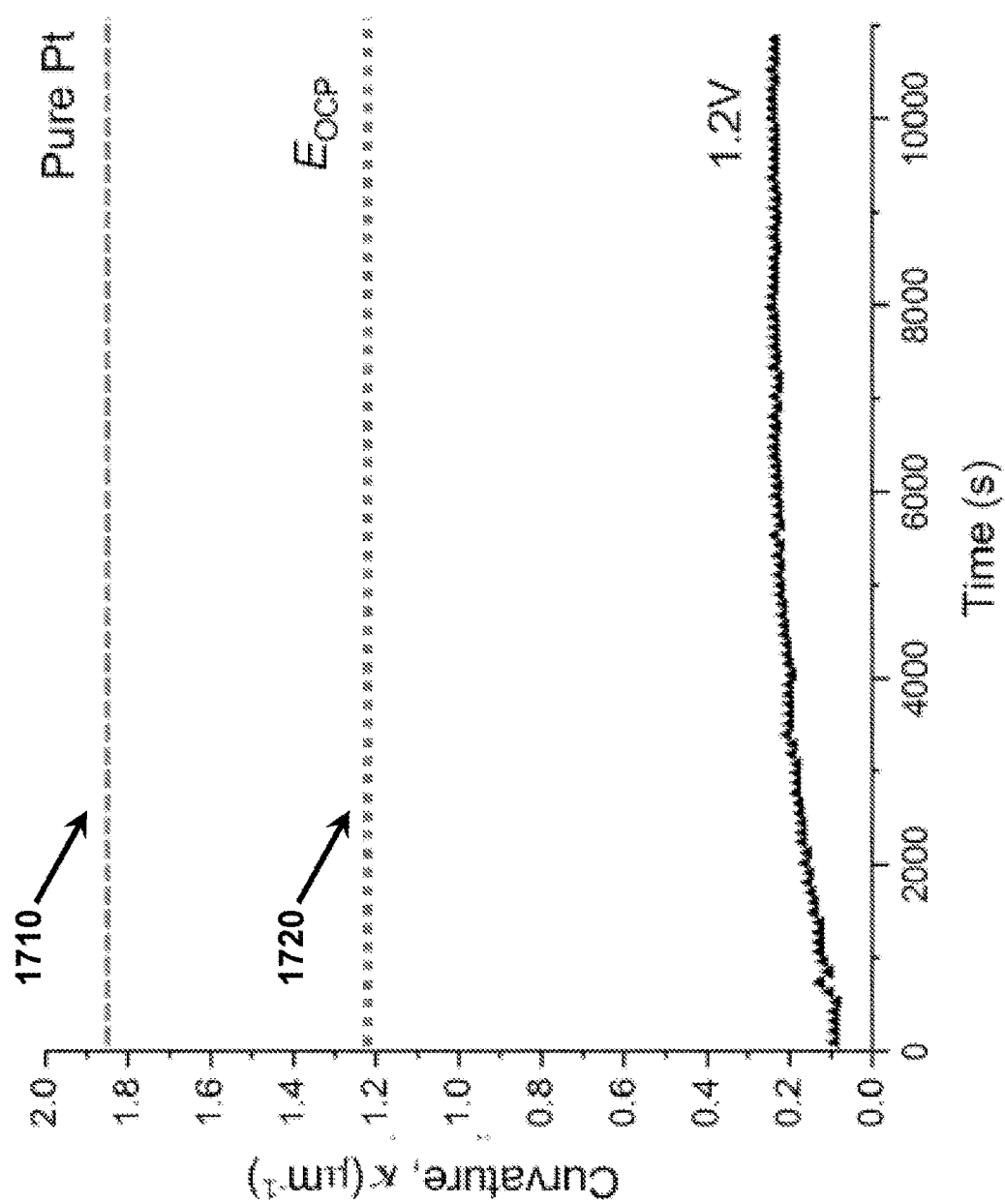
FIG. 17 shows example results of long-time curvature measurement of a SOMA after oxidation.
Figure 18:
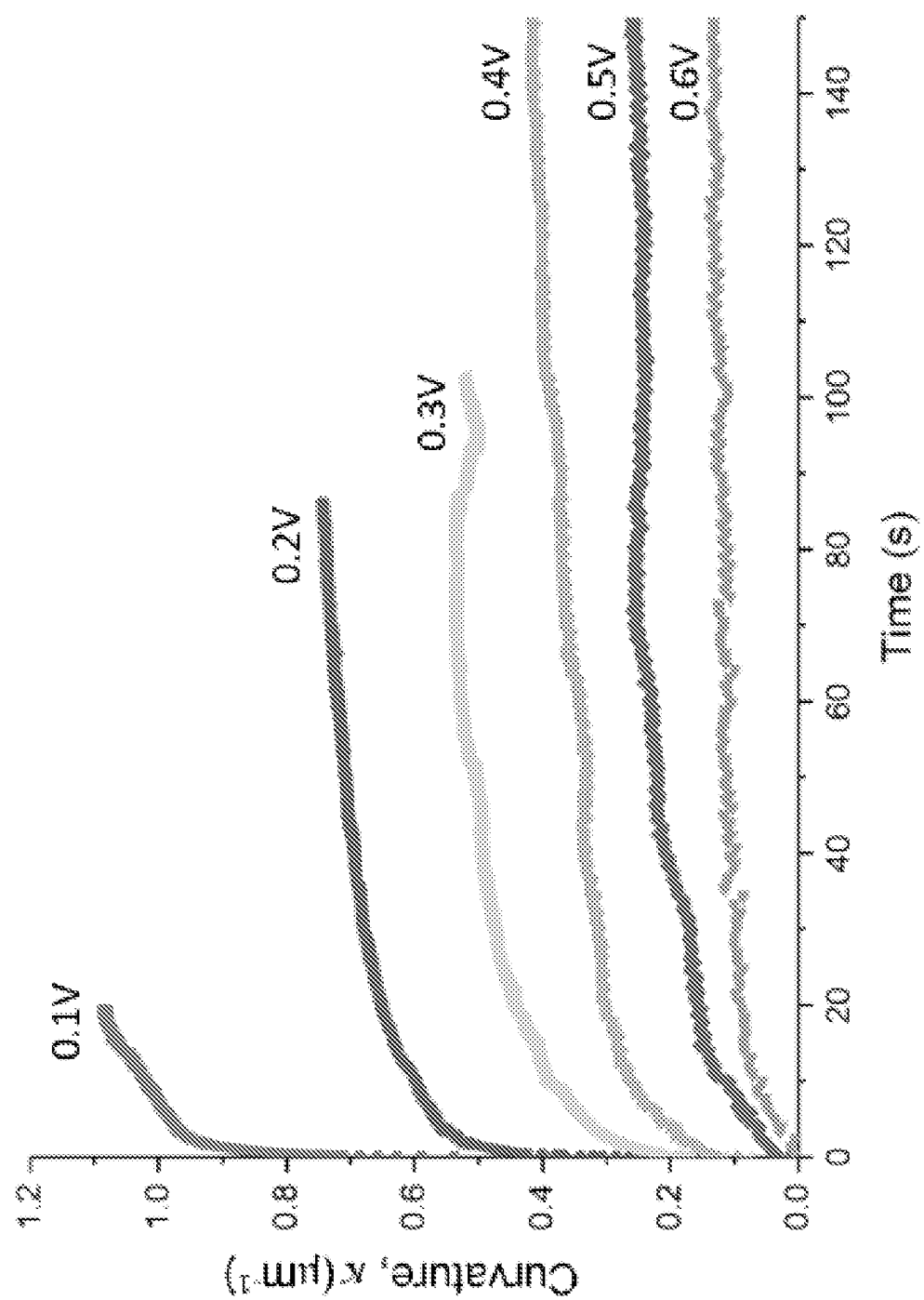
FIG. 18 illustrates an example of tuning the memorized curvature of a SOMA actuator.

If the probe is disconnected from a SOMA in the oxidized state, the actuator retains its curvature due to the reasonably stable oxide layer, as shown in FIG. 16. We begin with the device in the fully reduced state, apply a constant oxidizing voltage for 2 s, disconnect the device, and measure its curvature versus time. For pH=7.46 conditions reported here, removing the probe results in an open-circuit effective potential of approximately 0.3-0.4 V. For voltages lower than 0.5 V, the device curvature relaxes to 1.2 $\mu m^{-1}$ over a time scale of seconds, indicating that no significant oxidation has occurred. For larger applied voltages, the device curvature saturates at a fixed value that depends on the applied voltage and writing time. The SOMA could achieve a number of distinct intermediary oxidized states, which demonstrates an ability to hold multiple curvatures associated with different amounts of oxidation. These curvatures are maintained over time scales longer than hours (FIGS. 17, 18). A subsequent negative voltage can be used to rapidly remove this oxide, returning the actuator to its unoxidized state. This oxidation/reduction process is behind the reconfigurable operation of the SOMAs.

FIG. 17 shows example results of long-time curvature measurements of a SOMA after oxidation at 1.2 V for 2 s. We observe that under a half-cell configuration the curvature exhibits a slight increase on very long-time scales of a few hours. Even after three hours, however, the curvature value is different from the curvatures for the fully reduced Pt without any surface adsorption (dashed line 1710) and the fully reduced Pt with OH adsorbed onto its surface under open circuit potential (dashed line 1720).

FIG. 18 illustrates that by maintaining the SOMA actuator in a full-cell configuration one can apply a voltage to tune the memorized curvature. The SOMA actuator is oxidized at 1.2 V for 2 s and the potential of the SOMA actuator is set to different voltages marked in the figure. We observe different saturation values for the curvatures corresponding to the different applied voltages.

Figure 19A:
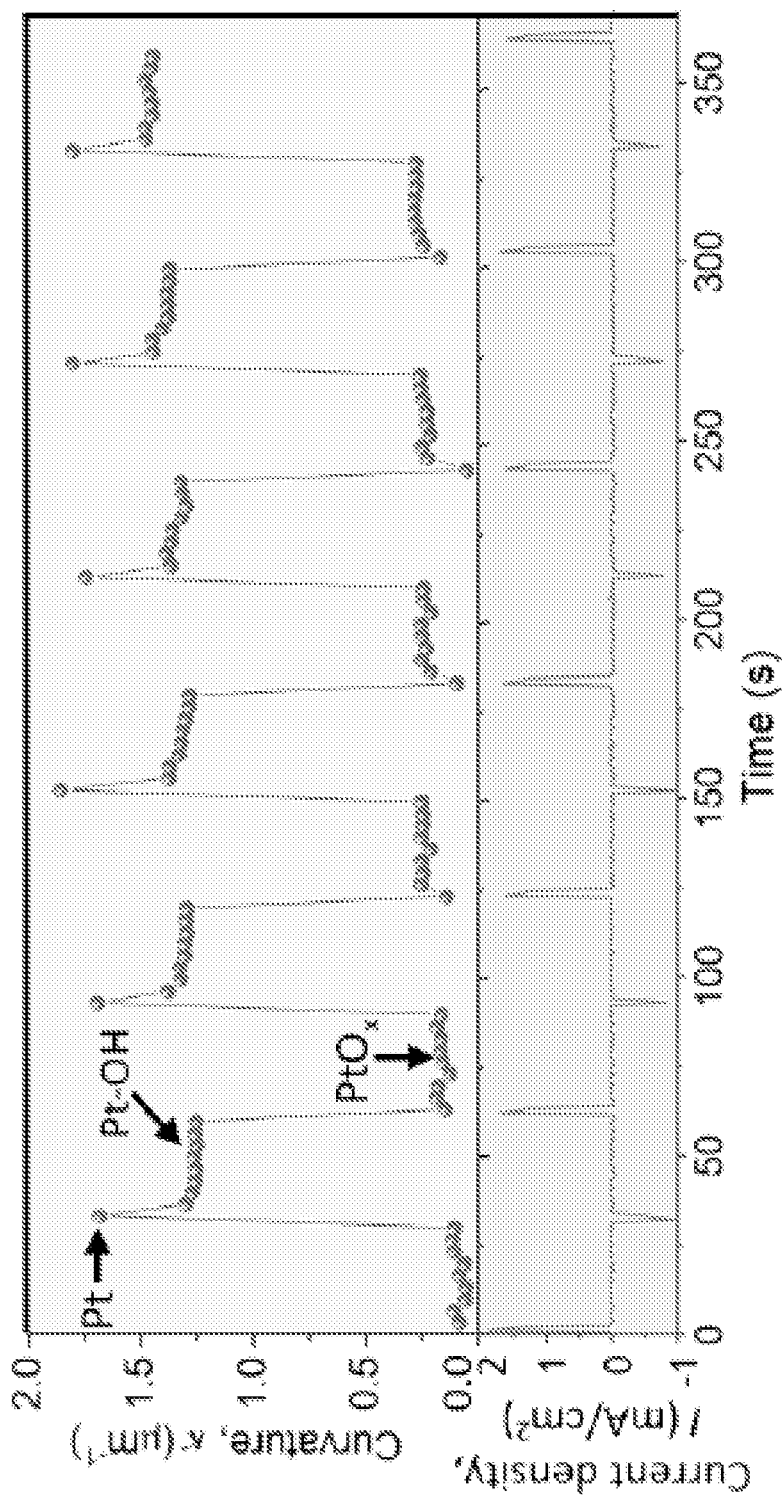
FIG. 19A illustrates an example dependence of the bending curvature of a SOMA hinge on applied voltage pulses.

FIG. 19A shows the bending curvature of a SOMA hinge (top) that is toggled between the reduced and oxidized shape memory states via short writing (1.1 V) and erasing (−0.5 V) pulses (bottom).

Figure 19B:
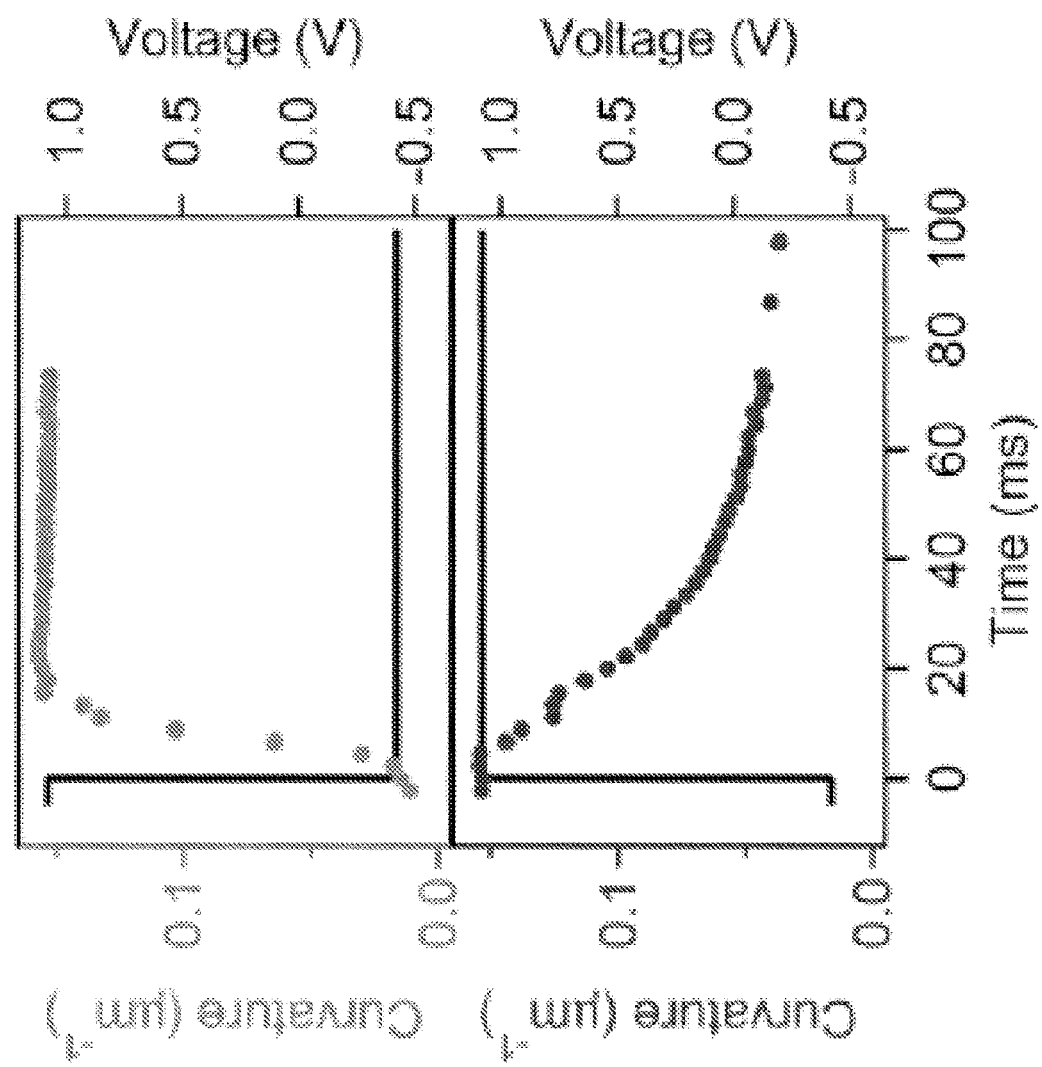
FIG. 19B shows an example dependence of the normalized curvature of a Pt/Ti SOMA hinge versus time.

FIG. 19B shows an example dependence of the normalized curvature of a Pt/Ti SOMA hinge versus time. We find that the curvature rapidly switches on a time scale ~100 ms during the oxidation of the platinum (bottom panel). We find an even faster switching time of ~10 ms during the reduction of the platinum (top panel).

Figure 19C:
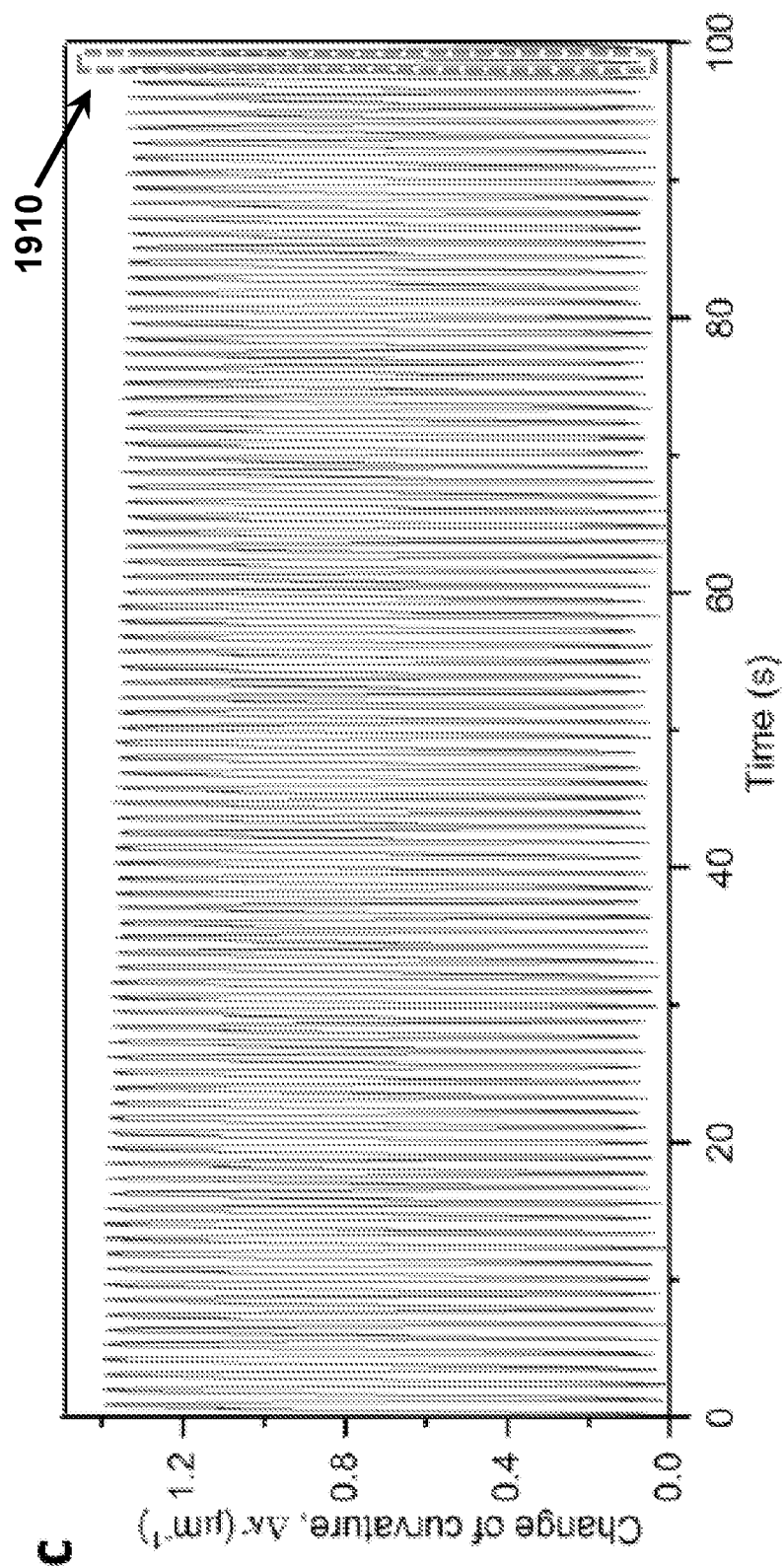
FIG. 19C shows an example dependence of SOMA hinge curvature versus number of actuation cycles.

FIG. 19C shows an example dependence of SOMA hinge curvature versus number of actuation cycles with an applied voltage sweep of −0.4 V to 1.05 V at a frequency of 1 Hz.

Figure 19D:
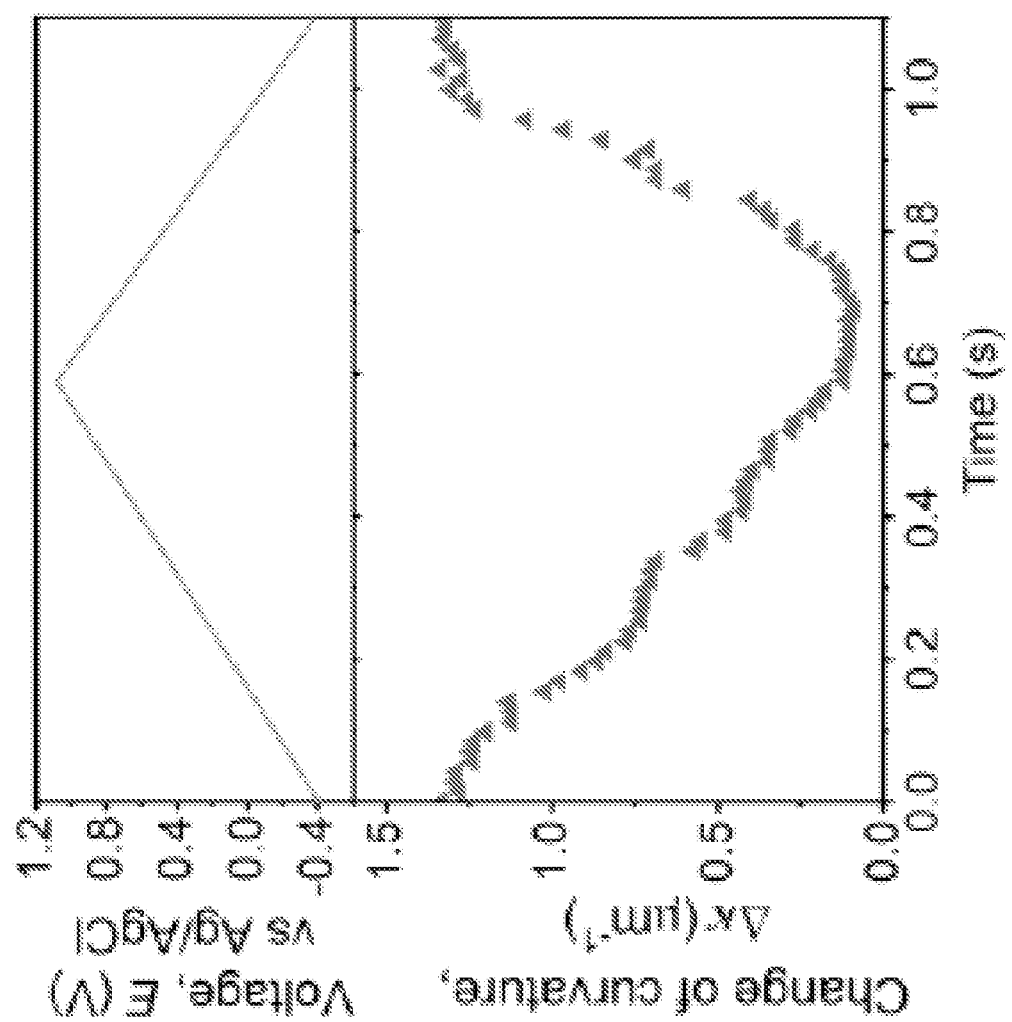
FIG. 19D shows an example of the curvature change of a SOMA hinge for one cycle in response to the writing voltage.

FIG. 19D shows the curvature change for one cycle shown in the red dash rectangle 1910 in FIG. 19C in response to the writing voltage. We find that SOMA actuators can be cycled over 100 times with only a 3% variation in the curvature amplitude.

FIG. 19A shows rapid switching between the oxidized and reduced states using brief electrical pulses of 1.5 V and 0.5 V, respectively, a process reminiscent of writing/erasing electronic states in a non-volatile information storage device. After removing the reducing voltage of −0.5V, the pure Pt surface of the actuator quickly absorbs $O^{2-}/OH^-$ species, leading to the fast relaxation of the curvature to a stable value. The curvatures associated with the oxidized and OH-absorbed states were maintained when the power was disconnected. This switching between these states was very fast, as shown in FIG. 19B. The actuator returned to the completely reduced state in less than 20 ms, a time scale that depended on actuator dimensions and is consistent with fluid drag limited motion. The oxidation process was more complex, with longer time dynamics (FIG. 19C). The bulk of the response, however, took place in less than 100 ms. In addition, we observed that SOMAs had high cyclability, with only a 3% change in the bending curvature after the first 100 cycles (FIG. 19B). Collectively, the low voltage operation, fast writing speed, long-time stability, high cyclability, and small size establish SOMAs as a robust technology for implementing electrical shape memory at the microscale.

Further understanding and control of the function of the SOMAs can be obtained by determining how the applied voltage and the amount of time that we apply this voltage sets the thickness of the platinum oxide layer and the resulting actuator curvature. To determine the oxide layer thickness, we conduct a separate experiment to measure the in-plane conductivity of ALD platinum thin films during electrochemical oxidation as shown in FIGS. 20A-D.

Figure 20A:
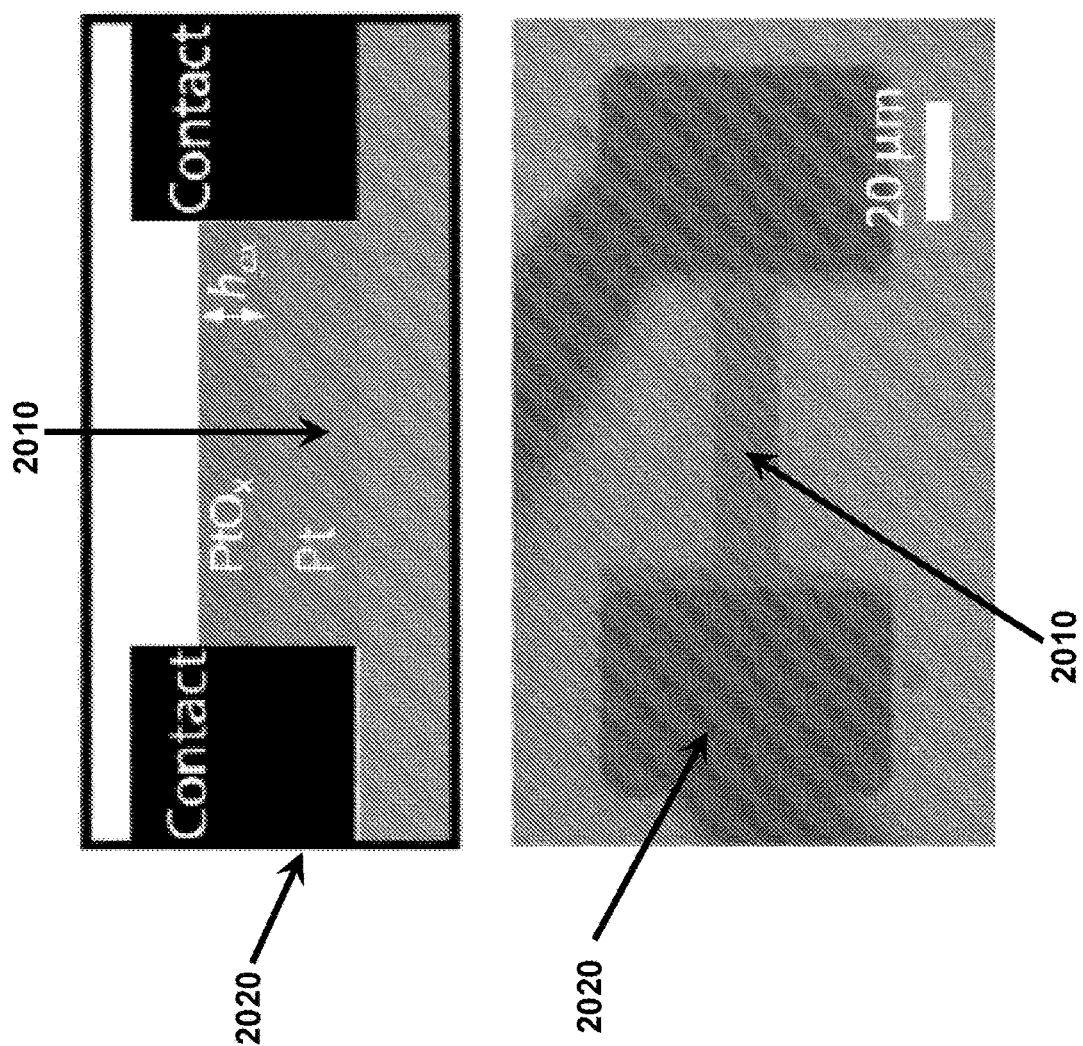
FIG. 20A shows a schematic of a Pt/PtOx resistor and a micrograph of a platinum resistor used to measure conductance as a function of voltage.

FIG. 20A shows a schematic of a Pt/PtOx resistor (top panel) and a micrograph of the platinum resistor used to measure conductance as a function of voltage (bottom panel). The dark grey bar 2010 in the middle (bottom panel) is the ALD platinum film and the black rectangles 2020 are thick platinum contacts. Using two probes, we apply a small (<100 mV) source-drain bias across the platinum while sweeping the voltage of the electrolyte versus the platinum with an Ag/AgCl electrode.

Figure 20B:
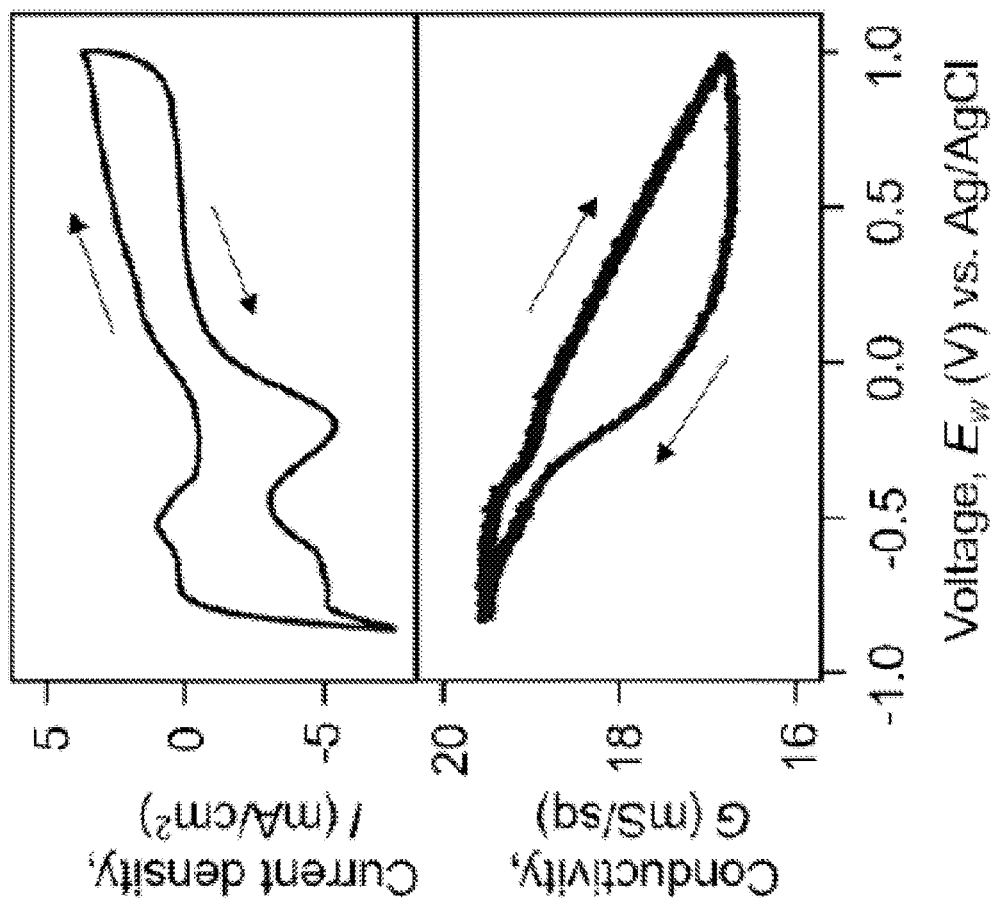
FIG. 20B illustrates changes in the conductance of a platinum film versus voltage.

FIG. 20B shows changes in the conductance of the platinum film versus voltage using a triangle wave sweep. Arrows on the graph indicate the direction of the hysteresis loop.

Figure 20C:
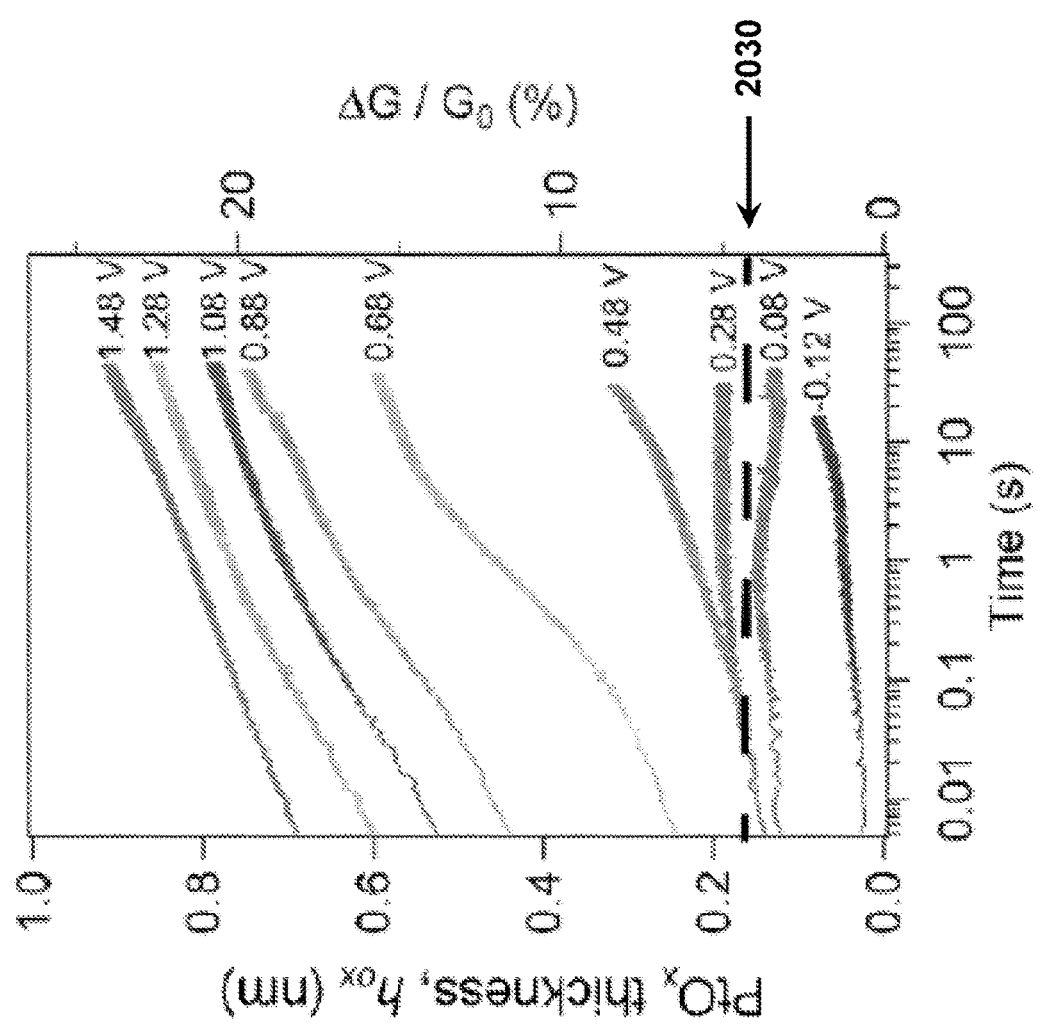
FIG. 20C illustrates an example dependence of an estimated platinum oxide thickness versus log of time for a range of voltages.

FIG. 20C shows an example dependence of an estimated platinum oxide thickness versus log of time for a range of voltages. We use the change in conductance versus time to estimate thickness of the platinum oxide. For voltages greater than about 0.7 V versus Ag/AgCl, we see linear growth versus log (t).

Figure 20D:
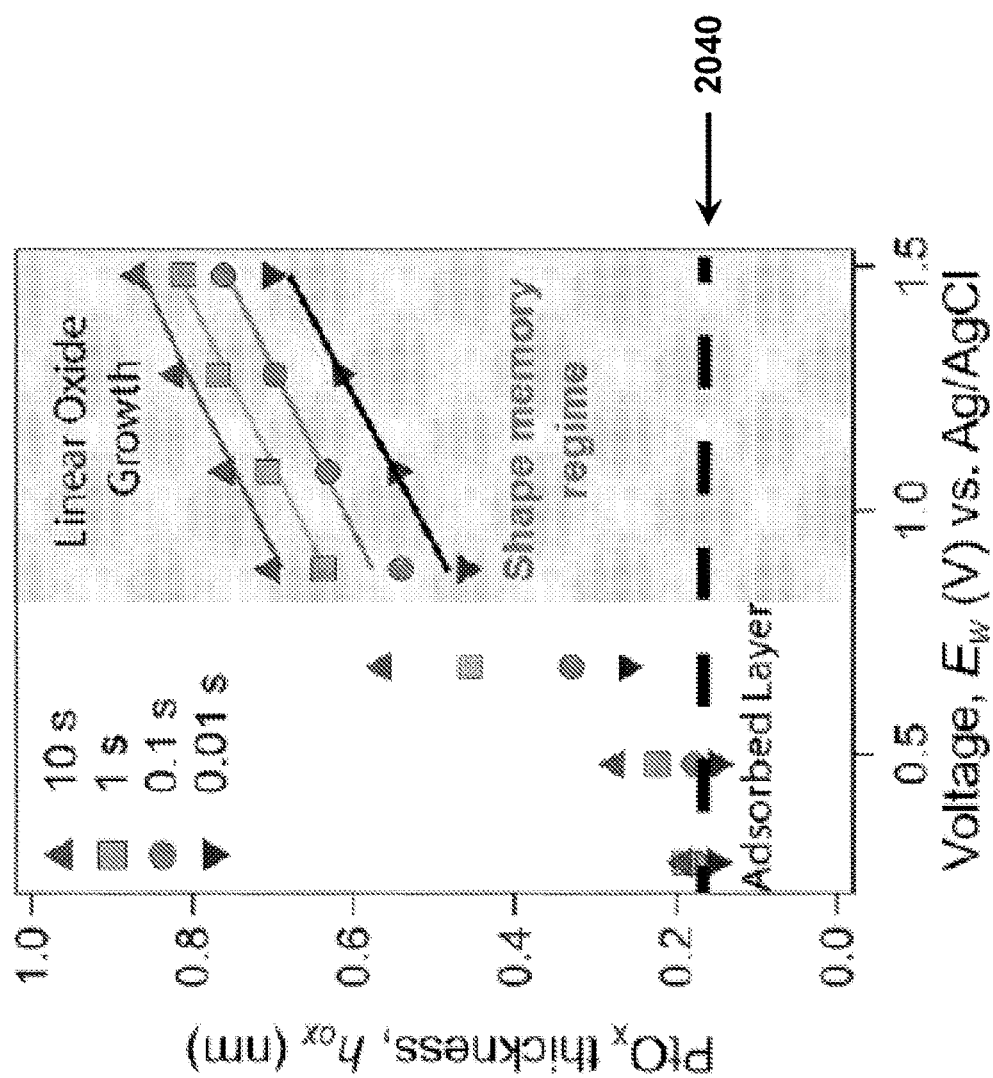
FIG. 20D shows an example dependence of an estimated platinum oxide thickness as a function of voltage at fixed oxidation times.

FIG. 20D shows an example dependence of an estimated platinum oxide thickness as a function of voltage at fixed oxidation times. The dash lines 2030 and 2040 in FIG. 20C and FIG. 20D, respectively, indicate the thickness of adsorbed Pt—OH that exists at the open circuit potential.

The thin (approximately 5 nm) ALD Pt film shown in FIG. 20A was grown by the same process as the SOMA. Its in-plane conductance is shown as a function of the electrochemical potential of the surrounding electrolyte in FIG. 20B. This measurement shows a large decrease in conductance during oxidation of the platinum film, consistent with previous measurements on thin film platinum. Since platinum oxide has a 10-5-fold smaller conductivity than platinum, the change in conductance is directly proportional to the thickness of the oxidized layer. The oxide growth and reduction also show a large hysteresis curve, consistent with curvature measurements.

Figure 21:
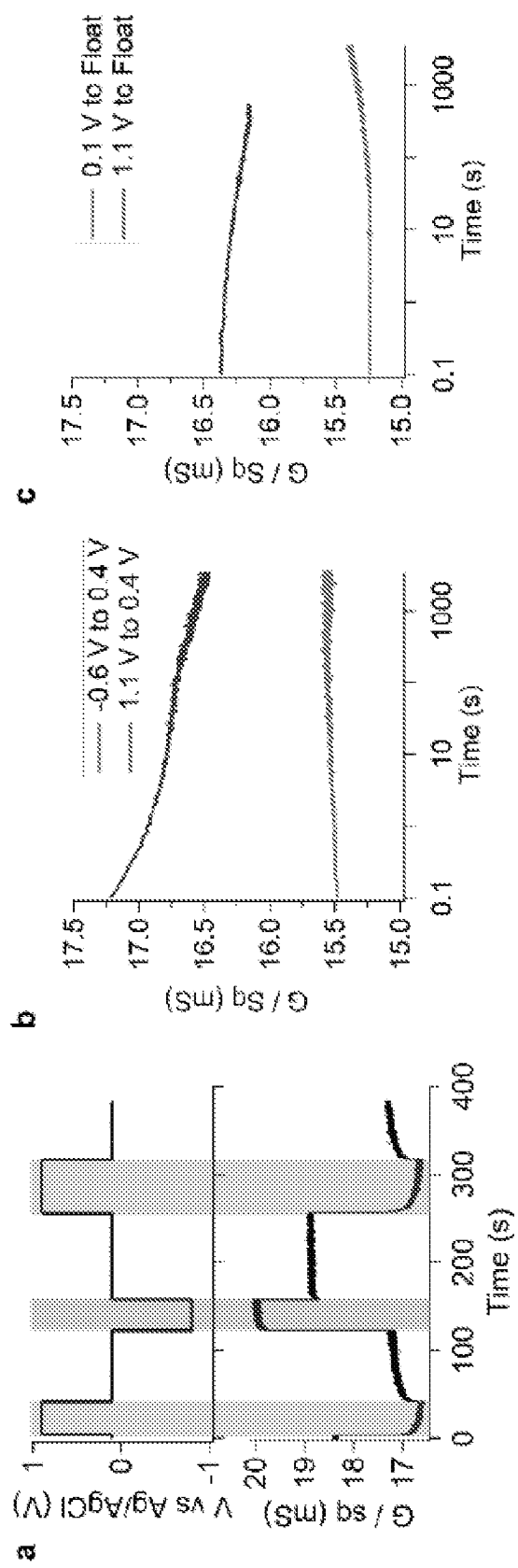
FIG. 21 shows example results of in-plane conductance measurements of platinum thin films during oxidation.

As mentioned above, FIG. 20C shows the inferred thickness of oxide as a function of time for different oxidizing voltages. We set the zero of oxide thickness at approximately-0.3 V versus Ag/AgCl, a potential where the surface is completely reduced but hydrogen adsorption has not yet taken place. At low positive voltages, about 0 V to 0.3 V versus Ag/AgCl, we measure a small change in thickness that is steady over time corresponding to the adsorption of oxygen on the platinum surface. At higher potentials, the oxide thickness grows continuously over time, but remains very thin, ~1 nm, even for long growth times, consistent with prior literature. Above ~0.7 V, the oxide grows logarithmically with time. The slope on a log t scale is relatively insensitive to the voltage above 0.7 V. When oxide thicknesses are compared after applying different fixed voltages for the same amount of time, the oxide thickness is also linear in voltage above 0.7 V, as shown in FIG. 20D. These results agree with the theory and experiments of Conway, whose place exchange model for oxygen at a platinum interface predicts $t_{ox} \sim B\ln(t)+C(V)$. They disagree with the model of Cabrera and Mott and other more recent theories where the rate limiter is the escape of Pt ions from the buried Pt/oxide interface. Based on our experiments, the oxide thickness ($h_{ox}$) is approximately given by:

$$h_{ox} = h_r\left(\frac{V - V_i}{V_0} + \ln\left(\frac{t}{t_i}\right)\right) \quad (1)$$

where $h_r \approx 0.026$ nm, $V_0 \approx 0.09$ V, and $V_i$ and $t_i$ are coupled fit parameters such that if $t_i=1$ s, $V_i \approx -1.3$ V. Based on equation (1), the growth rate for the oxide layer has an exponential dependence on thickness and voltage:

$$\frac{dh_{ox}}{dt} = Ce^{(V/V_0' - h_{ox}/h_0)} \quad (2)$$

with $C \approx 2.6 \times 10^4$ nm/s. This dependence indicates that the oxide layer provides an effective energy barrier to further growth. Thus, when the applied voltages are low, as is the case in the open circuit potential, a very thin oxide layer is sufficient to effectively halt further oxidation. At higher voltages, oxidation proceeds deeper into the platinum before slowing to a negligible rate. Conversely, the oxide film also forms a barrier for reduction of the film, which explains why SOMAs can maintain their stability for such long times (FIG. 21). Significantly, these measurements allow us to set (or "write") a desired oxide thickness on the SOMA by selecting an oxidation time and voltage.

If the strain of the oxide layer is calibrated, the oxide layer thickness hox can in turn be used to predict the change in curvature, Δκ, for a SOMA hinge via the Stoney equation:

$$\Delta \kappa = \frac{6(1-v)E_{ox}h_{ox}}{E_s h_s^2}\varepsilon_{ox} \quad (3)$$

where $\varepsilon_{ox}$, $E_s$, $E_{ox}$, $h_s$, and v are the strain of the oxide layer, Young's moduli of the Pt/TiO$_2$ substrate and oxide layer, thickness of the Pt/TiO$_2$ substrate, and Poisson ratio respectively (see Supplementary Information for details). The moduli and Poisson ratio are obtained from the literature while the film thicknesses can be estimated from the SEM measurements of the device thickness and the thickness of the oxide layer. The only parameter that requires calibration is $\varepsilon_{ox}$. To calibrate this strain, we use the data from the 0.4 V and 1.1 V curves in FIG. 16 and find that $\varepsilon_{ox}$~3%. This value is less than but comparable to the relative expansion of PtO$_2$ compared to Pt of about 10%, indicating either an incomplete oxide layer formation or other mechanisms of stress relief besides bending. Once this calibration is established then combining equations (1) and (3) determines the curvature for any combination of oxidation voltage and time.

FIG. 21 shows example results of in-plane conductance measurements of platinum thin films during oxidation. FIG. 21, panel a shows changes in conductance versus time as the potential is switched between an oxidizing 0.9 V "write" state (highlighted in red), a reducing-0.8 V "erase" state (highlighted in blue), and a 0.1 V read state (no highlight). The difference in conductance in the read state before and after writing demonstrates memory. FIG. 21, panels b and c show the stability of the electrical memory with two different read states: FIG. 21, panel b, for a read state of 0.4 V vs Ag/AgCl and FIG. 21, panel c, for a read state in which the solution voltage is floating, corresponding to half-cell measurements of curvature in the main text. In both cases, a large difference in the conductance remains over the course of the measurement and drifts slowly toward equilibrium on a logarithmic timescale.

Figure 22A:
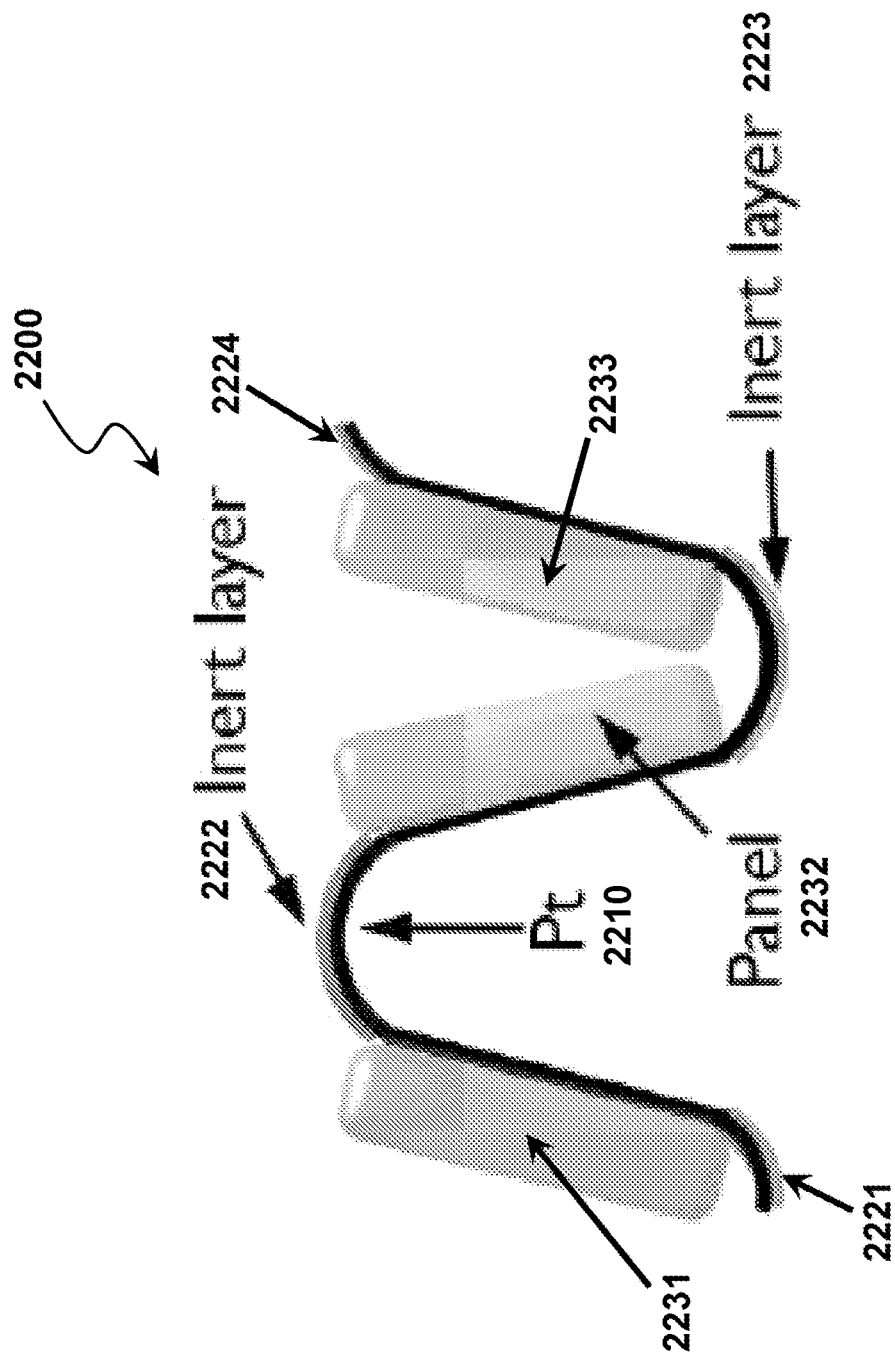
FIG. 22A shows an example schematic of a cross-section of a bidirectionally folded SOMA device according to the disclosed technology.

FIG. 22A shows an example schematic of a cross-section of a bidirectionally folded SOMA device 2200 wherein folding of the device is defined by the alternating deposition of Pt and Ti layers and rigid panels. SOMA 2200 includes a layer of platinum 2210. The SOMA device 2200 further includes panels 2231, 2232, and 2233 disposed on the platinum layer 2210. FIG. 22A shows that all the panels are disposed on the same side of the layer 2210. In other embodiments of SOMA devices according to the disclosed technology, some of the panels can be disposed on a first side of a platinum layer while other panels can be disposed on a second side of the platinum layer which is different from (e.g., opposite to) the first side. SOMA 2200 further includes layers or patches 2221, 2222, 2223, and 2224 of an inert material (e.g., Ti or TiO$_2$, or graphene or any other suitable inert material) that are disposed on the platinum layer 2210 between the panels 2231-2233. As shown in FIG. 22A, layers 2222 and 2224 of the inert material are disposed on the same side of the layer 2210 on which the panels 2231-2233 are disposed while layers 2221 and 2223 of the inert material are disposed on the side of the platinum layer 2210 that is opposite to the side having the panels 2231-2233. As illustrated in FIG. 22A, arrangement of the panels as well as patches or layers of the inert material on the platinum layer 2210 determines the locations at which the SOMA 2200 will bend in response to application of an actuation voltage to the SOMA as well as determines direction in which the SOMA will bend at each bending location. As shown in FIG. 22A, under application of an actuating voltage, the SOMA 2200 will bend in a SOMA region between the panels 2231 and 2232 in the direction from the inert layer 2222 toward the metal layer 2210. As further shown in FIG. 22A, under application of an actuating voltage, the SOMA 2200 will also bend in a SOMA region between the panels 2232 and 2233 in the direction from the inert layer 2223 to the metal layer 2210. As also shown in FIG. 22A, the directions of bending in the mentioned SOMA regions are opposite to each other. Note that in other embodiments, the direction of SOMA bending can be from the metal layer of the SOMA toward an inert layer of the SOMA that is disposed on the metal layer. The technology disclosed herein is not limited to the example arrangement of the panels and inert material illustrated in FIG. 22A and other arrangements of the panels and/or the inert material can be provided to enable bending of the SOMA devices according to the disclosed technology at one or more desired bending locations in one or more desired bending directions.

Figure 22B:
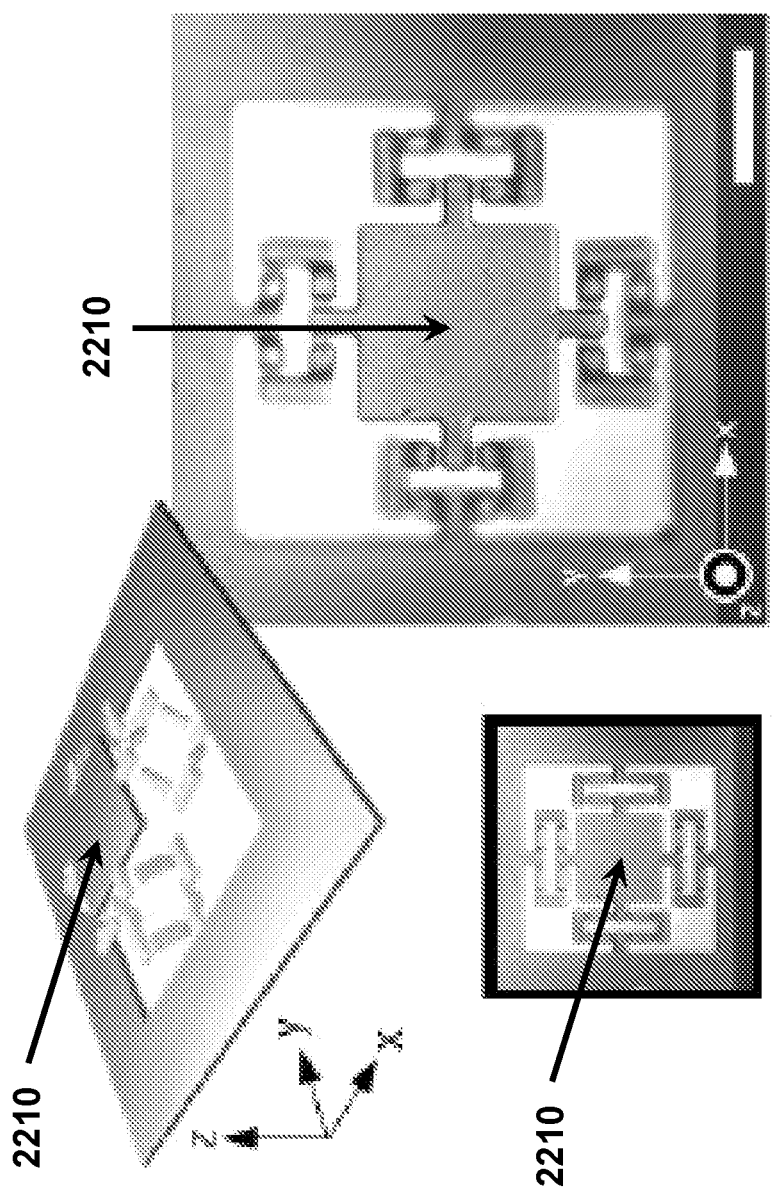
FIG. 22B shows an example of a kirigami-based bistable micro-positioner according to the disclosed technology.

FIG. 22B shows an example of a kirigami-based bistable micro-positioner that moves the central stage 2210 to a new fixed position along the z axis.

Figure 22C:
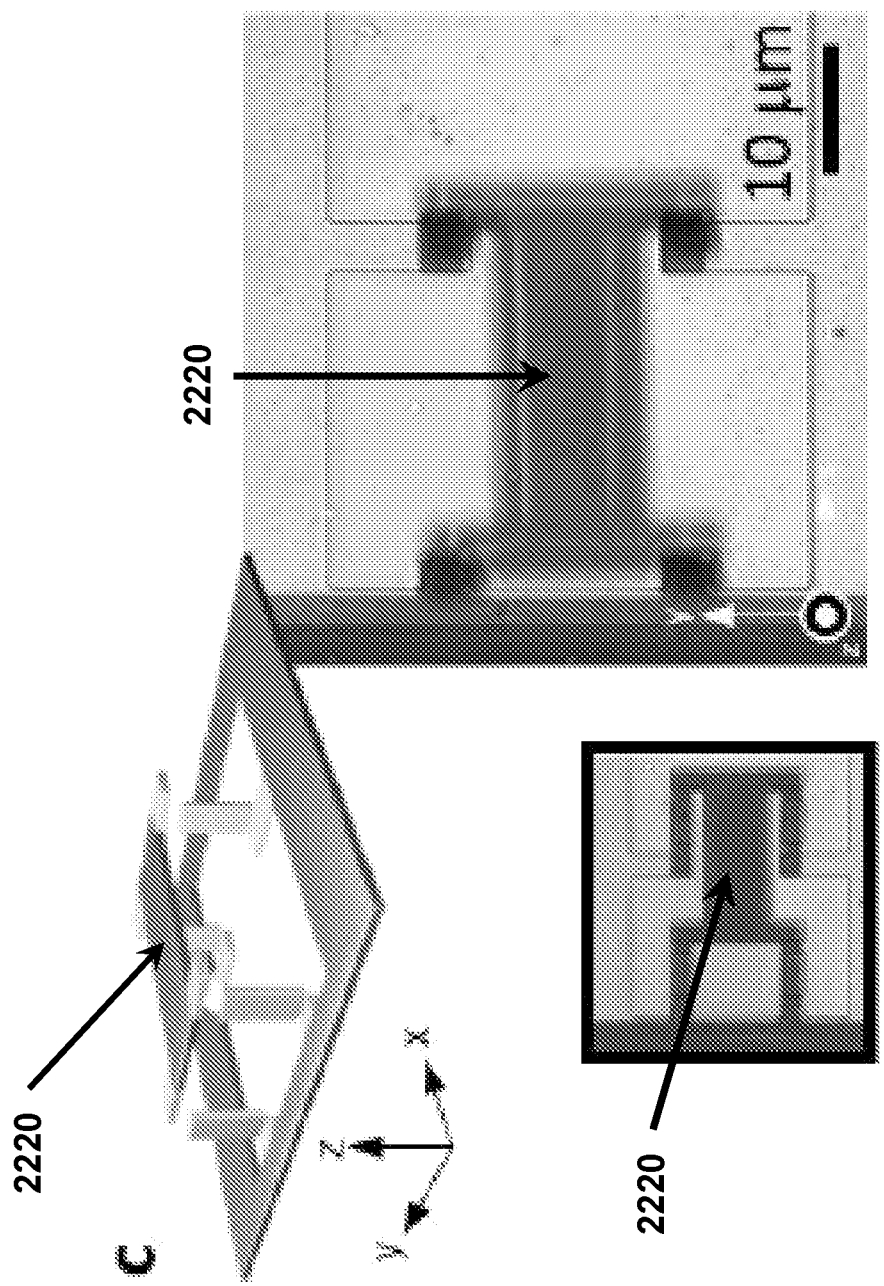
FIG. 22C shows an example of another kirigami-based bistable micro-positioner according to the disclosed technology.

FIG. 22C shows an example of a kirigami-based bistable micro-positioner that moves the central stage 2220 to a new fixed position along the x-z plane.

Figure 22D:
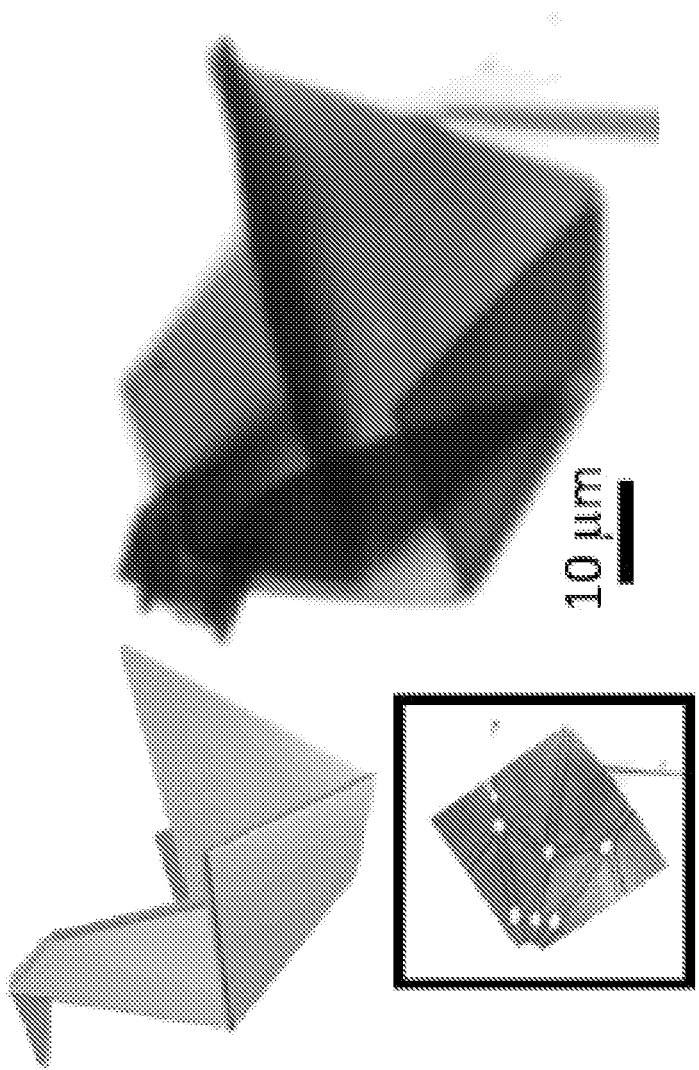
FIG. 22D shows an example of a microscale origami according to the disclosed technology made in a shape of a duck.

FIG. 22D shows an example of a microscale origami according to the disclosed technology made in a shape of a duck.

Figure 22E:
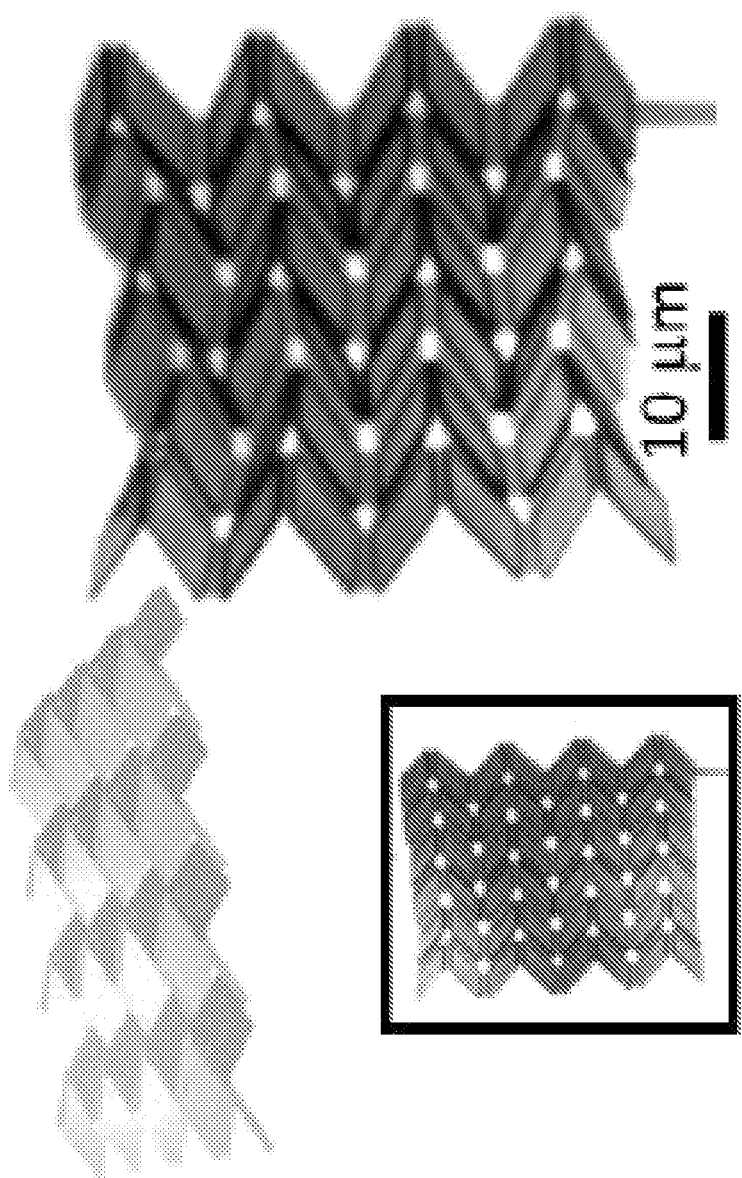
FIG. 22E shows an example of an origami-based microscale metamaterial according to the disclosed technology.

FIG. 22E shows an example of an origami-based microscale metamaterial according to the disclosed technology.

Figure 22F:
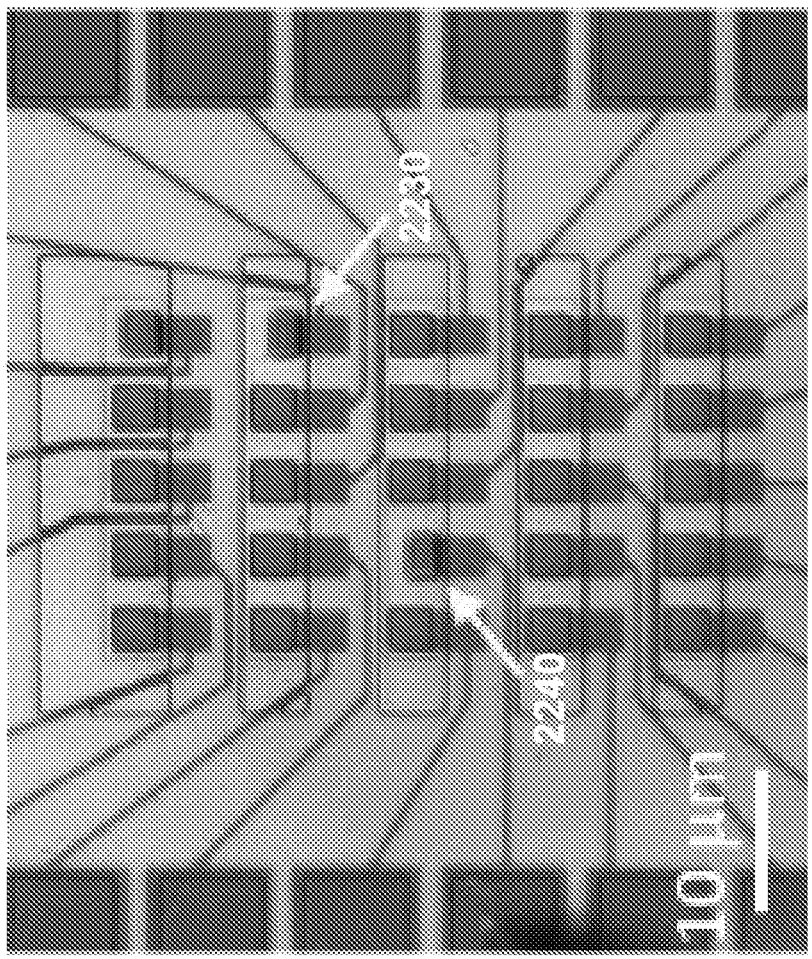
FIG. 22F shows an electrically addressable array of SOMA hinges according to the disclosed technology that can memorize an input signal.

FIG. 22F shows a microscale SOMA array that is configured to detect a signal and maintain memory of that signal. The top arrow 2230 in FIG. 22F points to a previously actuated shape memory element while the bottom arrow 2240 in FIG. 22F points to an element undergoing current actuation.

In FIGS. 22B-E, schematics of the structure, an optical microscopy image of the structure before shape memory actuation, and an optical microscopy image of the structure after shape memory actuation are shown on the top left, bottom left, and bottom right, respectively.

The operation demonstrated in FIGS. 22A-F allows for creating novel microscale devices. Since SOMAs feature standard metal and insulator layers and are compatible with standard planar semiconductor fabrication processes, we can consistently and scalably pattern complex structures consisting of many actuators. We show a variety of such microscale shape memory devices in FIGS. 22A-F. These structures use origami and kirigami based designs, where mountain and valley folds are dictated by the growth order of the Pt and inert layers and location of the rigid panels, an approach modified from a recently developed technology. Bidirectional folding creates combinations of mountain (downward) and valley (upward) folds for complex origami designs, which greatly expands the space of the shapes compared with the simple ones enabled by unidirectional fold actuation shown in FIGS. 10A-E and FIG. 11. Importantly, despite being ultra-thin, these actuators generate a significant force. Based on beam theory, a square SOMA with a change in curvature of 0.5 μm−1 generates a force of 30 nN at its end allowing us to make micro positioning stages that can carry payloads of 20-50 nN (FIGS. 22B and 22C). In FIG. 22D, we fabricate a classic origami motif, a micro-duck folded from a flat sheet. FIG. 22E shows a mechanical metamaterial with negative Poisson ratio, a canonical Miura-Ori pattern, which has been used for shape morphing structures and to demonstrate programmable metamaterials. FIG. 22F shows an electrically addressable array of SOMA hinges that can memorize an input signal. All of the designs in FIGS. 22A-F are stable in both their flat state and their folded state without any external signals applied.

Collectively, SOMAs meet the need for voltage-controlled microscale shape-memory actuators in aqueous environments. They respond quickly (~100 ms) to low voltages (~1 V), obtain sub-micron radii of curvature, and hold their positions for hours in the absence of applied voltages. They can be fabricated in parallel and are built with materials and techniques compatible with photolithography, leading them to numerous applications. Their optical-wavelength-sized radii of curvature could be harnessed to build nanophotonic devices such as mechanically reconfigurable optical metamaterials and metasurfaces, and adaptive topological photonics. The standard CMOS manufacturing process of SOMA allows us to integrate them with microelectronic chips, sensors, and nanogenerators detachable from the substrate, enabling applications in implantable medical devices, tunable mechanical metamaterials, and microscale robotics.

Fabrication of SOMA devices. The fabrication process relies on growing Pt and $TiO_2$, etching these layers, fabricating polymeric panels, and finally releasing the resulting structures. 1) To fabricate the release layer, we sputtered 150 nm aluminum (doped with 1% silicon to create smaller, more uniform grains) on borofloat glass. 2) To protect this release layer during the etching and developing processes we grew an additional 20 nm of $Al_2O_3$ using atomic layer deposition (ALD) at 110° C. $Al_2O_3$ is also etched by the developer but at a much slower rate. Therefore, it protects the Al during fabrication but can be removed in the final step by a prolonged exposure to the developer. 3) To fabricate the devices, a 2.5 nm of $TiO_2$ was grown onto the substrate using atomic layer deposition. 4) A positive photoresist was spin-coated, and the pattern was defined by photolithographic technique. 5) The $TiO_2$ layer was etched by $CF_4$ at 150 W using inductively coupled plasma etching (Oxford PlasmaLab 80+). 6) Next we grew a 7.5 nm of Pt layer onto the $TiO_2$ using atomic layer deposition. 7) Next, a positive photoresist (Microposit S1813 for ABM contact aligner, UV40 for ASML 300C DUV stepper) was spin-coated, and the pattern was defined by photolithographic techniques. 8) The Pt was then etched by an ion mill. 6) We removed the photoresist using an organic solvent. 9) A second 2.5 nm layer of $TiO_2$ was grown onto the Pt using atomic layer deposition. 10) A positive photoresist was spin-coated, and the pattern was defined by photolithographic technique. 11) The $TiO_2$ layer was etched by $CF_4$ at 150 W using inductively coupled plasma etching (Oxford PlasmaLab 80+). 12) A negative photoresist (NLOF 2020 or SU8 2002) was spin-coated and patterned as the rigid panels. 13) Finally, the devices were immersed in a basic developer AZ726MIF containing 2.38% tetramethylammonium hydroxide for several hours to etch the aluminum and $Al_2O_3$ sacrificial layers, thereby releasing the devices into the solution. The devices were then washed using deionized water several times and transferred into 1× phosphate-buffered saline (PBS) solution. A schematic for the fabrication of a device with unidirectional folding is shown in FIG. 13.

In some of the measurements and fabricated devices shown in FIGS. 22A-F, sputtered Ti was used as the capping layer, which produced a larger bending radius of 2-5 μm (FIGS. 23 and 24), allowing us to simplify the fabrication process and create larger structures that were easier to image in situ via optical microscopy. In such cases, we replace steps 3-5 and 9-11 with the following processes: 1) A negative photoresist (NLOF 2020 or SU8 2002) was spin-coated and patterned. 2) A 2.5 nm layer of Ti was sputtered onto the sample at 3 mTorr and 400 W. 3) The sputtered Ti on top of the photoresist was lifted off via development of the photoresist.

Figure 23:
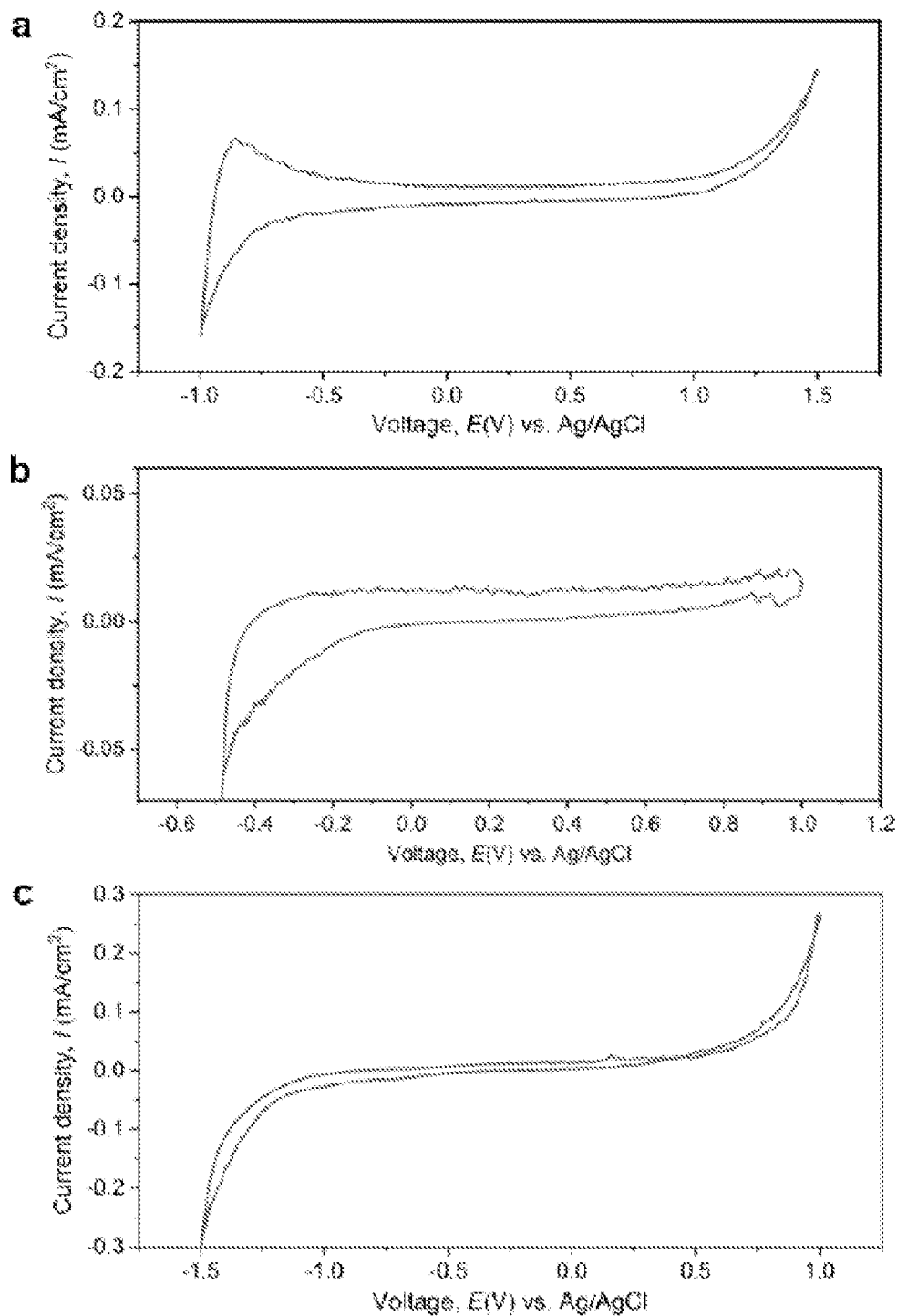
FIG. 23 shows example cyclic voltammetry curves for a 2.5 nm-thick sputtered Ti layer.

FIG. 23 illustrates that cyclic voltammetry of a 2.5 nm-thick sputtered Ti layer shows that the capping layer does not exhibit any peaks associated with electrochemical reactions over the voltage ranges reported. Measurements were taken in solutions of 1×PBS (panel a in FIG. 23), 0.5 M sulfuric acid (panel b in FIG. 23), 0.5 M sodium hydroxide (panel c in FIG. 23). The absence of the electrochemical reaction peaks of Ti across the wide voltage window ensures titanium an ideal passive layer.

Figure 24:
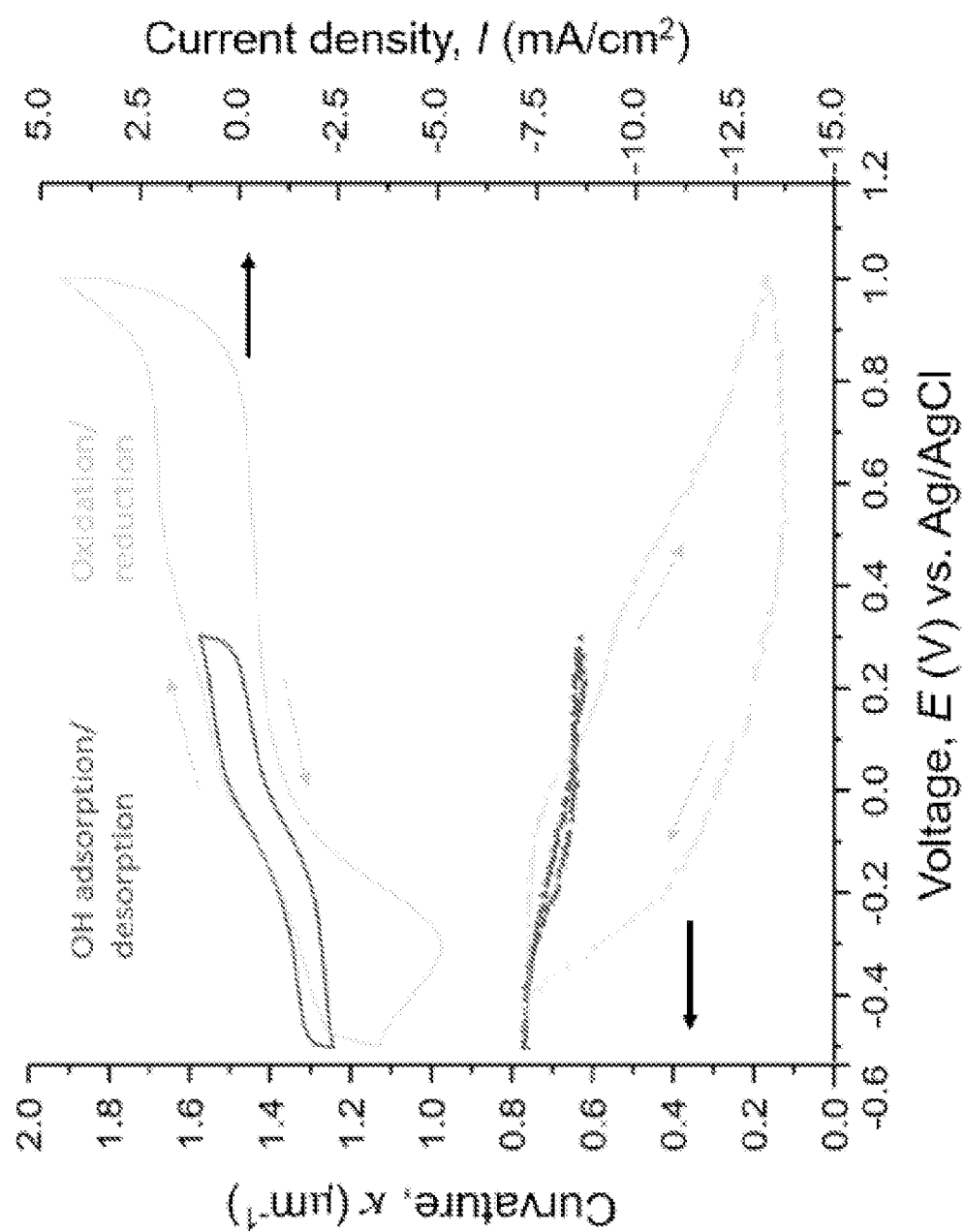
FIG. 24 shows example results of in situ characterization of the cyclic voltammetry and bending curvature of a SOMA actuator according to the disclosed technology.

FIG. 24 illustrates example results of in situ characterization of the cyclic voltammetry and bending curvature versus applied voltage of a SOMA actuator with Ti as the alternative inert layer in the $OH^-$ (darker curves) and oxidation (lighter curves) regimes. The change of curvature is approximately 0.5 $μm^{-1}$, which is about three times smaller than the curvature change in the $Pt/TiO_2$ devices.

High Resolution Transmission Electron Microscopy imaging was performed for the actuators fabricated by depositing 70 cycles of Pt followed by 40 cycles of $TiO_2$ on a bare silicon wafer. An amorphous carbon layer (Sharpie marker) was smeared on top of the $TiO_2$ to protect samples during the subsequent procedure. To image the cross-section of the $Pt/TiO_2$ bimorph using transmission electron microscope (TEM), a thin cross-sectional lamina was milled from the top of the sample using an ion beam (Thermo Fisher Helios G4 UX FIB). We then attached the sample to a copper TEM grid using a nano-manipulator. Finally, the lamina was further thinned to electron transparency via a focused ion beam (FIB). The samples for in-plane TEM imaging were prepared by depositing 35, 45, (FIG. 12) and 70 (FIGS. 10B-D and 11) cycles of Pt on an 80 nm-thick silicon nitride membrane supported by silicon (from Greater Grids). The in-plane TEM imaging was performed in scanning TEM (STEM) mode on a probe-corrected TEM (Thermo Fisher Titan Themis Cryo S/TEM) at 120 kV. The electron energy loss spectra (EELS) image and spectra for the cross-section of the sample were collected using a Gatan Quefina dual-EELS spectrometer with 0.25 eV per channel.

To obtain the scanning electron microscopy images of the devices (FIG. 11, panels f-j), the samples were released from the substrate and washed by DI water and isopropanol sequentially. Then the samples were dried in a critical point drier (Leica CPD300), sputtered with a thin layer of gold and imaged in the scanning electron microscope (Zeiss Supra 55).

In situ characterization of both the electrochemical and mechanical properties of SOMA devices was performed in a custom built electrochemical cell on an inverted microscope (Olympus IX71) integrated with a 3-axis micromanipulator (from Sensapex) and video camera. Each SOMA device acted as the working electrode. Each device was lifted above the substrate using a micromanipulator with a PtIr probe coated with Parylene C so that only the few microns around the tip were exposed (Microprobes for Life Sciences).

The reference electrode was a commercial flexible Ag/AgCl electrode in 3M KCl (FLEX-REF, World Precision Instruments, Inc.) with a low electrolyte leakage. The reference electrode also worked as a counter electrode since the surface area of the reference electrode is much larger than that of the platinum on the SOMA devices. The memory time of the SOMA devices were measured in both half-cell and full-cell configurations. For the half-cell configurations, the device was oxidized at different voltages for a specified duration and then was disconnected from the power supply. For the full-cell configurations, the potential of the device was set to a fixed value vs. Ag/AgCl reference after the platinum was oxidized. Prior to the experiments the cells were cleaned thoroughly with deionized water to remove all the adsorbed impurities. All the experiments were taken at 25° C. All the potential values in this study are specified relative to the Ag/AgCl/3M KCl reference electrode used, which created a +210 mV shift relative to a standard hydrogen electrode. All the cyclic voltammetry data were taken at a sweep rate of 1 V/s. The electrochemical characterization and optical images were collected under the halogen lamp with red filter (600 nm-650 nm) to avoid any photocatalytic effect of the $TiO_2$ layer. The optical images were taken by a monochromatic camera mounted on the microscope.

Setup for measuring the conductivity. ALD platinum was deposited for 40 cycles to a thickness of about 5 nm on silicon dioxide cover slides. We photolithographically defined a pattern of long narrow platinum bars with an aspect ratio of 5 to 1 and etched the platinum via ion milling. We then sputtered thicker platinum contact pads. The samples were submerged in phosphate buffered saline solution. The conductivity of the thin platinum bars was measured using two PtIr electrodes coated with Parylene C so that only the few microns around the tip were exposed (Microprobes for Life Sciences). One side of the bar was biased at 50 mV and the current through the bar was read with an Ithaco 1211 preamplifier and National Instruments DAQ. The potential between the platinum bar and the solution was set by the voltage applied to an Ag/AgCl electrode in the solution. More details on these measurements can be found in FIG. 21.

Figure 25:
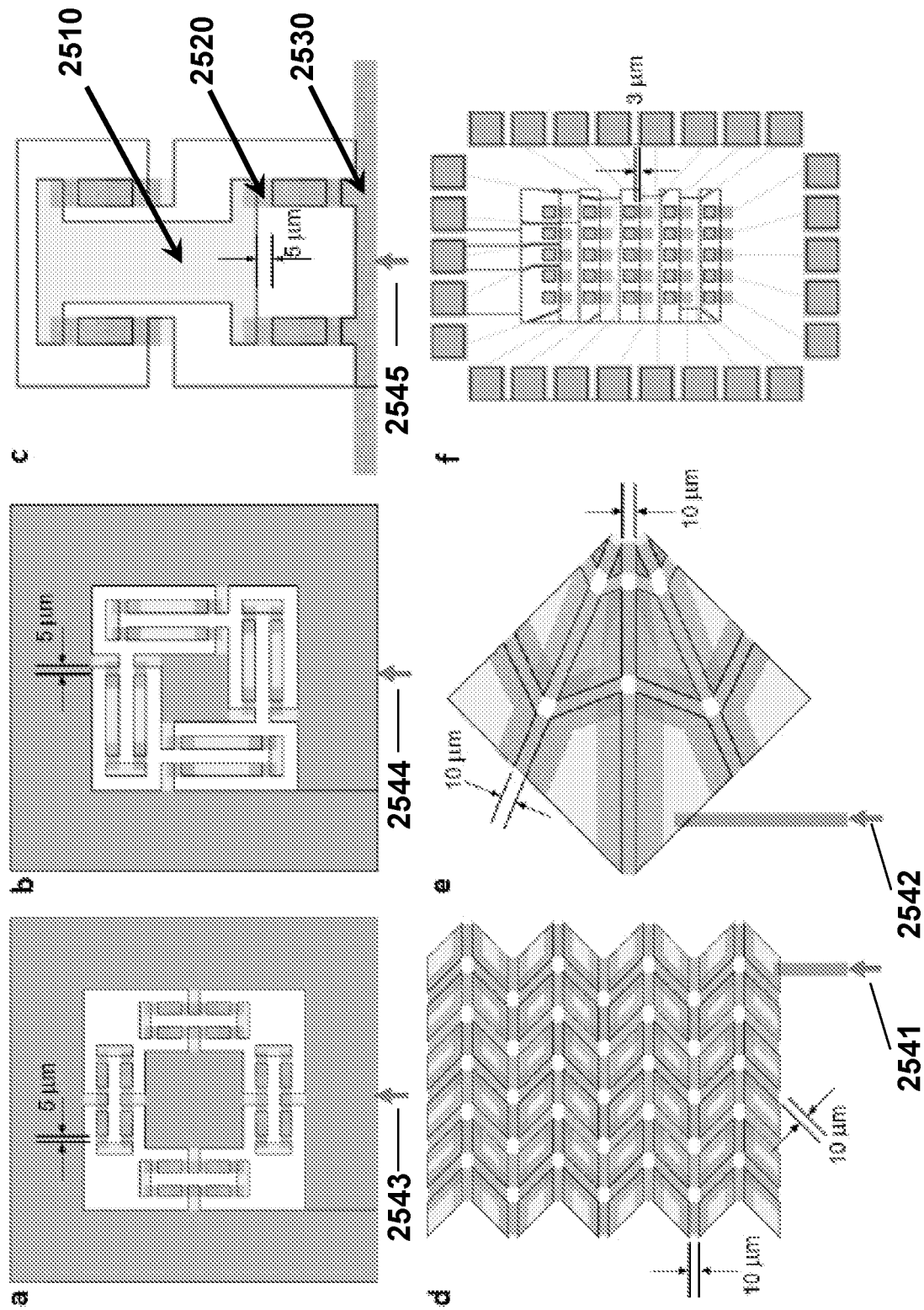
FIG. 25 shows example designs of kirigami-based or origami-based micromachines and microstructures according to the disclosed technology.

FIG. 25 shows example designs of kirigami-based or origami-based micromachines and microstructures according to the disclosed technology. Panels a-c in FIG. 25 show a schematic representation of a kirigami-based bistable micromachine. Panels d-e in FIG. 25 show origami-based Miura-Ori and duck microstructures. Panels f in FIG. 25 illustrate an example mechanical storage array according to the disclosed technology. The platinum (color shown by the arrow 2510) covers the whole device except the perforated area (white). Colors shown by the arrows 2520 and 2530 represent the top and bottom passive layers, respectively, which, together with the Pt layer, define the valley and mountain folds, respectively. The area enclosed by the black boundary illustrates the rigid polymeric panels. The places marked by the arrows 2541-2545 indicate the tethering strip through which we apply the voltage.

We calculated the strain of the active PtOx layer of the SOMA actuators and simulated the shape-morphing behavior of the micro-devices. We used the following mechanical properties for the different components of the actuators: The Young's Modulus of PtOx, Pt, Ti, and $TiO_2$ are 205 GPa, 165 GPa, 105 GPa and 240 GPa, respectively. Based on the electrical conductivity measurements we estimate the thickness of the PtOx, Pt, and $TiO_2$ (or Ti) and layers to be 1 nm, 6.5 nm, and 2.5 nm, respectively. The effective modulus of the passive composite layer ($E_s$) is calculated to be 185 GPa based on $E_s = f_{Pt}E_{Pt} + f_{TiO_2}E_{TiO_2}$, where $f_{Pt}$ and $f_{TiO_2}$ are the fractional volume of Pt and $TiO_2$ layers, and $E_{Pt}$, $E_{TiO_2}$ are the Young's moduli, respectively. The change of curvature $\Delta\kappa$ is estimated based on beam theory using Stoney formula:

$$\Delta\kappa = \frac{1}{R} - \frac{1}{R_0} = \frac{6(1-v_s)E_{ox}\varepsilon_{ox}}{E_s}\frac{h_{ox}}{h_s^2}$$

where R and $R_0$ are the curvature radii of the substrate after and before deformation; the Poisson's ratio vs is set at 0.3; $h_s$ and $h_{ox}$ are the thickness of the passive composite layer and the PtOx active layers, respectively; $E_{ox}$ and $\varepsilon_{ox}$ are the Young's modulus and strain of the PtOx active layer. Using the parameters above, we calculate the strain of the active layer is approximately 4%. The change of surface stress $\Delta\gamma$ is calculated to be 9 N/m based on Stoney formula:

$$\Delta\gamma = \frac{E_s h_s^2}{6(1-v_s)}\Delta\kappa.$$

More rigorously, the strain of the active layer could be calculated using the following multi-layer beam theory, $$\Delta\kappa = \frac{3\left[\sum_{i=1}^{n}E_i t_i(c-\varepsilon_i)(2h_{i-1}+t_i)\right]}{\sum_{i=1}^{n}E_i t_i\left[6h_{i-1}^2 + 6h_{i-1}t_i + 2t_i^2 - 3t_b(2h_{i-1}+t_i)\right]}$$

$$t_b = \frac{\sum_{i=1}^{n}E_i t_i(2h_{i-1}+t_i)}{2\sum_{i=1}^{n}E_i t_i}$$

$$c = \frac{\sum_{i=1}^{n}E_i t_i \varepsilon_i}{\sum_{i=1}^{n}E_i t_i}$$

where $$h_i = \sum_{j=1}^{i}t_j,$$

$h_0=0$. In this case, n=3, the three layers are PtOx, Pt and $TiO_2$ respectively. $t_i$, $E_i$ and $\varepsilon_i$ are the thickness, Young's Modulus and relative strain of the ith layer. The relative strain of Pt and $TiO_2$ is assumed to be 0, that is 82=83=0. Using the parameters above, we again achieve the strain of the active layer ~4%.

We estimated the force at the end of the SOMA hinge and its strain energy when the SOMA actuator bends from a curved to a flat shape. Based on the beam model, the bending energy of a cantilever is $E_{bending} = t^3 l w E_s/(24r^2)$, where t, l, w, and r are the thickness, length, width and bending radius of beam, respectively. If a beam with w=10 μm and r=560 nm bends 90° in 100 ms, the change of strain energy is 0.204 pJ and the average force at the end of the beam is 365 nN. Considering the mass of the beam is $1.5 \times 10^{-12}$ g, the energy density, force density, and power density of the actuated beam are 0.14 J/g, $2.4 \times 10^5$ N/g and 1.4 W/g, respectively. If we applied an oxidation pulse with the voltage of 1.2 V and an average current of 2 mA/cm² for 0.1 s, the energy efficiency is approximately 1%.

The simplest equation for relating the platinum oxide thickness to measured conductance of the film is:

$$d_{ox} = \Delta d = d_0 \frac{\Delta G}{G_0}$$

where $d_0$ is the initial thickness of the platinum film, $G_0$ is the initial conductance per square, and $\Delta G$ is the change in conductance per square. This equation comes from assuming that the oxide layer has the same thickness as platinum layer it consumes and that the conductivity of the film does not change as a function of thickness. Neither of these assumptions are precisely true, so we make our calculation of the oxide thickness more accurate by including (1) the expansion of platinum oxide with respect to platinum and (2) thin film effects on the conductivity.

(1) According to the literature, $\alpha\text{-PtO}_2$ linearly expands by about 10%-14% with respect to platinum. We therefore use $$d_{ox} = \frac{8}{7} \Delta d.$$

(2) For metal films with thickness of the same order as the mean free path, conductivity decreases as the film thickness decreases. Using the Sondheimer approximation of the Fuchs equation, the relationship between conductivity and thickness is given by:

$$\sigma_f = \sigma_b \frac{d}{d+C}$$

where $\sigma_f$ is the conductivity of the film, $\sigma_b$ is the bulk conductivity, about 9.5 MΩ/m for platinum, d is the platinum film thickness, and C is a constant, $$C = \frac{3}{8} l_f (1-p)$$

where $l_f$ is the mean free path and p is the specularity parameter of the film, $0 \leq p \leq 1$. Using the measured conductance and film thickness, we find that $C \cong 7$ nm.

Substituting the conductance per square divided by the film thickness, $G/d$, for the conductivity of the film, we can write:

$$d = \frac{G + \sqrt{G^2 + 4\sigma_b GC}}{2\sigma_b}$$

Based on this equation, we solve for $\Delta d$ and simplify by assuming $\Delta G \gg G_0$. We find that $$\Delta d = d_0 \frac{\Delta G}{G_0} \left( \frac{1 + 2a + \sqrt{1 + 4a}}{1 + 4a + \sqrt{1 + 4a}} \right)$$

where $$a = \frac{\sigma_b C}{G_0}.$$

The platinum oxide thickness is then approximately given by $$d_{ox} = \frac{8}{7} d_0 \frac{\Delta G}{G_0} \left( \frac{1 + 2a + \sqrt{1 + 4a}}{1 + 4a + \sqrt{1 + 4a}} \right)$$

For a measured initial conductance of about 20 mS, $a \cong 3$.

Figure 26:
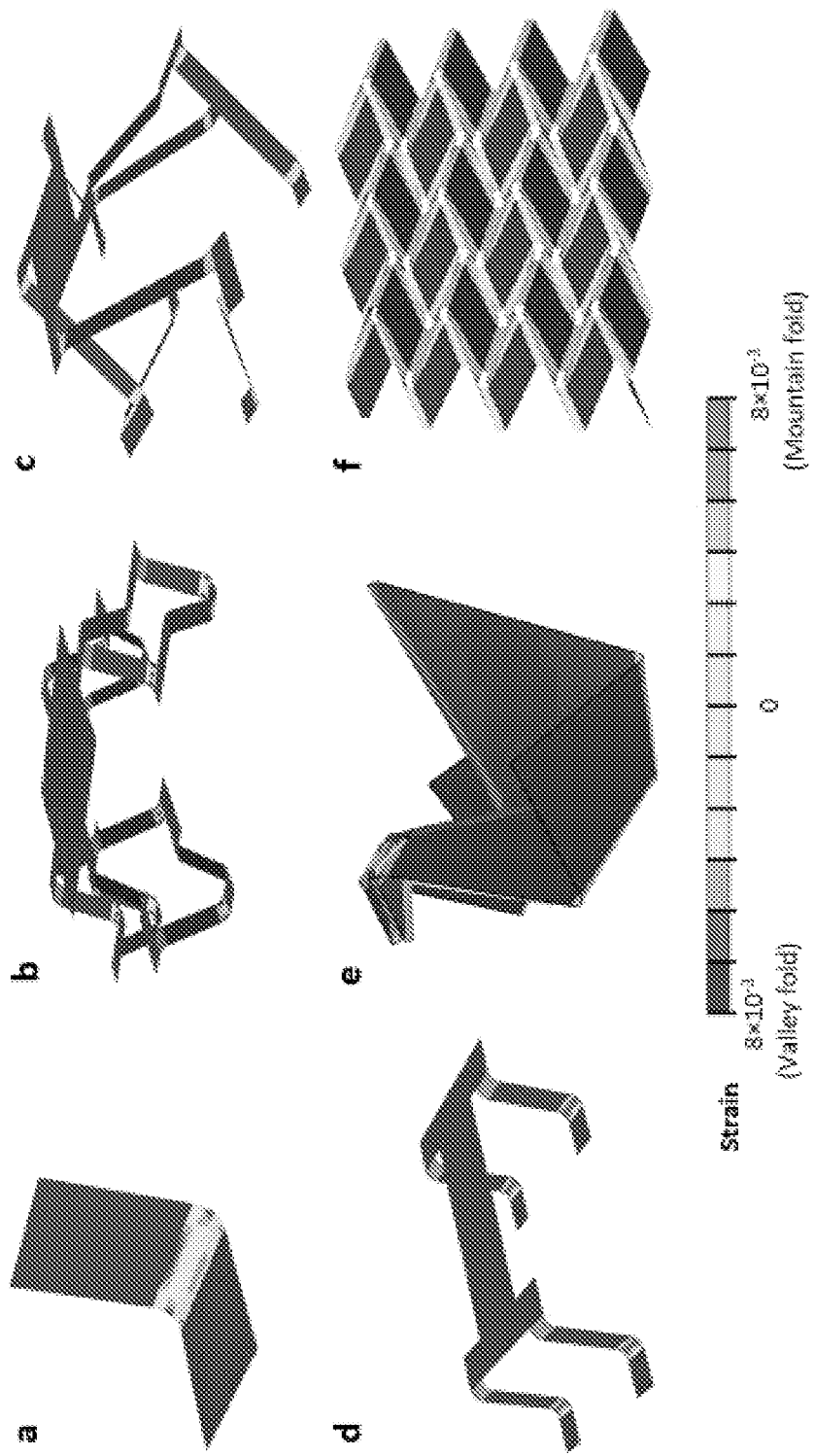
FIG. 26 shows example structures obtained during simulations of self-folding of different kirigami/origami-based micromachines and microstructures according to the disclosed technology.

To avoid the misfolding modes prior to fabrication, we simulate the shape-morphing of the SOMA devices shown in FIG. 26 using ABAQUS, a commercial finite-element analysis software. The geometric dimensions for the simulation are shown in FIG. 26. Since the actuator was very thin relative to the lateral dimensions, a shell element was utilized to simplify the calculation. We used the static solver with nonlinear geometry to capture the large displacement. Pt, PtOx and $TiO_2$ were all assumed to be elastic materials. Actuation was applied through the isotropic expansion of the $PtO_2$ layer.

FIG. 26 shows example structures obtained during simulations of self-folding of different kirigami/origami-based micromachines and microstructures according to the disclosed technology. Panel a in FIG. 26 shows an active hinge with two rigid panels. Panels b-d in FIG. 26 show kirigami-based bistable micro-positioner that moves the central stage to a new fixed position (panels b and c) along the z axis and along the x-z plane (panel d). Panel e in FIG. 26 shows a microscale origami duck. Panel f in FIG. 26 shows an origami-based microscale metamaterial according to the disclosed technology.

Figure 27:
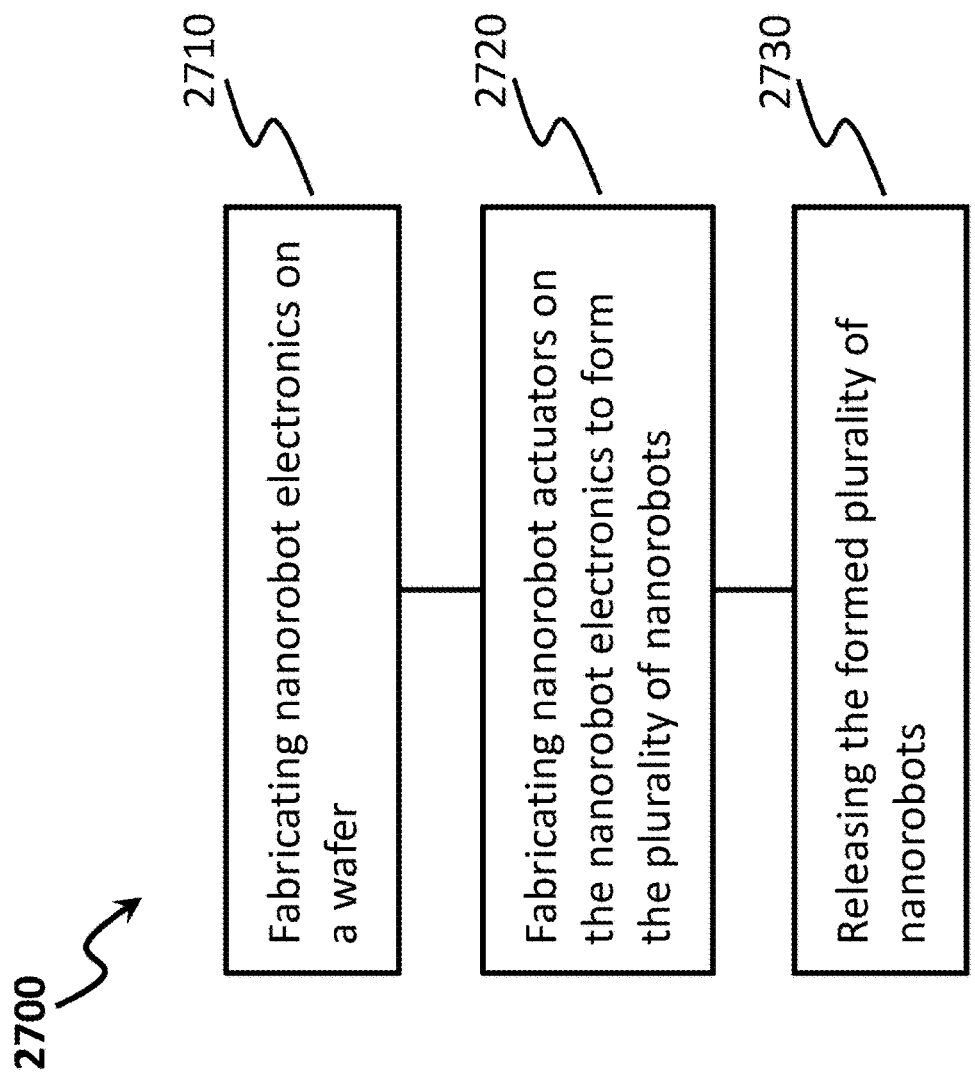
FIG. 27 shows a flow diagram of an example embodiment of a method of manufacturing a plurality of nanorobots according to the disclosed technology.

FIG. 27 shows a flow diagram of an example embodiment of a method 2700 of manufacturing a plurality of nanorobots according to the disclosed technology. Step 2710 of the method 2700 includes fabricating nanorobot electronics on a wafer. Step 2720 of the method 2700 includes fabricating nanorobot actuators on the nanorobot electronics to form the plurality of nanorobots. Step 2730 of the method 2700 includes releasing the formed plurality of nanorobots.

One aspect of the disclosed embodiments relates to an actuator that includes a nanometer-thick metal member; and an inactive material disposed along at least a portion of a surface of the nanometer-thick metal member, wherein the metal has a first surface stress and the inactive material has a second surface stress different than the first surface stress.

In some example embodiments of the actuator, the metal is one of: platinum, gold, silver, palladium, rhodium, iridium, ruthenium, or osmium. According to some example embodiments of the actuator, the metal includes one of: platinum, gold, silver, palladium, rhodium, iridium, ruthenium, or osmium. In some example embodiments of the actuator, the metal is a noble metal. In some example embodiments of the actuator, the metal includes a noble metal. According to certain example embodiments, the nanometer-thick platinum member is an elongated member, having a first dimension along a first axis, and a second dimension along a second axis perpendicular to the first axis; the first dimension being greater than the second dimension. In some example embodiments, the first axis is a longitudinal axis. According to some example embodiments, the inactive material is one of graphene, a metal oxide, or a metal nitride. According to certain example embodiments, the inactive material is titanium or a noble metal. In some example embodiments, the actuator is configured to assume a first curvilinear shape in a first state arising from the difference in the first surface stress and the second surface stress. In some example embodiments, the actuator is configured to assume a second curvilinear shape in a second state arising from ion transfer between the metal and an ambient aqueous electrolyte. In certain example embodiments, the actuator is configured to assume a second curvilinear shape in a second state arising from hydrogen adsorption. In some example embodiments, the actuator is configured to assume a second curvilinear shape in a second state arising from surface oxidation. In certain example embodiments, the actuator is configured to assume a second curvilinear shape in a second state arising from adsorption of an oxygen species. According to some example embodiments, the oxygen species comprises at least one of $OH^-$, $H_2O$, $H_2PO_4^-$ or $O^{2-}$. According to certain example embodiments, the actuator is at least substantially straight in a first state, and wherein the first surface stress and the second surface stress are different. In some example embodiments, the actuator is configured to assume a curvilinear shape in a second state arising from ion transfer between the metal and an ambient aqueous electrolyte. According to some example embodiments, the actuator is configured to assume a curvilinear shape in a second state arising from hydrogen adsorption. In some example embodiments, the actuator is configured to assume a curvilinear shape in a second state arising from surface oxidation. According to certain example embodiments, the actuator is configured to assume a curvilinear shape in a second state arising from adsorption of an oxygen species. In some example embodiments, the actuator is configured to assume the curvilinear shape in response to application of a voltage across the actuator. In certain example embodiments, the nanometer-thick metal member is between 2 nm-100 nm thick. In some example embodiments, the inactive material is between 0.3 nm-5 nm thick. According to some example embodiments, the nanometer-thick metal member is between 6 nm-8 nm thick. In some example embodiments, the nanometer-thick metal member is between 8 nm-100 nm thick. In some example embodiments, the voltage is below about 200 mV or in a range between about 200 mV and about 1.4V.

Another aspect of the disclosed embodiments relates to a nanorobot that includes a photovoltaic device; and an actuator electrically connected to the photovoltaic device, the actuator comprising a nanometer-thick metal member and an inactive material disposed along at least a portion of a surface of the nanometer-thick metal member, wherein the metal has a first surface stress and the inactive material has a second surface stress different than the first surface stress.

In some example embodiments of the nanorobot, the actuator includes a first actuator and a second actuator. In certain example embodiments, the first actuator and the second actuator are disposed on opposite sides of the nanorobot. In some example embodiments, the actuator includes a third actuator and a fourth actuator. According to certain example embodiments, the third actuator and the fourth actuator are disposed on opposite sides of the nanorobot. In some example embodiments of the nanorobot, the first actuator, the second actuator, the third actuator or the fourth actuator are connected to a rigid portion of the nanorobot. In certain example embodiments, the rigid portion of the nanorobot comprises a layer of SU-8 photoresist. In some example embodiments of the nanorobot, the nanorobot further includes a controller, wherein the controller is configured to regulate application of a voltage from the photovoltaic device to the actuator. According to certain example embodiments of the nanorobot, the metal is one of: platinum, gold, silver, palladium, rhodium, iridium, ruthenium, or osmium. In some example embodiments of the nanorobot, the metal includes one of: platinum, gold, silver, palladium, rhodium, iridium, ruthenium, or osmium. According to some example embodiments of the nanorobot, the metal is a noble metal. In certain example embodiments of the nanorobot, the metal includes a noble metal. In some example embodiments of the nanorobot, the nanometer-thick metal member of the actuator is an elongated member, having a first dimension along a first axis, and a second dimension along a second axis perpendicular to the first axis; the first dimension being greater than the second dimension. In some example embodiments, the nanometer-thick platinum member of the actuator is an elongated member, having a first dimension along a first axis, and a second dimension along a second axis perpendicular to the first axis; the first dimension being greater than the second dimension. In certain example embodiments, the first axis is a longitudinal axis. According to some example embodiments, the inactive material is one of graphene, a metal oxide, or a metal nitride. In other example embodiments, the inactive material is titanium or a noble metal. In some example embodiments, the actuator is configured to assume a first curvilinear shape in a first state arising from the difference in the first surface stress and the second surface stress. In some example embodiments, the actuator is configured to assume a second curvilinear shape in a second state arising from ion transfer between the metal and an ambient aqueous electrolyte. According to certain example embodiments, the actuator is configured to assume a second curvilinear shape in a second state arising from hydrogen adsorption. In some example embodiments, the actuator is configured to assume a second curvilinear shape in a second state arising from surface oxidation. In some example embodiments of the nanorobot, the actuator is configured to assume a second curvilinear shape in a second state arising from adsorption of an oxygen species. According to certain example embodiments, oxygen species comprises at least one of $OH^-$, $H_2O$, $H_2PO_4^-$ or $O^{2-}$. In some example embodiments, the actuator is configured to assume the second curvilinear shape in response to application of a voltage, generated by the photovoltaic device, across the actuator. According to some example embodiments, the actuator is at least substantially straight in a first state, and wherein the first surface stress and the second surface stress are different. In certain example embodiments, the actuator is configured to assume a curvilinear shape in a second state arising from ion transfer between the metal and an ambient aqueous electrolyte. In certain example embodiments, the actuator is configured to assume a curvilinear shape in a second state arising from hydrogen adsorption. In some example embodiments, the actuator is configured to assume a curvilinear shape in a second state arising from surface oxidation. According to some example embodiments, the actuator is configured to assume a curvilinear shape in a second state arising from adsorption of an oxygen species. In some example embodiments, the actuator is configured to assume the curvilinear shape in response to application of a voltage across the actuator. In certain example embodiments, the nanometer-thick metal member is between 2 nm-100 nm thick. According to some example embodiments, the inactive material is between 0.3 nm-5 nm thick. In some example embodiments, the nanometer-thick metal member is between 6 nm-8 nm thick. In certain example embodiments, the inactive material is between 2 nm-4 nm thick.

Yet another aspect of the disclosed embodiments relates to a nanorobot that includes a photovoltaic device; and an actuator electrically connected to the photovoltaic device, the actuator comprising a nanometer-thick first material and a nanometer-thick second material disposed along at least a portion of a surface of the first material, wherein the first material has a first surface stress and the second material has a second surface stress different than the first surface stress and wherein a thickness of the first material is greater than a thickness of the second material, wherein a voltage from the photovoltaic device applied to the actuator causes the actuator to change from a first state to a second state, and wherein a removal of a voltage from the photovoltaic device to the actuator causes the actuator to change from the second state to the first state.

In some example embodiments of the nanorobot, the actuator includes a first actuator and a second actuator. In certain example embodiments, the first actuator and the second actuator are disposed on opposite sides of the nanorobot. In some example embodiments, the actuator includes a third actuator and a fourth actuator. According to certain example embodiments, the third actuator and the fourth actuator are disposed on opposite sides of the nanorobot. In some example embodiments of the nanorobot, the first actuator, the second actuator, the third actuator or the fourth actuator are connected to a rigid portion of the nanorobot. In certain example embodiments, the rigid portion of the nanorobot comprises a layer of SU-8 photoresist. In some example embodiments of the nanorobot, the nanorobot further includes a controller, wherein the controller is configured to regulate application of a voltage from the photovoltaic device to the actuator. According to some example embodiments, the controller is configured to regulate application of a voltage from the photovoltaic device to the actuator to cause the first actuator and the second actuator to move at substantially the same time. In some example embodiments, the controller is configured to regulate application of a voltage from the photovoltaic device to the actuator to cause the third actuator and the fourth actuator to move at substantially the same time. According to certain example embodiments, the controller is configured to regulate application of a voltage from the photovoltaic device to the actuator to cause the first actuator and the second actuator to move at a first time and to cause the third actuator and the fourth actuator to move at a second time. According to certain example embodiments of the nanorobot, the first material is one of: platinum, gold, silver, palladium, rhodium, iridium, ruthenium, or osmium. In some example embodiments of the nanorobot, the first material includes one of: platinum, gold, silver, palladium, rhodium, iridium, ruthenium, or osmium. According to some example embodiments of the nanorobot, the first material is a noble metal. In certain example embodiments of the nanorobot, the first material includes a noble metal. In some example embodiments, the first material is in a form of an elongated member, having a first dimension along a first axis, and a second dimension along a second axis perpendicular to the first axis, the first dimension being greater than the second dimension. According to some example embodiments, the first axis is a longitudinal axis. In some example embodiments, the inactive material is one of graphene, a metal oxide, or a metal nitride. In certain example embodiments, the inactive material is titanium or a noble metal. According to some example embodiments, the actuator is configured to assume a first curvilinear shape in a first state arising from the difference in the first surface stress and the second surface stress. In some example embodiments, the actuator is configured to assume a second curvilinear shape in a second state arising from ion transfer between the first material and an ambient aqueous electrolyte. In certain example embodiments, the actuator is configured to assume a second curvilinear shape in a second state arising from hydrogen adsorption. According to some example embodiments, the actuator is configured to assume a second curvilinear shape in a second state arising from surface oxidation. In certain example embodiments, the actuator is configured to assume a second curvilinear shape in a second state arising from adsorption of an oxygen species. In certain example embodiments, the oxygen species comprises at least one of $OH^-$, $H_2O$, $H_2PO_4^-$ or $O^{2-}$. In some example embodiments, the actuator is at least substantially straight in a first state, and wherein the first surface stress and the second surface stress are different. According to some example embodiments, the actuator is configured to assume a curvilinear shape in a second state arising from ion transfer between the first material and an ambient aqueous electrolyte. In some example embodiments, the actuator is configured to assume a curvilinear shape in a second state arising from hydrogen adsorption. In certain example embodiments, the actuator is configured to assume a curvilinear shape in a second state arising from surface oxidation. According to some example embodiments, the actuator is configured to assume a curvilinear shape in a second state arising from adsorption of an oxygen species. In some example embodiments, the first material is between 2 nm-100 nm thick. In certain example embodiments, the second material is between 0.3 nm-5 nm thick. In some example embodiments, the first material is between 6 nm-8 nm thick.

An aspect of the disclosed embodiments relates to a method of manufacturing a plurality of nanorobots that includes fabricating nanorobot electronics on a wafer; fabricating nanorobot actuators on the nanorobot electronics to form the plurality of nanorobots; and releasing the formed plurality of nanorobots.

In some example embodiments of the method of manufacturing a plurality of nanorobots, the act of fabricating the nanorobot electronics on the wafer comprises: forming p-Si on an insulator; doping an n-Si junction; patterning the silicon into mesas; etching to expose the p-Si; depositing a conformal oxide layer; forming conductive contacts to the p-Si and n-Si; and patterning the conformal oxide layer. In some example embodiments, the act of fabricating nanorobot actuators comprises: depositing a layer of platinum to a thickness of between about 2 nm-100 nm; and depositing, on the platinum layer, a layer of graphene, a metal oxide, a metal nitride, titanium or a noble metal to a thickness of between about 0.3 nm-5 nm. In certain example embodiments, the act of fabricating nanorobot actuators further comprises: patterning the deposited layer of platinum to define the nanorobot actuators following the depositing of said layer. According to some example embodiments, the act of fabricating nanorobot actuators further comprises: patterning the deposited layer of graphene, metal oxide, metal nitride, titanium or noble metal to define the nanorobot actuators following the depositing of said layer. In some example embodiments of the method of manufacturing a plurality of nanorobots, the method further comprises the act of: forming interconnects conductively connecting the nanorobot actuators to the nanorobot electronics. In some example embodiments, the nanorobot electronics comprise silicon photovoltaics. In some example embodiments of the method of manufacturing a plurality of nanorobots, the method further comprises the act of dicing the wafer into a plurality of separate dies. According to some example embodiments, the act of releasing the formed plurality of nanorobots comprises: pressing a stamp into contact with the formed nanorobots; and peeling away the stamp. In some example embodiments, the stamp is a polydimethylsiloxane (PDMS) stamp.

Another aspect of the disclosed embodiments relates to a nanorobot that includes an electricity generating device; and an actuator electrically connected to the electricity generating device, the actuator comprising a nanometer-thick first material and a nanometer-thick second material disposed along at least a portion of a surface of the first material, wherein the first material has a first surface stress and the second material has a second surface stress different than the first surface stress and wherein a thickness of the first material is greater than a thickness of the second material, wherein a voltage from the electricity generating device applied to the actuator causes the actuator to change from a first state to a second state, and wherein a removal of a voltage from the electricity generating device to the actuator causes the actuator to change from the second state to the first state.

In some example embodiments of the nanorobot, the electricity generating device includes a photovoltaic device or a transducer. According to some example embodiments, the electricity generating device generates electricity responsive to an ambient field or an incident electromagnetic radiation. In some example embodiments of the nanorobot, the nanorobot does not include a battery.

Yet another aspect of the disclosed embodiments relates to a robotic device that includes a device platform; a first robotic member engaged to a first location of the device platform and operable to cause a local actuation at the first location; and a second robotic member engaged to a second, different location of the device platform and operable to cause a local actuation at the second location so that the local actuations at the first and second locations to cause a robotic movement of the device platform, wherein each of the first and second robotic members includes (1) a controllable actuator that includes two different layers with different material properties that are deformable in response to a control signal and (2) a control circuit coupled to the controllable actuator to supply the control signal to the controllable actuator, and wherein the different material properties of the two different layers are modifiable by the control signal to cause the local actuation.

In some example embodiments of the robotic device, the different material properties of the two different layers include different levels of hydrogen adsorption. In certain example embodiments, the different material properties of the two different layers include different levels of adsorption of oxygen species. According to some example embodiments of the robotic device, the different material properties of the two different layers include different oxidation levels. In some example embodiments, the control circuit in each of the first and second robotic members includes a circuit and a photovoltaic circuitry coupled to supply an electrical signal to the circuit in response to incident light. In some example embodiments of the robotic device, the device further comprises a light source that generates the incident light and controls the incident light to the first and second robotic members to modulate the local actuations at the first and second locations to cause the robotic movement of the device platform. According to some example embodiments of the robotic device, the controllable actuator includes a first rigid part engaged at a first location and a second rigid part spaced from the first rigid part at a second location so that the two different layers are bendable at a location between the first and second rigid parts and are not bendable at either the first rigid part and the second rigid part.

An aspect of the disclosed embodiments relates to an actuator joint that includes a nanometer-thick metal layer; and a layer of inactive material disposed along at least a portion of a surface of the nanometer-thick metal layer, wherein the metal has a first surface stress and the inactive material has a second surface stress different than the first surface stress.

In some example embodiments of the actuator joint, the nanometer-thick metal layer is platinum. According to certain example embodiments of the actuator joint, the metal of the nanometer-thick metal layer is one of: platinum, gold, silver, palladium, rhodium, iridium, ruthenium, or osmium. In some example embodiments of the actuator joint, the nanometer-thick metal layer includes one of: platinum, gold, silver, palladium, rhodium, iridium, ruthenium, or osmium. According to some example embodiments of the actuator joint, the metal of the nanometer-thick metal layer is a noble metal. In certain example embodiments of the actuator joint, the nanometer-thick metal layer includes a noble metal. In some example embodiments, the nanometer-thick metal layer, the inactive material layer, or both the nanometer-thick metal layer and the inactive material layer is or are formed via atomic layer deposition. In certain example embodiments, the nanometer-thick metal layer comprises an electrochemically active platinum layer about 7.5 nm thick. According to some example embodiments, the inactive material is about 2.5 nm thick. In some example embodiments, the inactive material is one of graphene, a metal oxide, a metal nitride, titanium, titanium dioxide, or a noble metal. In certain example embodiments, the platinum is polycrystalline with domain sizes of about 10 nm. In some example embodiments, the inactive material conformally caps the nanometer-thick metal layer. According to some example embodiments, the actuator joint is in a first state arising from the difference in the first surface stress and the second surface stress. In some example embodiments, the actuator joint is configured, when in the ambient aqueous electrolyte, to assume a second shape in a second state upon application of a first voltage to the actuator joint. In certain example embodiments, the actuator joint is configured, when in the ambient aqueous electrolyte, to maintain the second shape and the second state upon removal of the first voltage to the actuator joint. In some example embodiments, the actuator joint is configured, when in an ambient aqueous electrolyte, to move from the second state and second shape to the first state and the first shape upon application of a second voltage to the actuator joint. According to certain example embodiments, the actuator joint is configured, when in an ambient aqueous electrolyte, to maintain the first shape and the first state upon removal of the second voltage to the actuator joint. In some example embodiments, the first state and first shape is a first curvilinear shape and wherein the second state and second shape is a second curvilinear shape, wherein the first curvilinear shape is different from the second curvilinear shape. According to some example embodiments, one of the first state and first shape, or the second state and second shape, is a substantially planar shape and the other of the first state and first shape or the second state and second shape is curvilinear. In certain example embodiments, the actuator joint is configured to assume the second shape and the second state from adsorption of an oxygen species. the oxygen species comprises at least one of $OH^-$, $H_2O$, $H_2PO_4^-$ or $O^{2-}$. In some example embodiments, the first voltage is a negative voltage and the second voltage is a positive voltage. In some example embodiments, the first voltage is a positive voltage and the second voltage is a negative voltage. According to certain example embodiments, a magnitude of the first voltage is different than a magnitude of the second voltage. In some example embodiments, the first voltage is between about −0.4V to about −0.5V and the second voltage is between about 1.1V to about 1.3V. In certain example embodiments of the actuator joint, the nanometer-thick metal layer is between 2 nm-100 nm thick. In some example embodiments of the actuator joint, the inactive material is between 0.3 nm-5 nm thick. According to certain example embodiments of the actuator joint, the nanometer-thick metal layer is between 6 nm-8 nm thick. In some example embodiments, the actuator joint is configured, when in the ambient aqueous electrolyte, to move to and at least substantially maintain a second shape in a second state upon application of a first voltage to the actuator joint and to move from the second state and the second shape back to the first state and the first shape upon application of a second voltage to the actuator joint. In certain example embodiments, the actuator joint is further configured, when in the ambient aqueous electrolyte, to move to and at least substantially maintain a third shape in a third state upon application of a third voltage to the actuator joint. According to certain example embodiments, the actuator joint is further configured, when in the ambient aqueous electrolyte, to move to and at least substantially maintain a fourth shape in a fourth state upon application of a fourth voltage to the actuator joint. In some example embodiments, the third shape comprises a third curvilinear shape and the fourth shape comprises a fourth curvilinear shape, wherein the third curvilinear shape is different from the first shape, the second shape and the fourth shape, and wherein the fourth curvilinear shape is different from the first shape, the second shape and the third shape. In certain example embodiments, the third voltage and the fourth voltage are between the first voltage and the second voltage. According to certain example embodiments, the third voltage and the fourth voltage are each between about 0.4V and about 1.3V. In some example embodiments, the first voltage is selected to form an oxide of the nanometer-thick metal layer, and wherein the second voltage is selected to remove the oxide of the nanometer-thick metal layer and return the actuator joint to the first state or to reduce the oxide to move the actuator joint to an intermediary state between the first state and the second state. In certain example embodiments, the actuator joint is configured to transition from the second state to the first state in less than about 20 ms. In some example embodiments, the actuator joint is configured to transition from the first state to the second state in less than about 100 ms.

An aspect of the disclosed embodiments relates to an actuator comprising a base having an electrical connector disposed thereon and a plurality of connected actuator segments comprising a first actuator segment disposed on the base and connected by a first actuatable joint to a second actuator segment, the first actuatable joint comprising a SOMA comprising a nanometer-thick metal layer and a layer of inactive material disposed along at least a portion of a surface of the nanometer-thick metal layer, wherein the metal has a first surface stress and the inactive material has a second surface stress different than the first surface stress, the first actuatable joint further comprising a first conductive lead or metallization electrically connecting the SOMA of the first actuatable joint to the electrical connector.

In some example embodiments of the actuator, the plurality of connected actuator segments comprises a third actuator segment connected by a second actuatable joint to the second actuator segment, the second actuatable joint comprising a SOMA comprising a nanometer-thick metal layer and a layer of inactive material disposed along at least a portion of a surface nanometer-thick metal layer, wherein the metal has a first surface stress and the inactive material has a second surface stress different than the first surface stress, and further comprising a second conductive lead or metallization electrically connecting the SOMA of the first actuatable joint or the electrical connector to the SOMA of the second actuatable joint. In certain example embodiments of the actuator, the plurality of connected actuator segments comprises a fourth actuator segment connected by a third actuatable joint to the third actuator segment, the third actuatable joint comprising a SOMA comprising a nanometer-thick metal layer and a layer of inactive material disposed along at least a portion of a surface nanometer-thick metal layer, wherein the metal has a first surface stress and the inactive material has a second surface stress different than the first surface stress, and further comprising a third conductive lead or metallization electrically connecting the SOMA of the first actuatable joint, the SOMA of the second actuatable joint or the electrical connector to the SOMA of the third actuatable joint. According to some example embodiments of the actuator, the actuator further comprises a controller configured to apply a voltage, selected from a range of available voltages, to the first conductive lead, the second conductive lead or the third conductive lead, or a combination thereof. In certain example embodiments, the actuator further comprises a local power source borne by the base. In some example embodiments, the power source comprises a photovoltaic device. According to some example embodiments, the power source comprises a battery. In some example embodiments of the actuator, the actuator further comprises an electrical lead connecting the electrical connector to a power source remote from the actuator. In certain example embodiments, the first state corresponds to a stowed state in which the second actuator segment is folded over the first actuator segment and wherein the second state corresponds to a deployed state in which the second actuator segment is aligned in at least substantially a same plane as the first actuator segment. According to some example embodiments, the first state corresponds to a stowed state in which the second actuator segment is folded over the first actuator segment and the third actuator segment is folded over the second actuator segment and wherein the second state corresponds to a deployed state in which the third actuator segment and the second actuator segment are aligned in at least substantially a same plane as the first actuator segment. In some example embodiments, the first state corresponds to a stowed state in which the second actuator segment is folded over the first actuator segment, the third actuator segment is folded over the second actuator segment, and the fourth actuator segment is folded over the third actuator segment, and wherein the second state corresponds to a deployed state in which the fourth actuator segment, the third actuator segment and the second actuator segment are aligned in at least substantially a same plane as the first actuator segment.

Another aspect of the disclosed embodiments relates to an actuator joint that includes a first conductive layer; a first contact formed on or disposed on the first conductive layer;

a second conductive layer; a second contact formed on or disposed on the second conductive layer; and a nanometer-thick ionic conducting polymer material disposed between the first conductive layer and the second conductive layer, wherein the actuator joint, under a first voltage or a first range of voltages across the first contact and the second contact, is to maintain a first state having a first shape under a first electric field across the nanometer-thick ionic conducting polymer material, wherein a magnitude of the first voltage or the first range of voltages is either zero or non-zero, wherein application of a second voltage or a second range of voltages across the first contact and the second contact is to produce a second electric field across the nanometer-thick ionic conducting polymer material to impart a stress and a resultant strain to the first conductive layer and/or the second conductive layer to bend the actuator joint from the first state and the first shape to a second state having a second shape, and wherein the second electric field is different than the first electric field.

In some example embodiments of the actuator joint, the bending radius of the actuator joint in between about 10 nm to about 500 nm. In some example embodiments, the first conductive layer, the second conductive layer, the nanometer-thick ionic conducting polymer material, or any combination thereof are formed via atomic layer deposition. In some example embodiments, the first conductive layer and/or the second conductive layer is about 1 nm thick. In certain example embodiments, the first conductive layer and/or the second conductive layer is between about 1-5 nm thick. According to some example embodiments, the nanometer-thick ionic conducting polymer material is about 1 nm thick. In certain example embodiments, the nanometer-thick ionic conducting polymer material is between about 1-5 nm thick. In some example embodiments, a thickness of the nanometer-thick ionic conducting polymer material is greater than a thickness of the first conductive layer and the second conductive layer. In certain example embodiments, the stress imparted to the first conductive layer and/or the second conductive layer arises from oxidation of the first conductive layer and reduction of the second conductive layer via anions and cations in the nanometer-thin ionic conducting polymer. According to some example embodiments, the first state and the first shape of the actuator joint corresponds to a first voltage of about 0 V and a first electric field of about 0 V/m. In some example embodiments, the actuator joint is maintained in the second state and second shape while the second electric field is applied across the nanometer-thick ionic conducting polymer material. In some example embodiments, the actuator joint is configured to move from the second state and second shape to the first state and the first shape upon removal of the second electric field. In certain example embodiments, the actuator joint is configured to maintain the second state and second shape upon removal of the second electric field. According to some example embodiments, the actuator joint is configured to revert to the first shape and the first state upon removal of the second electric field. In some example embodiments, the actuator joint is configured to move from the second state and second shape to the first state and the first shape upon application of a third voltage or a third range of voltages to produce a third electric field across the nanometer-thick ionic conducting polymer material and to impart a stress and a resultant strain to the first conductive layer and/or the second conductive layer to bend the actuator joint from the second state and the second shape to a first state having a first shape, the third electric field being different than the first electric field and the second electric field. In certain example embodiments, the actuator joint is configured to move from the first state and the first shape to a third state and a third shape or from the second state and the second shape to the third state and the third shape upon application of a third voltage or a third range of voltages to produce a third electric field across the nanometer-thick ionic conducting polymer material and to impart a stress and a resultant strain to the first conductive layer and/or the second conductive layer to bend the actuator joint to the third state having the third shape, the third electric field being different than the first electric field and the second electric field. According to certain example embodiments, the actuator joint is configured to move from the second state and second shape to the first state and the first shape upon application of a third voltage or a third range of voltages, the third voltage or a third range of voltages being different than the first voltage or the first range of voltages and being different than the second voltage or the second range of voltages. According to some example embodiments, the actuator joint is configured to move from the first state and the first shape to a third state and a third shape or from the second state and the second shape to the third state and the third shape upon application of a third voltage or a third range of voltages, wherein the third state and the third shape is different from the first state and the first shape and the second state and the second shape, and wherein the third voltage or a third range of voltages is different than the first voltage or the first range of voltages and is different than the second voltage or the second range of voltages. In some example embodiments, the first conductive layer comprises a nanometer-thick conductive layer and/or the second conductive layer comprises a nanometer-thick conductive layer. In some example embodiments, a magnitude of the first voltage is different than a magnitude of the second voltage. In certain example embodiments, a polarity of the first voltage is different than a polarity of the second voltage.

Yet another aspect of the disclosed embodiments relates to an actuator joint that includes a first layer of a conductive material; a first contact formed on or disposed on a first side of the first layer at a first position; a second contact formed on or disposed on the first side of the first layer at a second position spaced apart from the first position; and a second layer disposed on a second side of the first layer, the second layer comprising a liquid crystal elastomer, wherein the actuator joint, under a first voltage or a first range of voltages across the first contact and the second contact, is to maintain a first state having a first shape, wherein a magnitude of the first voltage or the first range of voltages is either zero or non-zero, wherein application of a second voltage or a second range of voltages across the first contact and the second contact is to impart, via an electrothermal effect, a strain to the first conductive layer and/or the second layer to bend the actuator joint from the first state and the first shape to a second state having a second shape.

In some example embodiments of the actuator joint, the bending radius of the actuator joint in between about 10 nm to about 500 nm. In certain example embodiments, the first layer and/or the second layer are formed via atomic layer deposition. According to some example embodiments, the first layer and/or the second layer is about 1 nm thick. In some example embodiments, the first layer and/or the second layer is between about 1-5 nm thick. In certain example embodiments, the second layer is between about 5-20 nm thick. In some example embodiments, a thickness of the second layer is greater than a thickness of the first layer. According to certain example embodiments, the first state and the first shape of the actuator joint corresponds to a first voltage of about 0 V. In some example embodiments, the actuator joint is maintained in the second state and second shape while the second voltage or the second range of voltages is maintained across the first contact and the second contact. In certain example embodiments, the actuator joint is configured to move from the second state and second shape to the first state and the first shape upon removal of the second voltage or the second range of voltages. According to some example embodiments, the actuator joint is configured to maintain the second state and second shape upon removal of the second voltage or the second range of voltages. In some example embodiments, the actuator joint is configured to revert to the first shape and the first state upon removal of the second voltage or the second range of voltages. In some example embodiments, the actuator joint is configured to move from the second state and second shape to the first state and the first shape upon application of a third voltage or a third range of voltages. According to certain example embodiments, the actuator joint is configured to move from the first state and the first shape to a third state and a third shape or from the second state and the second shape to the third state and the third shape upon application of a third voltage or a third range of voltages different from the first voltage or the first range of voltages and different from the second voltage or the second range of voltages, wherein the third state and the third shape is different from the first state and the first shape and the second state and the second shape.

An aspect of the disclosed embodiments relates to a nanometer switch comprising an actuator joint according to the technology disclosed in this patent document.

Another aspect of the disclosed embodiments relates to a nanometer switch comprising a plurality of actuator joints according to the technology disclosed in this patent document.

An aspect of the disclosed embodiments relates to a nanorobot comprising at least one actuator joint according to the technology disclosed in this patent document.

Another aspect of the disclosed embodiments relates to a nanorobot comprising a plurality of actuator joints according to the technology disclosed in this patent document.

In some example embodiments of the nanorobot comprising a plurality of actuator joints according to the disclosed technology, application of the second voltage or the second range of voltages across the first contact and the second contact of each of the plurality of actuator joints to cause the plurality of actuator joints to move from the first state and the first shape to the second state and the second shape to change a state of the nanorobot from a first robot state to a second robot state. In some example embodiments, the first robot state of the nanorobot corresponds to a folded state and the second robot state of the nanorobot corresponds to an unfolded state. In certain example embodiments, the first robot state of the nanorobot corresponds to a substantially planar state and the second robot state of the nanorobot corresponds to a 3D configuration.

An aspect of the disclosed embodiments relates to an end effector comprising at least one actuator joint according to the technology disclosed in this patent document.

Another aspect of the disclosed embodiments relates to an end effector comprising a plurality of actuator joints according to the technology disclosed in this patent document.

In some example embodiments of the end effector comprising a plurality of actuator joints according to the disclosed technology, in the first state, distal ends of the plurality of actuator joints are spaced apart from one another and, in the second state, the distal ends of the plurality of actuator joints are moved toward one another.

An aspect of the disclosed embodiments relates to a nanorobot comprising one or more end effectors, each of the one or more end effectors comprising at least one actuator joint according to the technology disclosed in this patent document.

In some example embodiments of the nanorobot comprising one or more end effectors according to the disclosed technology, at least one of the one or more end effectors comprises a functionalized tip comprising a biomolecule selected to interact with a cell or a cell component.

In some example embodiments, a nanorobot according to the disclosed technology further comprises a bio-field effect transistor.

Yet another aspect of the disclosed embodiments relates to a surgical instrument comprising at least one end effector comprising at least one actuator joint according to the technology disclosed in this patent document.

An aspect of the disclosed embodiments relates to a surgical instrument comprising at least one end effector comprising a plurality of actuator joints according to the technology disclosed in this patent document.

In some example embodiments, the surgical instrument according to the disclosed technology comprises a catheter or an endoscope.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An actuator comprising:
   a nanoscale-thickness first material; and
   a nanoscale-thickness second material disposed along at least a portion of a surface of the nanoscale-thickness first material,
   wherein the nanoscale-thickness first material has a first surface stress, the nanoscale-thickness second material has a second surface stress different than the first surface stress, and the actuator is configured to assume a first shape in a first state arising from the difference in the first surface stress and the second surface stress, and wherein the nanoscale-thickness first material is capable of an electrochemically-driven adsorption from an aqueous environment, and the actuator is configured to assume a second shape in a second state arising from ion transfer between the nanoscale-thickness first material and the aqueous environment.

2. The actuator of claim 1, wherein the nanoscale-thickness first material includes platinum, ruthenium, rhodium, palladium, osmium, iridium, gold, or silver.

3. The actuator of claim 2, wherein the nanoscale-thickness first material is an elongated member, having a first dimension along a first axis, and a second dimension along a second axis perpendicular to the first axis; the first dimension being greater than the second dimension.

4. The actuator of claim 3, wherein the nanoscale-thickness second material is inactive of electrochemically-driven adsorption from the aqueous environment.

5. The actuator of claim 1, wherein the nanoscale-thickness second material is different from the nanoscale-thickness first material and comprises a graphene, a metal oxide, a metal nitride, titanium, or a noble metal.

6. The actuator of claim 1, wherein the nanoscale-thickness first material is platinum or palladium, and the nanoscale-thickness second material is titanium or a noble metal different from the nanoscale-thickness first material.

7. The actuator of claim 1, wherein the actuator is configured to assume the second shape in the second state arising from adsorption of hydrogen species, surface oxidation, or adsorption of an oxygen species.

8. The actuator of claim 7, wherein the oxygen species comprises at least one of $OH^-$, $H_2O$, $[H_2PO_4]^-$, or $O^{2-}$.

9. The actuator of claim 1, wherein the actuator is configured to assume the second shape in response to application of a voltage across the actuator.

10. The actuator of claim 1, wherein the actuator is at least substantially straight in a first state, and wherein the first surface stress and the second surface stress are different.

11. The actuator of claim 10, wherein the actuator is configured to assume a curvilinear shape in a second state arising from adsorption of hydrogen species, surface oxidation, or adsorption of an oxygen species.

12. The actuator of claim 10, wherein the actuator is configured to assume a curvilinear shape in a second state arising from hydrogen adsorption.

13. The actuator of claim 10, wherein the actuator is configured to assume a curvilinear shape in a second state arising from adsorption of an oxygen species.

14. The actuator of claim 11, wherein the oxygen species comprises at least one of $OH^-$, $H_2O$, $[H_2PO_4]^-$, or $O^{2-}$.

15. The actuator of claim 1, wherein the nanoscale-thickness first material is between 2 nm and 100 nm thick.

16. The actuator of claim 1, wherein the second material is between 0.3 nm and 5 nm thick.

17. The actuator of claim 1, wherein the nanoscale-thickness first material is between 6 nm and 8 nm thick.

18. The actuator of claim 1, wherein the actuator is a joint actuator of a first member and a second member.

19. The actuator of claim 9, wherein the voltage is below about 200 mV or in a range between about 200 mV and about 1.4V.

20. A nanorobot comprising:
a photovoltaic device; and
the actuator of claim 1 electrically connected to the photovoltaic device.

* * * * *